United States Patent
Chen et al.

(10) Patent No.: US 11,656,442 B2
(45) Date of Patent: May 23, 2023

(54) PHOTOGRAPHING LENS ASSEMBLY, IMAGING APPARATUS AND ELECTRONIC DEVICE

(71) Applicant: LARGAN PRECISION CO., LTD., Taichung (TW)

(72) Inventors: Hung-Shuo Chen, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 17/577,063

(22) Filed: Jan. 17, 2022

(65) Prior Publication Data

US 2022/0137371 A1    May 5, 2022

Related U.S. Application Data

(63) Continuation of application No. 16/861,272, filed on Apr. 29, 2020, now Pat. No. 11,262,553, which is a continuation of application No. 16/034,768, filed on Jul. 13, 2018, now Pat. No. 10,678,025.

(30) Foreign Application Priority Data

Dec. 25, 2017 (TW) .................. 106145560

(51) Int. Cl.
   *G02B 13/00*   (2006.01)
   *G02B 9/64*    (2006.01)
   *H04N 5/225*   (2006.01)

(52) U.S. Cl.
   CPC .......... *G02B 13/0045* (2013.01); *G02B 9/64* (2013.01); *H04N 5/2254* (2013.01)

(58) Field of Classification Search
   CPC ...... G02B 13/0045; G02B 9/64; G02B 13/06; G02B 13/18; H04N 5/2254
   See application file for complete search history.

(56) References Cited

U.S. PATENT DOCUMENTS

| | | | |
|---|---|---|---|
| 2,685,229 | A | 8/1954 | Hans et al. |
| 3,174,396 | A | 3/1965 | Ruben et al. |
| 4,682,862 | A | 7/1987 | Moskovich |
| 4,976,525 | A | 12/1990 | Matsumura et al. |
| 5,357,373 | A | 10/1994 | Yoshioka et al. |
| 5,371,628 | A | 12/1994 | Shimoda et al. |

(Continued)

FOREIGN PATENT DOCUMENTS

| CN | 204028445 U | 12/2014 |
|---|---|---|
| CN | 204256251 U | 4/2015 |

(Continued)

*Primary Examiner* — James C. Jones
(74) *Attorney, Agent, or Firm* — McClure, Qualey & Rodack, LLP

(57) ABSTRACT

A photographing lens assembly includes seven lens elements, which are, in order from an object side to an image side, a first lens element, a second lens element, a third lens element, a fourth lens element, a fifth lens element, a sixth lens element and a seventh lens element. The third lens element has positive refractive power. The seventh lens element has an image-side surface being concave in a paraxial region thereof, and at least one of an object-side surface and the image-side surface of the seventh lens element includes at least one inflection point. At least one surface of the seven lens elements is aspheric.

21 Claims, 27 Drawing Sheets

(56) References Cited

U.S. PATENT DOCUMENTS

| | | | |
|---|---|---|---|
| 5,587,840 A | 12/1996 | Itoh | |
| 5,659,424 A | 8/1997 | Osawa et al. | |
| 5,936,775 A | 8/1999 | Abe | |
| 6,014,265 A | 1/2000 | Kato et al. | |
| 6,130,786 A | 10/2000 | Osawa et al. | |
| 6,185,050 B1 | 2/2001 | Ota et al. | |
| 6,411,443 B1 | 6/2002 | Kato et al. | |
| 9,706,093 B2 | 7/2017 | Chen | |
| 9,778,442 B2 | 10/2017 | Tang et al. | |
| 10,082,648 B2 | 9/2018 | Usui et al. | |
| 10,324,272 B2 | 6/2019 | Huang | |
| 10,459,196 B2 | 10/2019 | Zhang et al. | |
| 10,459,200 B2 | 10/2019 | Hsieh et al. | |
| 10,495,854 B2 | 12/2019 | Sekine | |
| 2013/0050846 A1 | 2/2013 | Huang | |
| 2014/0376105 A1 | 12/2014 | Sekine | |
| 2015/0103414 A1 | 4/2015 | Baik | |
| 2015/0316751 A1 | 11/2015 | Sekine | |
| 2015/0378131 A1 | 12/2015 | Tang et al. | |
| 2016/0033742 A1 | 2/2016 | Huang | |
| 2016/0131874 A1 | 5/2016 | Tang et al. | |
| 2016/0170180 A1 | 6/2016 | Son | |
| 2016/0241756 A1 | 8/2016 | Chen | |
| 2016/0299319 A1 | 10/2016 | Tang et al. | |
| 2016/0377839 A1 | 12/2016 | Chen et al. | |
| 2017/0059825 A1 | 3/2017 | Tang et al. | |
| 2017/0059826 A1 | 3/2017 | Tang et al. | |
| 2017/0082834 A1 | 3/2017 | Tang et al. | |
| 2017/0082835 A1 | 3/2017 | Tang et al. | |
| 2017/0108663 A1 | 4/2017 | Sekine | |
| 2017/0108664 A1 | 4/2017 | Sekine | |
| 2017/0139185 A1 | 5/2017 | Tang et al. | |
| 2017/0139186 A1 | 5/2017 | Tang et al. | |
| 2017/0168267 A1 | 6/2017 | Tang et al. | |
| 2017/0168268 A1 | 6/2017 | Tang et al. | |
| 2017/0184819 A1 | 6/2017 | Shi | |
| 2017/0248773 A1 | 8/2017 | Tang et al. | |
| 2017/0254987 A1 | 9/2017 | Lai et al. | |
| 2017/0269334 A1 | 9/2017 | Usui et al. | |
| 2017/0336605 A1 | 11/2017 | Lai et al. | |
| 2017/0336606 A1* | 11/2017 | Lai | G02B 9/64 |
| 2018/0100990 A1 | 4/2018 | Sekine | |
| 2018/0100991 A1 | 4/2018 | Sekine | |
| 2018/0196226 A1 | 7/2018 | Chang et al. | |
| 2018/0196235 A1 | 7/2018 | Chang et al. | |
| 2019/0121067 A1 | 4/2019 | Oinuma et al. | |
| 2019/0121068 A1 | 4/2019 | Oinuma et al. | |
| 2019/0121080 A1 | 4/2019 | Oinuma et al. | |
| 2019/0121090 A1 | 4/2019 | Shi et al. | |

FOREIGN PATENT DOCUMENTS

| | | |
|---|---|---|
| CN | 105388592 A | 3/2016 |
| CN | 107664813 A | 2/2018 |
| CN | 107664816 A | 2/2018 |
| CN | 107797235 A | 3/2018 |
| CN | 107817582 A | 3/2018 |
| CN | 107907971 A | 4/2018 |
| CN | 107942484 A | 4/2018 |
| CN | 108107551 A | 6/2018 |
| JP | S62112115 A | 5/1987 |
| JP | H05-034593 A | 2/1993 |
| JP | H09-015500 A | 1/1997 |
| JP | H11-072720 A | 3/1999 |
| JP | H11281888 A | 10/1999 |
| JP | 2015004842 A | 1/2015 |
| JP | 2017173807 A | 9/2017 |
| TW | 201708868 A | 3/2017 |
| TW | 201728948 A | 8/2017 |
| TW | I600923 B | 10/2017 |
| TW | 201741714 A | 12/2017 |
| TW | 201816456 A | 5/2018 |

* cited by examiner

PHOTOGRAPHING LENS ASSEMBLY, IMAGING APPARATUS AND ELECTRONIC DEVICE

RELATED APPLICATIONS

This present application is a continuation of U.S. application Ser. No. 16/861,272, filed Apr. 29, 2020, which is a continuation of U.S. application Ser. No. 16/034,768, filed Jul. 13, 2018, now U.S. Pat. No. 10,678,025 issued on Jun. 9, 2020, which claims priority to Taiwan Application Serial Number 106145560, filed Dec. 25, 2017, which are herein incorporated by reference.

BACKGROUND

Technical Field

The present disclosure relates to a photographing lens assembly and an imaging apparatus. More particularly, the present disclosure relates to a photographing lens assembly and an imaging apparatus with a large field of view and a short total track length while being applicable to electronic devices.

Description of Related Art

With the advanced semiconductor manufacturing technologies, the performance of image sensors are enhanced, and the pixel size is minimized. Therefore, optical lens systems with high image quality become indispensable.

Moreover, with the rapid scientific and technological progress, the application scope of electronic devices equipped with optical lens systems becomes wider, and the requirements for optical lens systems are more diverse. However, it is hard for balancing the requirements, such as image quality, sensitivity, aperture size, volume and field of view, in conventional optical lens systems. Therefore, there is a need for an optical lens system to satisfy the desired requirements.

SUMMARY

According to one aspect of the present disclosure, a photographing lens assembly includes seven lens elements, which are, in order from an object side to an image side, a first lens element, a second lens element, a third lens element, a fourth lens element, a fifth lens element, a sixth lens element and a seventh lens element. The third lens element has positive refractive power. The seventh lens element has an image-side surface being concave in a paraxial region thereof, and at least one of an object-side surface and the image-side surface of the seventh lens element includes at least one inflection point. At least one surface of the seven lens elements is aspheric. When a focal length of the first lens element is f1, a focal length of the third lens element is f3, a focal length of the fifth lens element is f5, an axial distance between an object-side surface of the first lens element and an image surface is TL, a maximum image height of the photographing lens assembly is ImgH, a curvature radius of an object-side surface of the third lens element is R5, and a curvature radius of an image-side surface of the third lens element is R6, the following conditions are satisfied:

$|f3/f1|<0.90;$ $1.0<TL/ImgH<2.70;$ $0.10<(R5+R6)/(R5-R6)<8.0;$ and $|f5/f1|<0.70.$ According to another aspect of the present disclosure, an imaging apparatus includes the photographing lens assembly according to the aforementioned aspect and an image sensor, wherein the image sensor is disposed on the image surface of the photographing lens assembly.

According to further another aspect of the present disclosure, an electronic device includes the imaging apparatus according to the aforementioned aspect.

According to yet another aspect of the present disclosure, a photographing lens assembly includes seven lens elements, which are, in order from an object side to an image side, a first lens element, a second lens element, a third lens element, a fourth lens element, a fifth lens element, a sixth lens element and a seventh lens element. The third lens element has positive refractive power. The seventh lens element has an image-side surface being concave in a paraxial region thereof, and at least one of an object-side surface and the image-side surface of the seventh lens element includes at least one inflection point. At least one surface of the seven lens elements is aspheric. When a focal length of the first lens element is f1, a focal length of the third lens element is f3, an axial distance between an object-side surface of the first lens element and an image surface is TL, a maximum image height of the photographing lens assembly is ImgH, a curvature radius of the object-side surface of the first lens element is R1, a curvature radius of an image-side surface of the first lens element is R2, a curvature radius of an object-side surface of the third lens element is R5, and a curvature radius of an image-side surface of the third lens element is R6, the following conditions are satisfied:

$|f3/f1|<0.90;$ $1.0<TL/ImgH<2.70;$ $0.10<(R5+R6)/(R5-R6)<8.0;$ and $-1.80<(R1+R2)/(R1-R2).$ According to still another aspect of the present disclosure, a photographing lens assembly includes seven lens elements, which are, in order from an object side to an image side, a first lens element, a second lens element, a third lens element, a fourth lens element, a fifth lens element, a sixth lens element and a seventh lens element. The first lens element with positive refractive power has an image-side surface being convex in a paraxial region thereof. The third lens element has positive refractive power. The fifth lens element has positive refractive power. The seventh lens element has an image-side surface being concave in a paraxial region thereof and including at least one convex shape in an off-axis region thereof. At least one surface of the seven lens elements is aspheric. When a focal length of the first lens element is f1, a focal length of the third lens element is f3, an axial distance between an object-side surface of the first lens element and an image surface is TL, a maximum image height of the photographing lens assembly is ImgH, a curvature radius of the object-side surface of the first lens element is R1, a curvature radius of the image-side surface of the first lens element is R2, a curvature radius of an object-side surface of the third lens element is R5, and a curvature radius of an image-side surface of the third lens element is R6, the following conditions are satisfied:

$|f3/f1|<2.0;$ $1.0<TL/ImgH<2.70;$ $-5.0<(R5+R6)/(R5-R6);$ and $0<(R1+R2)/(R1-R2)<6.0.$

BRIEF DESCRIPTION OF THE DRAWINGS

The present disclosure can be more fully understood by reading the following detailed description of the embodiments, with reference made to the accompanying drawings as follows.

DETAILED DESCRIPTION

Figure 1:
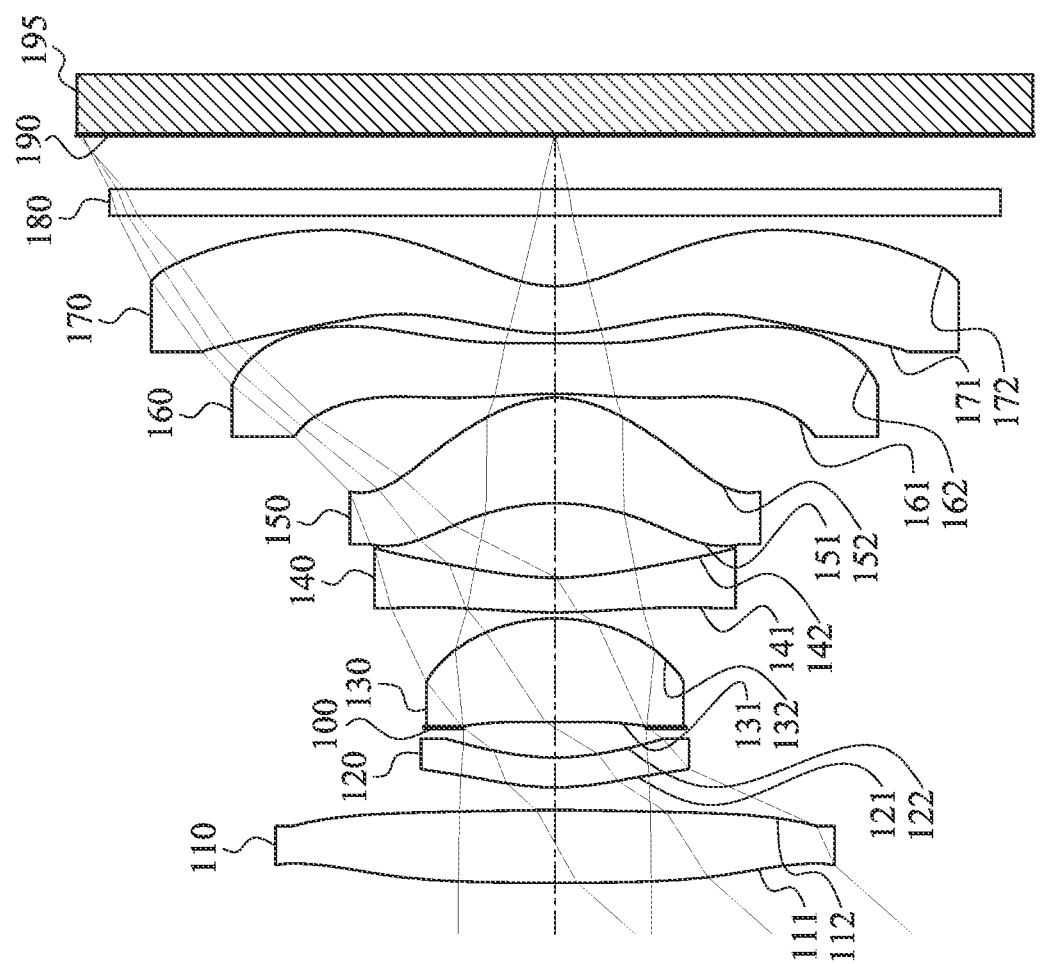
FIG. 1 is a schematic view of an imaging apparatus according to the 1st embodiment of the present disclosure.

A photographing lens assembly includes seven lens elements, which are, in order from an object side to an image side, a first lens element, a second lens element, a third lens element, a fourth lens element, a fifth lens element, a sixth lens element and a seventh lens element.

The first lens element can have positive refractive power. Therefore, the light converging ability of the lens elements on the object side of the photographing lens assembly can be distributed effectively, and excessive aberrations caused by overly strong refractive power of any single lens element can be avoided. The first lens element can have an image-side surface being convex in a paraxial region thereof, which is favorable for the symmetry of the photographing lens assembly so as to reduce aberrations. Moreover, at least one of an object-side surface and the image-side surface of the first lens element can include at least one inflection point, which is favorable for controlling the size of the imaging apparatus and spherical aberration of the photographing lens assembly.

The second lens element can have an object-side surface being convex in a paraxial region thereof and an image-side surface being concave in a paraxial region thereof. Therefore, tangential and sagittal rays can converge favorably so as to correct astigmatism of the photographing lens assembly.

The third lens element has positive refractive power. Therefore, the main light converging ability of the photographing lens assembly can be provided, which is favorable for reducing the total track length thereof so as to achieve compactness.

The fourth lens element can have negative refractive power, which can effectively correct chromatic aberration of the photographing lens assembly, while avoiding image overlaps due to the shift of the imaging position of light with different colors.

The fifth lens element can have positive refractive. Therefore, the light converging ability of the lens elements on the image side of the photographing lens assembly can be provided so as to balance aberrations thereof. The fifth lens element can have an object-side surface being concave in a paraxial region thereof and can have an image-side surface being convex in a paraxial region thereof. Therefore, it is favorable for moderating the incident angles and refraction angles of light rays on the surfaces of fifth lens element, so as to prevent the generation of stray lights. At least one of the object-side surface and the image-side surface of the fifth lens element can include at least one inflection point. Therefore, the aberration corrections of the fifth lens element can be enhanced so as to improve image brightness and image quality.

An image-side surface of the sixth lens element can include at least one convex shape in an off-axis region thereof. Therefore, it is favorable for avoiding the total reflection caused by excessive curvature of the surface of the sixth lens element as well as the resulting light spots in the image. At least one of an object-side surface and the image-side surface of the sixth lens element can include at least one inflection point. Therefore, the refraction angles of light rays on the surface of sixth lens element can be moderated, and distortion and field curvature can be corrected.

The seventh lens element has an image-side surface being concave in a paraxial region thereof, which can effectively control the back focal length to achieve compactness. Moreover, the seventh lens element can have negative refractive power. Therefore, the refractive power of the lens elements on the image side of the photographing lens assembly can be balanced for correcting aberrations and avoiding an overly large lens assembly due to an excessive back focal length. Moreover, the image-side surface of the seventh lens element can include at least one convex shape in an off-axis region thereof, which is favorable for improving Petzval field and reducing the size of the imaging apparatus while providing high image quality. Moreover, it is favorable for avoiding the total reflection caused by excessive curvature of the surface of the seventh lens element and the light spots formed in the image. At least one of an object-side surface and the image-side surface of the seventh lens element can include at least one inflection point, which can correct distortion and avoid vignetting generated on the image periphery.

At least one surface of the seven lens elements is aspheric, which is favorable for correcting aberrations of the off-axis region, decreasing the required number of the lens elements, and reducing the total track length. Alternatively, at least one surface of each lens element of the seven lens elements can be aspheric. Therefore, aberrations can be corrected, and the total track length of the photographing lens assembly can be reduced to achieve compactness.

There is an air gap in a paraxial region between each of adjacent lens elements of the seven lens elements. Therefore, the assembling complexity can be simplified so as to enhance the yield rate. Specifically, each of the first through seventh lens elements is a single and non-cemented lens element, every adjacent lens elements are not cemented, and there is a space between the two lens elements. In other words, of the first lens element, the second lens element, the third lens element, the fourth lens element, the fifth lens element, the sixth lens element and the seventh lens element of the photographing lens assembly, there is a space in a paraxial region between every adjacent lens elements. Moreover, the manufacturing process of the cemented lenses is more complex than the non-cemented lenses. In particular, both cementing surfaces of two cementing lens elements need to have accurate curvature to ensure these two lens elements will be highly cemented. However, during the cementing process, those two lens elements might not be highly cemented due to displacement and it is thereby not favorable for the image quality of the photographing lens assembly. Therefore, according to the photographing lens assembly of the present disclosure, an air gap in a paraxial region between every adjacent lens elements of the first lens element, the second lens element, the third lens element, the fourth lens element, the fifth lens element, the sixth lens element and the seventh lens element can avoid the problem generated by the cemented lens elements.

At least five lens elements of the seven lens elements can be made of plastic materials. Therefore, the weight of the imaging apparatus can be reduced, and the design freedom for lens elements can be increased. Accordingly, it is favorable for reducing the volume of the imaging apparatus.

When a focal length of the first lens element is f1, and a focal length of the third lens element is f3, the following condition can be satisfied: $|f3/f1|<2.0$. Therefore, the distribution of the refractive power of the first lens element and the third lens element can be effectively controlled, which can provide the photographing lens assembly with a wider imaging range. Preferably, the following condition can be satisfied: $|f3/f1|<0.90$. More preferably, the following condition can be satisfied: $|f3/f1|<0.75$. More preferably, the following condition can be satisfied: $|f3/f1|<0.55$. More preferably, the following condition can be satisfied: $|f3/f1|<0.25$.

When an axial distance between the object-side surface of the first lens element and an image surface is TL, and a maximum image height of the photographing lens assembly is ImgH, the following condition can be satisfied: $1.0<TL/ImgH<2.70$. Therefore, it is favorable for providing compactness and a sufficient range for receiving light rays, which can prevent image vignetting. Preferably, the following condition can be satisfied: $1.0<TL/ImgH<2.0$. More preferably, the following condition can be satisfied: $1.0<TL/ImgH<1.75$.

When a curvature radius of an object-side surface of the third lens element is R5, and a curvature radius of an image-side surface of the third lens element is R6, the following condition can be satisfied: $-5.0<(R5+R6)/(R5-R6)$. Therefore, the symmetry of the photographing lens assembly can be enhanced so as to avoid excessive aberrations. Preferably, the following condition can be satisfied: $0.10<(R5+R6)/(R5-R6)<8.0$. More preferably, the following condition can be satisfied: $0.50<(R5+R6)/(R5-R6)<2.0$.

When the focal length of the first lens element is f1, and a focal length of the fifth lens element is f5, the following condition can be satisfied: $|f5/f1|<0.70$. Therefore, the distribution of the refractive power of the first lens element and the fifth lens element can be balanced, which can improve the ability of the fifth lens element for controlling light paths. Accordingly, the total track length of the photographing lens assembly can be controlled to achieve compactness. Preferably, the following condition can be satisfied: $|f5/f1|<0.35$.

When a maximum of refractive indexes of all the lens elements of the photographing lens assembly is Nmax, the following condition can be satisfied: $1.650<Nmax<1.750$. Therefore, the arrangement of the lens material of the photographing lens assembly can be balanced, which can enhance the image quality while reducing the total track length thereof and obtaining compactness.

At least two lens elements of all the lens elements of the photographing lens assembly can have Abbe numbers less than 25.0. With a larger density difference between a high dispersion material (i.e. with a small Abbe number) and air, a stronger light refraction can be provided within smaller space, which is favorable for reducing the size of the photographing lens assembly. Preferably, at least two lens elements of all lens elements of the photographing lens assembly can have Abbe numbers less than 22.0.

When a curvature radius of an object-side surface of the fourth lens element is R7, and a curvature radius of an image-side surface of the fourth lens element is R8, the following condition can be satisfied: $-1.80<(R7+R8)/(R7-R8)<4.0$. Therefore, surface shapes of the fourth lens element can be balanced, which is favorable for increasing the symmetry of the photographing lens assembly so as to maintain better image quality.

When half of a maximum field of view of the photographing lens assembly is HFOV, the following condition can be satisfied: 40.0 degrees<HFOV<70.0 degrees. Therefore, the field of view of the photographing lens assembly can be effectively controlled so as to obtain a larger image capturing range. Accordingly, it is favorable for obtaining more image information.

The photographing lens assembly can further include an aperture stop. When an axial distance between the aperture stop and the object-side surface of the second lens element is Dsr3, an axial distance between the aperture stop and the image-side surface of the second lens element is Dsr4, an axial distance between the aperture stop and the object-side surface of the third lens element is Dsr5, an axial distance between the aperture stop and the image-side surface of the third lens element is Dsr6, the following conditions can be satisfied: |Dsr4/Dsr3|<1.0; and |Dsr5/Dsr6|<1.0. Therefore, the position of the aperture stop can be controlled for balancing the field of view and the total track length, which is favorable for the compactness of the electronic device and increasing the utility.

When a maximum optical effective radius of the object-side surface of the first lens element is Y11, and a maximum optical effective radius of the image-side surface of the seventh lens element is Y72, the following condition can be satisfied: 0.50<Y11/Y72<1.0. Therefore, the size of openings on the object side and image side of the imaging apparatus can be controlled for enhancing relative illumination and the symmetry of the photographing lens assembly so as to reduce aberrations.

When a focal length of the photographing lens assembly is f, and a composite focal length of the first lens element and the second lens element is f12, the following condition can be satisfied: −0.10<f/f12<0.35. Therefore, the refractive power of the photographing lens assembly can be balanced, which is favorable for featuring the photographing lens assembly with a wider field of view and compactness.

When a displacement in parallel with an optical axis from an axial vertex on the image-side surface of the sixth lens element to a non-axial critical point on the image-side surface of the sixth lens element is SAGc62, and a vertical distance between the non-axial critical point on the image-side surface of the sixth lens element and the optical axis is Yc62, all non-axial critical points on the image-side surface of the sixth lens element can satisfy the following condition: |SAGc62/Yc62|<0.10. By controlling the surface shape of the sixth lens element, the curvature of the lens element can be effectively controlled, so that the bulky volume of the imaging apparatus caused by the excessive space occupied by the lens element can be avoided. Moreover, the molding difficulty caused by an excessive curvature of the lens element can also be avoided.

When the focal length of the photographing lens assembly is f, and an entrance pupil diameter of the photographing lens assembly is EPD, the following condition can be satisfied: 0.80<f/EPD≤2.30. Therefore, the light amount received by the photographing lens assembly can be increased, so that the captured image can be clearer.

When the vertical distance between the non-axial critical point on the image-side surface of the sixth lens element and the optical axis is Yc62, and a vertical distance between a non-axial critical point on the image-side surface of the seventh lens element and the optical axis is Yc72, the following condition can be satisfied: 0.10<Yc62/Yc72<1.50. Therefore, aberrations of the off-axis region can be corrected, and the field curvature of the photographing lens assembly can be well controlled.

When the focal length of the photographing lens assembly is f, a curvature radius of an object-side surface of one of the lens elements of the photographing lens assembly is Rf, and a curvature radius of an image-side surface of the lens element of the photographing lens assembly is Rr, at least one of the lens elements (the first lens element to the seventh lens element) can satisfy the following condition: |f/Rf|+|f/Rr|<0.50. Therefore, the curvature of the lens element can be reduced, so that the lens element can be served as a correction lens for correcting aberrations. Preferably, the following condition can be satisfied: |f/Rf|+|f/Rr|<0.38.

When a curvature radius of the object-side surface of the first lens element is R1, and a curvature radius of the image-side surface of the first lens element is R2, the following condition can be satisfied: −1.80<(R1+R2)/(R1−R2). Therefore, the shape of the first lens element can be controlled, which can ensure that the incident angles of light rays on the surface of the lens element is proper, and the total reflection can be prevented. Preferably, the following condition can be satisfied: −1.0<(R1+R2)/(R1−R2)<8.0. More preferably, the following condition can be satisfied: 0<(R1+R2)/(R1−R2)<6.0. More preferably, the following condition can be satisfied: 0<(R1+R2)/(R1−R2)<2.50. More preferably, the following condition can be satisfied: 0<(R1+R2)/(R1−R2)<1.80.

When the maximum optical effective radius of the object-side surface of the first lens element is Y11, a maximum optical effective radius of the object-side surface of the second lens element is Y21, a maximum optical effective radius of the object-side surface of the third lens element is Y31, a maximum optical effective radius of the object-side surface of the fourth lens element is Y41, and a maximum optical effective radius of the object-side surface of the fifth lens element is Y51, the following conditions can be satisfied: Y11>Y21; Y11>Y31; Y11>Y41; and Y11>Y51. Therefore, the sizes of the lens elements can be controlled to ensure that a sufficient area of the first lens element can be provided to receive a larger range of light rays, so that the image brightness can be enhanced.

When the focal length of the photographing lens assembly is f, and the focal length of the first lens element is f1, the following condition can be satisfied: −0.30<f/f1<0.50. Therefore, the distribution of the refractive power of the photographing lens assembly can be balanced so as to effectively reduce the sensitivity.

When a central thickness of the fourth lens element is CT4, and a central thickness of the fifth lens element is CT5, the following condition can be satisfied: 0.10<CT4/CT5<0.85. Therefore, the central thicknesses of the fourth lens element and the fifth lens element can be balanced, so that deformation due to an excessively thin thickness or uneven molding due to an excessively thick thickness can be prevented. Preferably, the following condition can be satisfied: 0.10<CT4/CT5<0.65.

When an axial distance between the aperture stop and the image-side surface of the seventh lens element is SD, and an axial distance between the object-side surface of the first lens element and the image-side surface of the seventh lens element is TD, the following condition can be satisfied: 0.65<SD/TD<0.85. Therefore, the relative position of the aperture stop in the photographing lens assembly can be balanced, which is favorable for adjusting the relationship between the field of view and the total track length.

When the focal length of the photographing lens assembly is f, the focal length of the first lens element is f1, a focal length of the second lens element is f2, the focal length of the third lens element is f3, a focal length of the fourth lens element is f4, the focal length of the fifth lens element is f5, a focal length of the sixth lens element is f6, a focal length of the seventh lens element is f7, a focal length of i-th lens element is fi, and a minimum of values of |f/fi| is |f/f|min, the following condition can be satisfied: |f/f|min<0.10, wherein i=1–7. Therefore, the ability of the photographing lens assembly for correcting aberrations can be enhanced, which is favorable the balance of the aberrations.

When the focal length of the photographing lens assembly is f, and the maximum image height of the photographing lens assembly is ImgH, the following condition can be satisfied: 0.65<f/ImgH<1.0. Therefore, the photographing range of the photographing lens assembly can be effectively controlled to enlarge the field of view, and various usage requirements can be satisfied.

When the focal length of the photographing lens assembly is f, the focal length of the first lens element is f1, and the focal length of the second lens element is f2, the following condition can be satisfied: |f/f1|+|f/f2|<0.50. Therefore, excessive aberrations caused by too strong refractive power of a single lens element can be avoided. Meanwhile, the image quality can be enhanced. Preferably, the following condition can be satisfied: |f/f1|+|f/f2|<0.30.

Each of the aforementioned features of the photographing lens assembly can be utilized in numerous combinations, so as to achieve the corresponding functionality.

According to the present disclosure, the lens elements of the photographing lens assembly can be made of either glass or plastic material. When the lens elements are made of glass material, the refractive power distribution of the photographing lens assembly may be more flexible. The glass lens element can either be made by grinding or molding. When the lens elements are made of plastic material, the manufacturing cost can be effectively reduced. Furthermore, surfaces of each lens element can be arranged to be aspheric (ASP), which allows for more controllable variables for eliminating the aberration thereof, the required number of the lens elements can be decreased, and the total track length of the photographing lens assembly can be effectively reduced. The aspheric surfaces may be formed by plastic injection molding or glass molding.

According to the photographing lens assembly of the present disclosure, when a surface of a lens element is aspheric, it indicates that the complete optical effective area or a partial of the optical effective area of the surface of the lens element can be aspheric.

According to the photographing lens assembly of the present disclosure, each of an object-side surface and an image-side surface of a lens element has a paraxial region and an off-axis region. The paraxial region refers to the region of the surface where light rays travel close to the optical axis, and the off-axis region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the photographing lens assembly of the present disclosure, the refractive power of a lens element being positive or negative or the focal length of the lens element may refer to the refractive power or the focal length in the paraxial region of the lens element.

According to the photographing lens assembly of the present disclosure, the image surface, depending on the corresponding image sensor, can be a planar surface or a curved surface, particularly a curved surface being concave toward the object side. According to the photographing lens assembly of the present disclosure, at least one image correcting element (such as a field flattener) can be selectively disposed between a lens element closest to the image surface and the image surface so as to correct image aberrations (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface facing toward the object side and is disposed close to the image surface.

According to the photographing lens assembly of the present disclosure, the photographing lens assembly can include at least one stop, which can be disposed in front of the first lens element (i.e. between an imaged object and the first lens element), between any two lens elements or behind the last lens element (i.e. between the seventh lens element and the image surface). The stop can be a glare stop, a field stop, etc. Therefore, the stray light can be eliminated, and the image quality can be improved.

According to the photographing lens assembly of the present disclosure, an aperture stop can be configured as a front stop or a middle stop. A front stop is disposed between an imaged object and the first lens element, and a middle stop is disposed between the first lens element and the image surface. The front stop can provide a longer distance between an exit pupil of the photographing lens assembly and the image surface to enable a telecentric effect, and thereby can improve the image-sensing efficiency of an image sensor. The middle stop is favorable for enlarging the field of view of the photographing lens assembly and thereby provides a wider field of view for the same.

According to the photographing lens assembly of the present disclosure, a critical point is a non-axial point of the lens surface where its tangent is perpendicular to the optical axis.

According to the photographing lens assembly of the present disclosure, an inflection point is a point on a curve of a lens surface ranging from a paraxial region to an off-axis region of the lens surface where the center of curvature of the curve changes from the object side to the image side (or from the image side to the object side).

According to the photographing lens assembly of the present disclosure, the photographing lens assembly can be applied to 3D (three-dimensional) image capturing applications, in products such as digital cameras, mobile devices, digital tablets, smart TVs, network monitoring devices, motion sensing input devices, driving recorders, rear view camera systems, wearable devices, unmanned aerial vehicles, and other electronic imaging products.

According to the present disclosure, an imaging apparatus is provided. The imaging apparatus includes the aforementioned photographing lens assembly according to the present disclosure and an image sensor, wherein the image sensor is disposed on or near the image surface of the aforementioned photographing lens assembly. The photographing lens assembly is featured with a large field of view and a short total track length. Preferably, the imaging apparatus can further include a barrel member, a holder member or a combination thereof.

According to the present disclosure, an electronic device is provided, wherein the electronic device includes the aforementioned imaging apparatus. Therefore, it is favorable for enhancing the image quality. Besides the aforementioned imaging apparatus, the electronic device can further include another photographing lens set. The field of view of the photographing lens set is smaller than that of the photographing lens assembly of the imaging apparatus. The two lens sets (i.e., the photographing lens set and the photographing lens assembly of the imaging apparatus) can be connected by a processor to achieve the zoom effect. Preferably, the electronic device can further include, but not limited to, a control unit, a display, a storage unit, a random access memory unit (RAM) or a combination thereof.

According to the above description of the present disclosure, the following 1st-13th specific embodiments are provided for further explanation.

1st Embodiment

Figure 2:
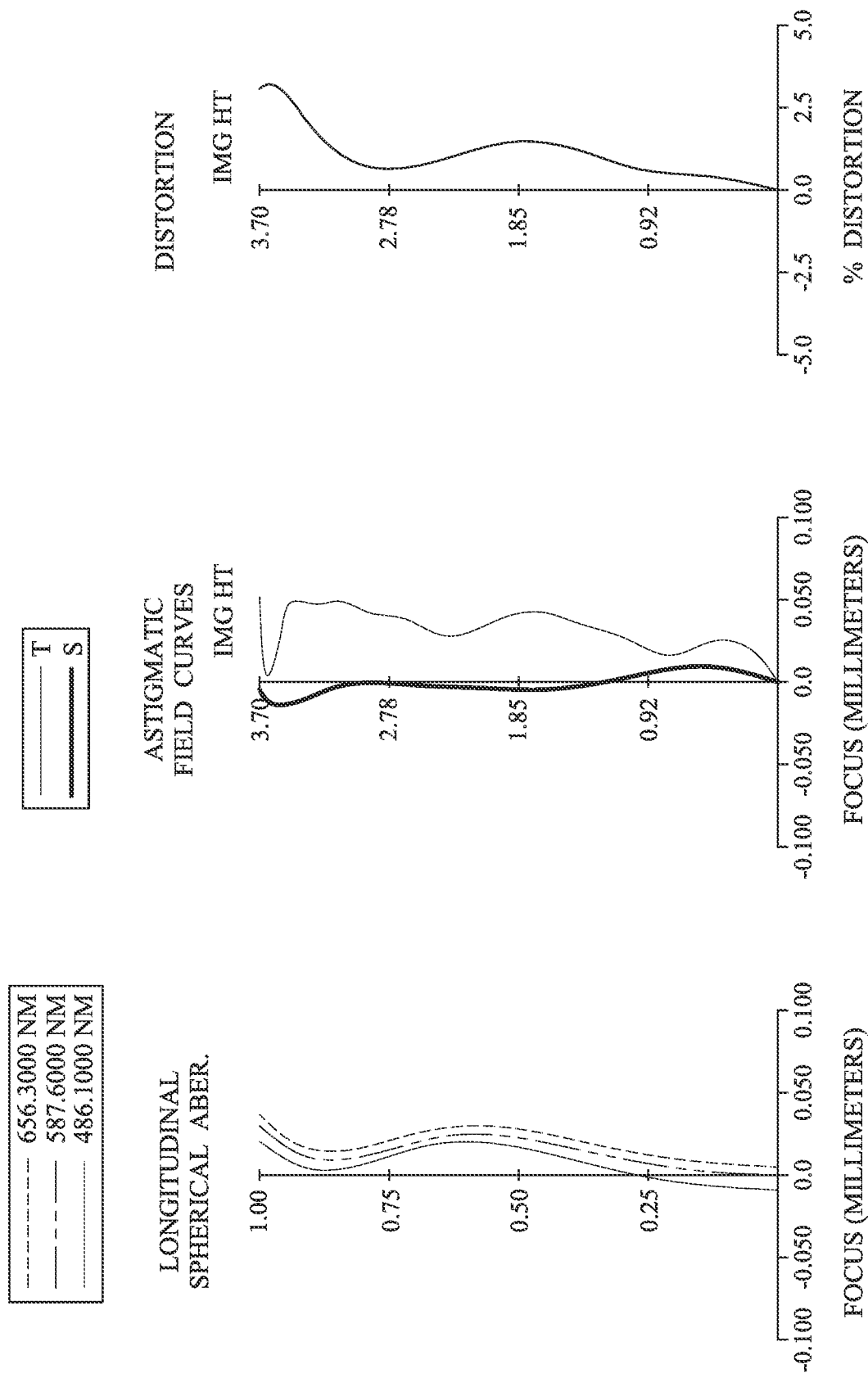
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes a photographing lens assembly (its reference numeral is omitted) and an image sensor 195. The photographing lens assembly includes, in order from an object side to an image side, a first lens element 110, a second lens element 120, an aperture stop 100, a third lens element 130, a fourth lens element 140, a fifth lens element 150, a sixth lens element 160, a seventh lens element 170, a filter 180 and an image surface 190. The image sensor 195 is disposed on the image surface 190 of the photographing lens assembly. The photographing lens assembly includes seven lens elements (110, 120, 130, 140, 150, 160 and 170) without additional one or more lens elements inserted between the first lens element 110 and the seventh lens element 170, and there is an air gap in a paraxial region between each of adjacent lens elements of the seven lens elements (110-170).

The first lens element 110 with positive refractive power has an object-side surface 111 being convex in a paraxial region thereof and an image-side surface 112 being convex in a paraxial region thereof. The first lens element 110 is made of a plastic material, and has the object-side surface 111 and the image-side surface 112 being both aspheric. Furthermore, the object-side surface 111 of the first lens element 110 includes at least one inflection point.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of a plastic material, and has the object-side surface 141 and the image-side surface 142 being both aspheric.

The fifth lens element 150 with positive refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric. Furthermore, each of the object-side surface 151 and the image-side surface 152 of the fifth lens element 150 includes at least one inflection point.

The sixth lens element 160 with negative refractive power has an object-side surface 161 being concave in a paraxial region thereof and an image-side surface 162 being convex in a paraxial region thereof. The sixth lens element 160 is made of a plastic material, and has the object-side surface 161 and the image-side surface 162 being both aspheric. Furthermore, each of the object-side surface 161 and the image-side surface 162 of the sixth lens element 160 includes at least one inflection point, and the image-side surface 162 of the sixth lens element 160 includes at least one convex shape in an off-axis region thereof.

The seventh lens element 170 with negative refractive power has an object-side surface 171 being convex in a paraxial region thereof and an image-side surface 172 being concave in a paraxial region thereof. The seventh lens element 170 is made of a plastic material, and has the object-side surface 171 and the image-side surface 172 being both aspheric. Furthermore, each of the object-side surface 171 and the image-side surface 172 of the seventh lens element 170 includes at least one inflection point, and the image-side surface 172 of the seventh lens element 170 includes at least one convex shape in an off-axis region thereof.

The filter 180 is made of a glass material and located between the seventh lens element 170 and the image surface 190, and will not affect the focal length of the photographing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing lens assembly according to the 1st embodiment, when a focal length of the photographing lens assembly is f, an f-number of the photographing lens assembly is Fno, and half of a maximum field of view of the photographing lens assembly is HFOV, these parameters have the following values: f=3.16 mm; Fno=2.10; and HFOV=48.5 degrees.

In the photographing lens assembly according to the 1st embodiment, when a maximum of refractive indexes of all the lens elements (i.e., the first lens element 110, the second lens element 120, the third lens element 130, the fourth lens element 140, the fifth lens element 150, the sixth lens element 160, and the seventh lens element 170) of the photographing lens assembly is Nmax (i.e., the refractive index of the second lens element 120 in the 1st embodiment), the following condition is satisfied: Nmax=1.669.

In the photographing lens assembly according to the 1st embodiment, when a central thickness of the fourth lens element 140 is CT4, and a central thickness of the fifth lens element 150 is CT5, the following condition is satisfied: CT4/CT5=0.33.

In the photographing lens assembly according to the 1st embodiment, when a curvature radius of the object-side surface 111 of the first lens element 110 is R1, a curvature radius of the image-side surface 112 of the first lens element 110 is R2, a curvature radius of the object-side surface 131 of the third lens element 130 is R5, a curvature radius of the image-side surface 132 of the third lens element 130 is R6, a curvature radius of the object-side surface 141 of the fourth lens element 140 is R7, and a curvature radius of the image-side surface 142 of the fourth lens element 140 is R8, the following conditions are satisfied: (R1+R2)/(R1−R2)=0.79; (R5+R6)/(R5−R6)=1.06; and (R7+R8)/(R7−R8)=3.19.

In the photographing lens assembly according to the 1st embodiment, when the focal length of the photographing lens assembly is f, a focal length of the first lens element 110 is f1, a composite focal length of the first lens element 110 and the second lens element 120 is f12, a focal length of the second lens element 120 is f2, a focal length of the third lens element 130 is f3, and a focal length of the fifth lens element 150 is f5, the following conditions are satisfied: f/f1=0.10; f/f12=0.08; |f3/f1|=0.08; |f5/f1|=0.07; and |f/f1|+|f/f2|=0.13.

In the photographing lens assembly according to the 1st embodiment, when the focal length of the photographing lens assembly is f, the focal length of the first lens element 110 is f1, the focal length of the second lens element 120 is f2, the focal length of the third lens element 130 is f3, a focal length of the fourth lens element 140 is f4, the focal length of the fifth lens element 150 is f5, a focal length of the sixth lens element 160 is f6, a focal length of the seventh lens element 170 is f7, a focal length of i-th lens element is fi, and a minimum of values of |f/fi| is |f/f|min, the following condition is satisfied: |f/f|min=0.03, wherein i=1-7 (that is, |f/fi|min is a minimum absolute value of a ratio between the focal length of the photographing lens assembly and the focal length of each lens element, and in the 1st embodiment, |f/fi|min=|f/f21|).

Figure 19:
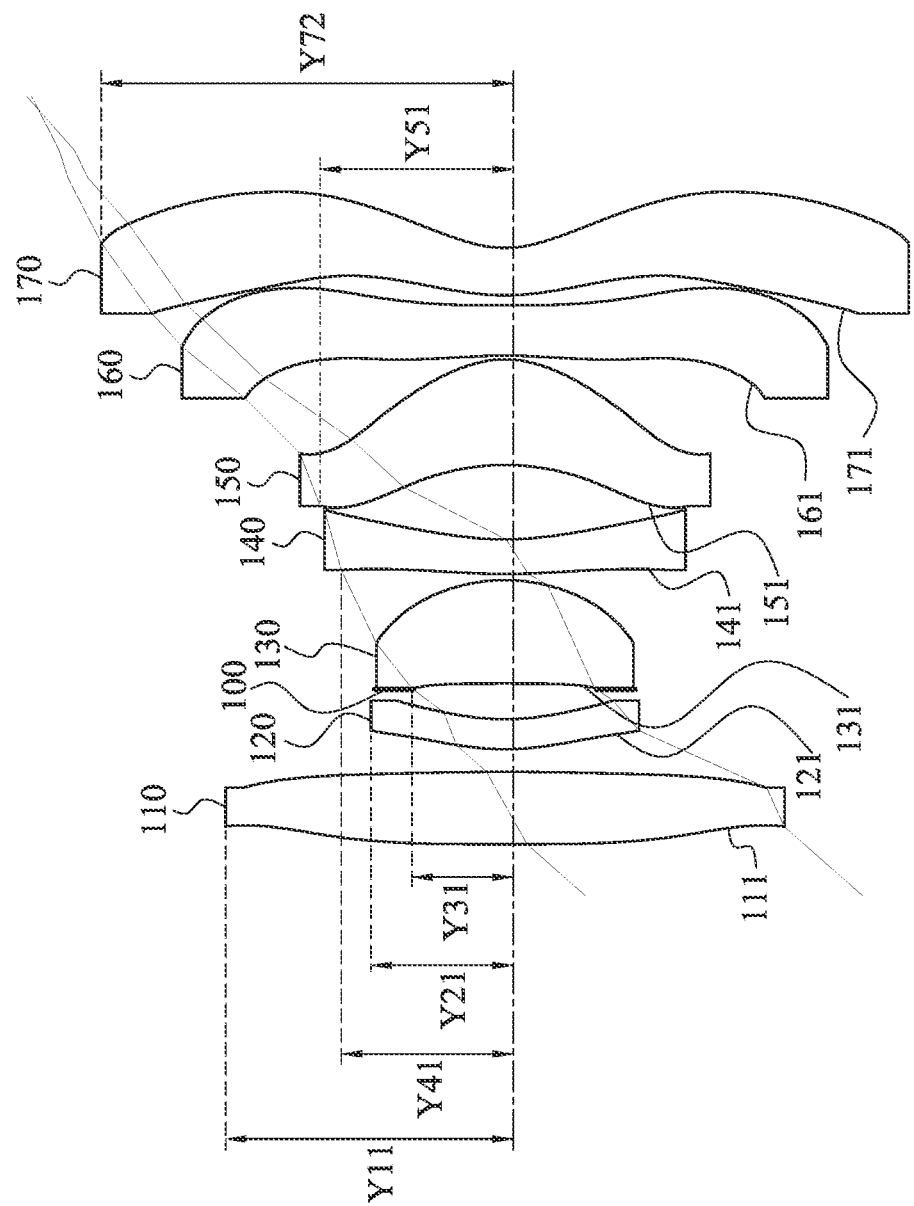
FIG. 19 is a schematic view showing parameters of Y11, Y21, Y31, Y41, Y51 and Y72 of the imaging apparatus according to the 1st embodiment in FIG. 1.

FIG. 19 is a schematic view showing parameters of Y11, Y21, Y31, Y41, Y51 and Y72 of the imaging apparatus according to the 1st embodiment in FIG. 1. In the photographing lens assembly according to the 1st embodiment, when a maximum optical effective radius of the object-side surface 111 of the first lens element 110 is Y11, and a maximum optical effective radius of the image-side surface 172 of the seventh lens element 170 is Y72, the following condition is satisfied: Y11/Y72=0.69.

In the photographing lens assembly according to the 1st embodiment, when an axial distance between the object-side surface 111 of the first lens element 110 and the image surface 190 is TL, a maximum image height of the photographing lens assembly is ImgH (i.e., half of a diagonal length of an effective photosensitive area of the image sensor 195), the focal length of the photographing lens assembly is f, and an entrance pupil diameter of the photographing lens assembly is EPD, the following conditions are satisfied: TL/ImgH=1.58; f/ImgH=0.86; and f/EPD=2.10.

In the photographing lens assembly according to the 1st embodiment, when an axial distance between the aperture stop 100 and the image-side surface 172 of the seventh lens element 170 is SD, and an axial distance between the object-side surface 111 of the first lens element 110 and the image-side surface 172 of the seventh lens element 170 is TD, the following condition is satisfied: SD/TD=0.74.

Figure 22:
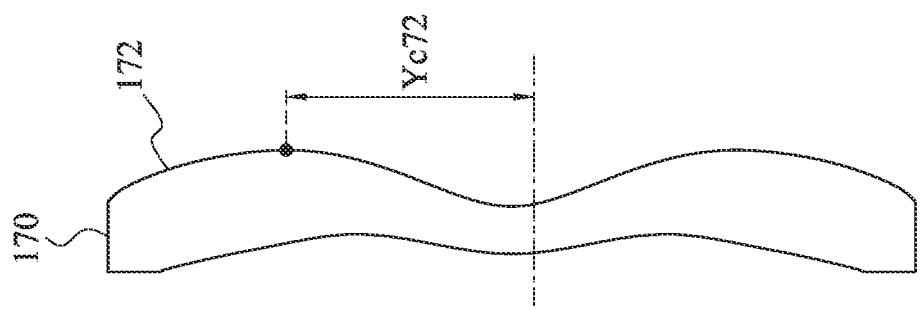
FIG. 22 is a schematic view showing a parameter of Yc72 of the imaging apparatus according to the 1st embodiment in FIG. 1.
Figure 21:
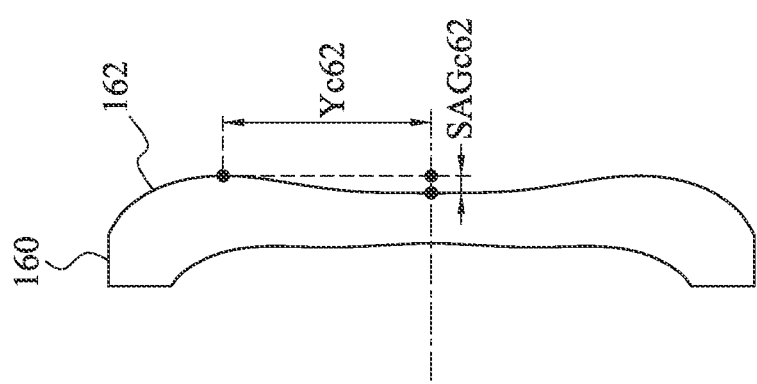
FIG. 21 is a schematic view showing parameters of SAGc62 and Yc62 of the imaging apparatus according to the 1st embodiment in FIG. 1.

Please refer to FIG. 21 and FIG. 22. FIG. 21 is a schematic view showing parameters of SAGc62 and Yc62 of the imaging apparatus according to the 1st embodiment in FIG. 1. FIG. 22 is a schematic view showing a parameter of Yc72 of the imaging apparatus according to the 1st embodiment in FIG. 1. The critical points and related parameters of other embodiments can refer to FIG. 21 and FIG. 22, and are not drawn according to each embodiment, respectively. In the photographing lens assembly according to the 1st embodiment, the image-side surface 162 of the sixth lens element 160 includes at least one critical point (as shown in FIG. 21), and the image-side surface 172 of the seventh lens element 170 includes at least one critical point (as shown in FIG. 22). When a vertical distance between the non-axial critical point on the image-side surface 162 of the sixth lens element 160 and the optical axis is Yc62, and a vertical distance between the non-axial critical point on the image-side surface 172 of the seventh lens element 170 and the optical axis is Yc72, the following conditions are satisfied: Yc62/Yc72=0.02 and 0.93, respectively (the image-side surface 162 of the sixth lens element 160 includes, in order from the optical axis to an off-axis region thereof, two critical points. Only one of the two critical points is labeled in FIG. 21.).

Please refer to FIG. 21, in the photographing lens assembly according to the 1st embodiment, when a displacement in parallel with the optical axis from an axial vertex on the image-side surface 162 of the sixth lens element 160 to the non-axial critical point on the image-side surface 162 of the sixth lens element 160 is SAGc62 (wherein the displacement towards the object side of the photographing lens assembly is negative, and the displacement towards the image side of the photographing lens assembly is positive), and the vertical distance between the non-axial critical point on the image-side surface 162 of the sixth lens element 160 and the optical axis is Yc62, all the non-axial critical points on the image-side surface 162 of the sixth lens element 160 satisfy the following conditions: |SAGc62/Yc62|=0.000 and 0.082, respectively (the image-side surface 162 of the sixth lens element 160 includes, in order from the optical axis to an off-axis region thereof, two critical points. Only one of the two critical points is labeled in FIG. 21.).

Figure 20:
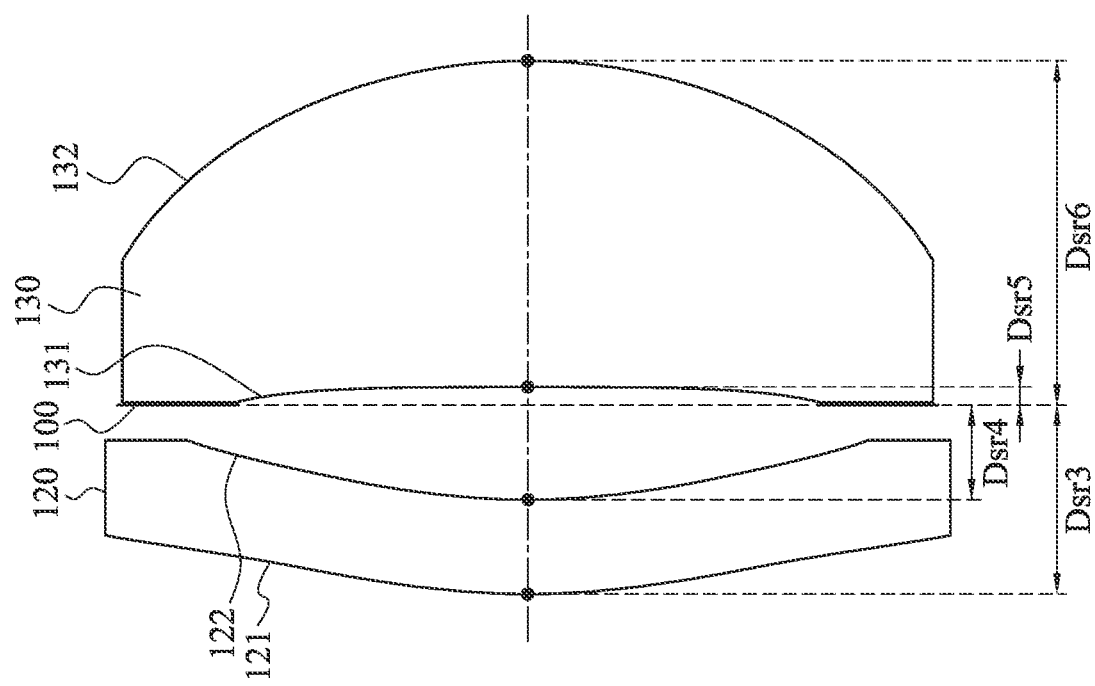
FIG. 20 is a schematic view showing parameters of Dsr3, Dsr4, Dsr5 and Dsr6 of the imaging apparatus according to the 1st embodiment in FIG. 1.

FIG. 20 is a schematic view showing parameters of Dsr3, Dsr4, Dsr5 and Dsr6 of the imaging apparatus according to the 1st embodiment in FIG. 1. In the photographing lens assembly according to the 1st embodiment, when an axial distance between the aperture stop 100 and the object-side surface 121 of the second lens element 120 is Dsr3 (if a central point of the aperture stop 100 is closer to the object side than an axial vertex on the object-side surface 121 of the second lens element 120 thereto, Dsr3 is positive; if the central point of the aperture stop 100 is closer to the image side than the axial vertex on the object-side surface 121 of the second lens element 120 thereto, Dsr3 is negative), an axial distance between the aperture stop 100 and the image-side surface 122 of the second lens element 120 is Dsr4 (if the central point of the aperture stop 100 is closer to the object side than an axial vertex on the image-side surface 122 of the second lens element 120 thereto, Dsr4 is positive; if the central point of the aperture stop 100 is closer to the image side than the axial vertex on the image-side surface 122 of the second lens element 120 thereto, Dsr4 is negative), an axial distance between the aperture stop 100 and the object-side surface 131 of the third lens element 130 is Dsr5 (if the central point of the aperture stop 100 is closer to the object side than an axial vertex on the object-side surface 131 of the third lens element 130 thereto, Dsr5 is positive; if the central point of the aperture stop 100 is closer to the image side than the axial vertex on the object-side surface 131 of the third lens element 130 thereto, Dsr5 is negative), and an axial distance between the aperture stop 100 and the image-side surface 132 of the third lens element 130 is Dsr6 (if the central point of the aperture stop 100 is closer to the object side than an axial vertex on the image-side surface 132 of the third lens element 130 thereto, Dsr6 is positive; if the central point of the aperture stop 100 is closer to the image side than the axial vertex on the image-side surface 132 of the third lens element 130 thereto, Dsr6 is negative), the following conditions are satisfied: |Dsr4/Dsr3|=0.50; and |Dsr5/Dsr6|=0.05.

In the photographing lens assembly according to the 1st embodiment, when the focal length of the photographing lens assembly is f, a curvature radius of an object-side surface of one of the lens elements of the photographing lens assembly is Rf, and a curvature radius of an image-side surface of the lens element of the photographing lens assembly is Rr, the value of the condition |f/Rf|+|f/Rr| corresponding to each of the first lens element 110 through the seventh lens element 170 is listed in the following table, wherein the curvature radius of the object-side surface 111 of the first lens element 110 is R1, the curvature radius of the image-side surface 112 of the first lens element 110 is R2, a curvature radius of the object-side surface 121 of the second lens element 120 is R3, a curvature radius of the image-side surface 122 of the second lens element 120 is R4, the curvature radius of the object-side surface 131 of the third lens element 130 is R5, the curvature radius of the image-side surface 132 of the third lens element 130 is R6, the curvature radius of the object-side surface 141 of the fourth lens element 140 is R7, the curvature radius of the image-side surface 142 of the fourth lens element 140 is R8, a curvature radius of the object-side surface 151 of the fifth lens element 150 is R9, a curvature radius of the image-side surface 152 of the fifth lens element 150 is R10, a curvature radius of the object-side surface 161 of the sixth lens element 160 is R11, a curvature radius of the image-side surface 162 of the sixth lens element 160 is R12, a curvature radius of the object-side surface 171 of the seventh lens element 170 is R13, and a curvature radius of the image-side surface 172 of the seventh lens element 170 is R14.

| 1st Embodiment | | | | | |
|---|---|---|---|---|---|
| |f/Rf| + |f/Rr| | |f/R1| + |f/R2| | 0.19 | |f/Rf| + |f/Rr| | |f/R9| + |f/R10| | 5.48 |
| | |f/R3| + |f/R4| | 3.24 | | |f/R11| + |f/R12| | 0.82 |
| | |f/R5| + |f/R6| | 2.32 | | |f/R13| + |f/R14| | 5.34 |
| | |f/R7| + |f/R8| | 2.05 | | | |

The detailed optical data of the 1st embodiment are shown in Table 1 and the aspheric surface data are shown in Table 2 below.

TABLE 1

1st Embodiment
f = 3.16 mm, Fno = 2.10, HFOV = 48.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 158.157 | ASP | 0.567 | Plastic | 1.534 | 55.9 | 31.71 |
| 2 | | −18.933 | ASP | 0.177 | | | | |
| 3 | Lens 2 | 2.025 | ASP | 0.234 | Plastic | 1.669 | 19.5 | −123.36 |
| 4 | | 1.885 | ASP | 0.235 | | | | |
| 5 | Ape. Stop | Plano | | 0.045 | | | | |
| 6 | Lens 3 | −45.644 | ASP | 0.809 | Plastic | 1.544 | 56.0 | 2.65 |
| 7 | | −1.408 | ASP | 0.047 | | | | |
| 8 | Lens 4 | 4.496 | ASP | 0.271 | Plastic | 1.660 | 20.4 | −7.86 |
| 9 | | 2.351 | ASP | 0.583 | | | | |
| 10 | Lens 5 | −1.942 | ASP | 0.826 | Plastic | 1.544 | 56.0 | 2.08 |
| 11 | | −0.822 | ASP | 0.030 | | | | |
| 12 | Lens 6 | −3.885 | ASP | 0.394 | Plastic | 1.582 | 30.2 | −6.69 |
| 13 | | −1435.341 | ASP | 0.077 | | | | |
| 14 | Lens 7 | 1.974 | ASP | 0.370 | Plastic | 1.544 | 56.0 | −3.08 |
| 15 | | 0.846 | ASP | 0.550 | | | | |
| 16 | Filter | Plano | | 0.210 | Glass | 1.517 | 64.2 | — |
| 17 | | Plano | | 0.423 | | | | |
| 18 | Image | Plano | | — | | | | |

Reference wavelength is 587.6 nm (d-line).

TABLE 2

| Aspheric Coefficients | | | | | | | |
|---|---|---|---|---|---|---|---|
| Surface # | 1 | 2 | 3 | 4 | 6 | 7 | 8 |
| k = | 2.0000E+01 | −6.1139E+01 | −7.0690E+00 | −5.1105E+00 | −9.8569E+01 | −9.3470E−01 | −2.4926E+00 |
| A4 = | 2.7873E−02 | 1.4104E−02 | −2.5131E−02 | −2.7004E−02 | −7.0216E−02 | −6.7755E−02 | −1.3797E−01 |
| A6 = | −8.7744E−03 | −7.3079E−03 | −1.0386E−01 | −5.9461E−02 | −4.1366E−02 | 8.7265E−02 | 1.6648E−01 |
| A8 = | 2.8793E−03 | 1.5474E−03 | 4.9355E−02 | −2.2357E−02 | −7.0742E−02 | −3.4976E−01 | −2.0573E−01 |
| A10 = | −8.1547E−04 | −2.3336E−04 | 5.1236E−02 | 1.5098E−01 | −5.0884E−02 | 4.0691E−01 | 1.6818E−01 |
| A12 = | 1.0569E−04 | 1.5712E−05 | −2.6645E−02 | | | −2.0630E−01 | −7.3799E−02 |
| A14 = | −4.9960E−06 | | | | | | 1.3190E−02 |

TABLE 2-continued

| Surface # | 9 | 10 | 11 | 12 | 13 | 14 | 15 |
|---|---|---|---|---|---|---|---|
| k = | −9.7020E+00 | −3.2095E+00 | −3.6697E+00 | 1.8923E+00 | −9.7199E+01 | −4.1236E+00 | −4.1385E+00 |
| A4 = | −6.7612E−02 | −1.1572E−01 | −2.4088E−01 | 1.7159E−01 | 1.2326E−01 | −9.0466E−02 | −7.0944E−02 |
| A6 = | 9.1266E−02 | 8.0259E−02 | 3.2143E−01 | −5.2320E−02 | −8.6529E−02 | 1.7272E−02 | 2.7213E−02 |
| A8 = | −8.6679E−02 | −2.0530E−02 | −3.2025E−01 | −3.7240E−02 | 3.0478E−02 | −3.0195E−03 | −9.0703E−03 |
| A10 = | 5.2329E−02 | 5.7096E−02 | 1.9662E−01 | 3.8657E−02 | −6.6829E−03 | 1.3086E−03 | 2.0066E−03 |
| A12 = | −1.7163E−02 | −5.2832E−02 | −5.9078E−02 | −1.4824E−02 | 8.6325E−04 | −3.3174E−04 | −2.5708E−04 |
| A14 = | 2.3952E−03 | 1.8739E−02 | 7.1682E−03 | 2.7197E−03 | −5.6235E−05 | 3.6770E−05 | 1.7240E−05 |
| A16 = | | −2.3637E−03 | −1.2583E−04 | −1.9656E−04 | 1.1825E−06 | −1.4895E−06 | −4.6900E−07 |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Furthermore, in the photographing lens assembly according to the 1st embodiment, two lens elements of the first lens element 110, the second lens element 120, the third lens element 130, the fourth lens element 140, the fifth lens element 150, the sixth lens element 160, and the seventh lens element 170 have the Abbe numbers less than 25.0, which are the second lens element 120 and the fourth lens element 140.

Please refer to FIG. 19. In the photographing lens assembly according to the 1st embodiment, when the maximum optical effective radius of the object-side surface 111 of the first lens element 110 is Y11, a maximum optical effective radius of the object-side surface 121 of the second lens element 120 is Y21, a maximum optical effective radius of the object-side surface 131 of the third lens element 130 is Y31, a maximum optical effective radius of the object-side surface 141 of the fourth lens element 140 is Y41, and a maximum optical effective radius of the object-side surface 151 of the fifth lens element 150 is Y51, the following conditions are satisfied: Y11>Y21; Y11>Y31; Y11>Y41; and Y11>Y51.

2nd Embodiment

Figure 3:
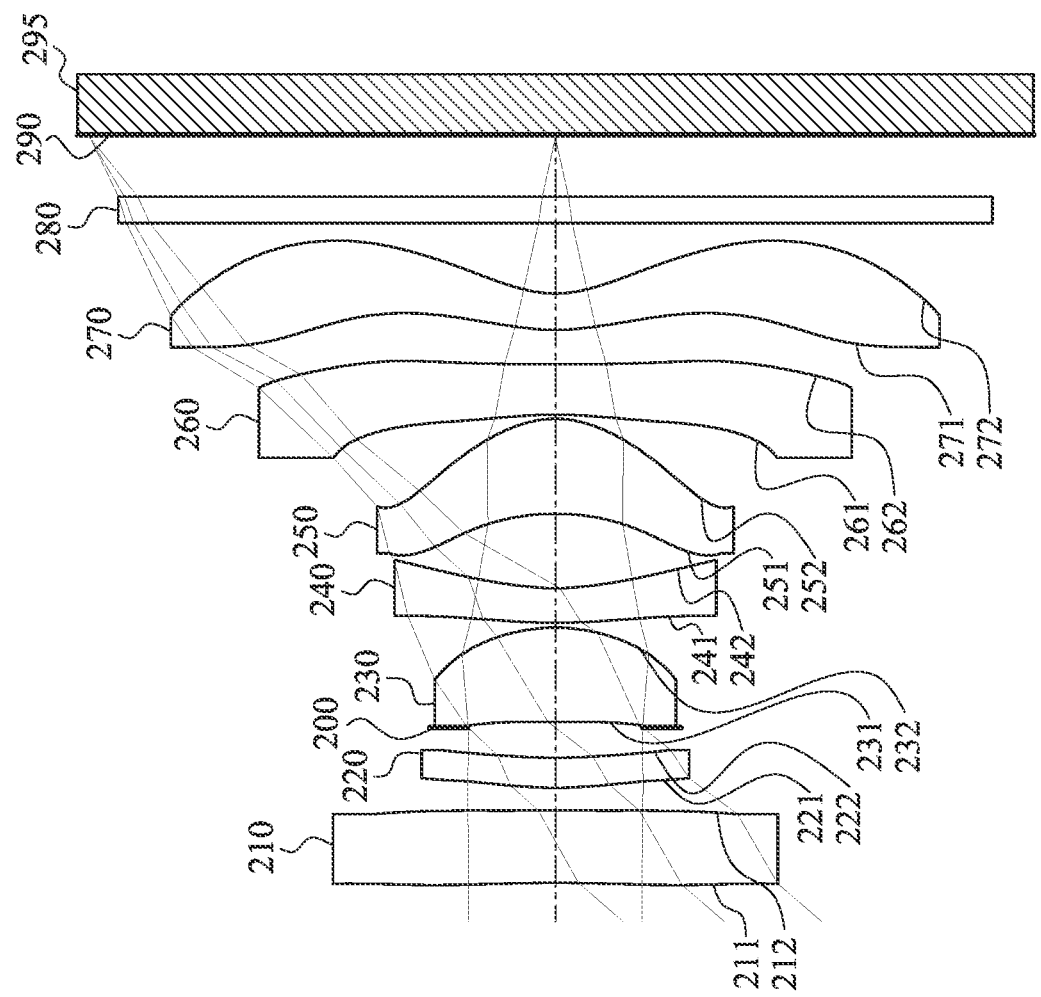
FIG. 3 is a schematic view of an imaging apparatus according to the 2nd embodiment of the present disclosure.
Figure 4:
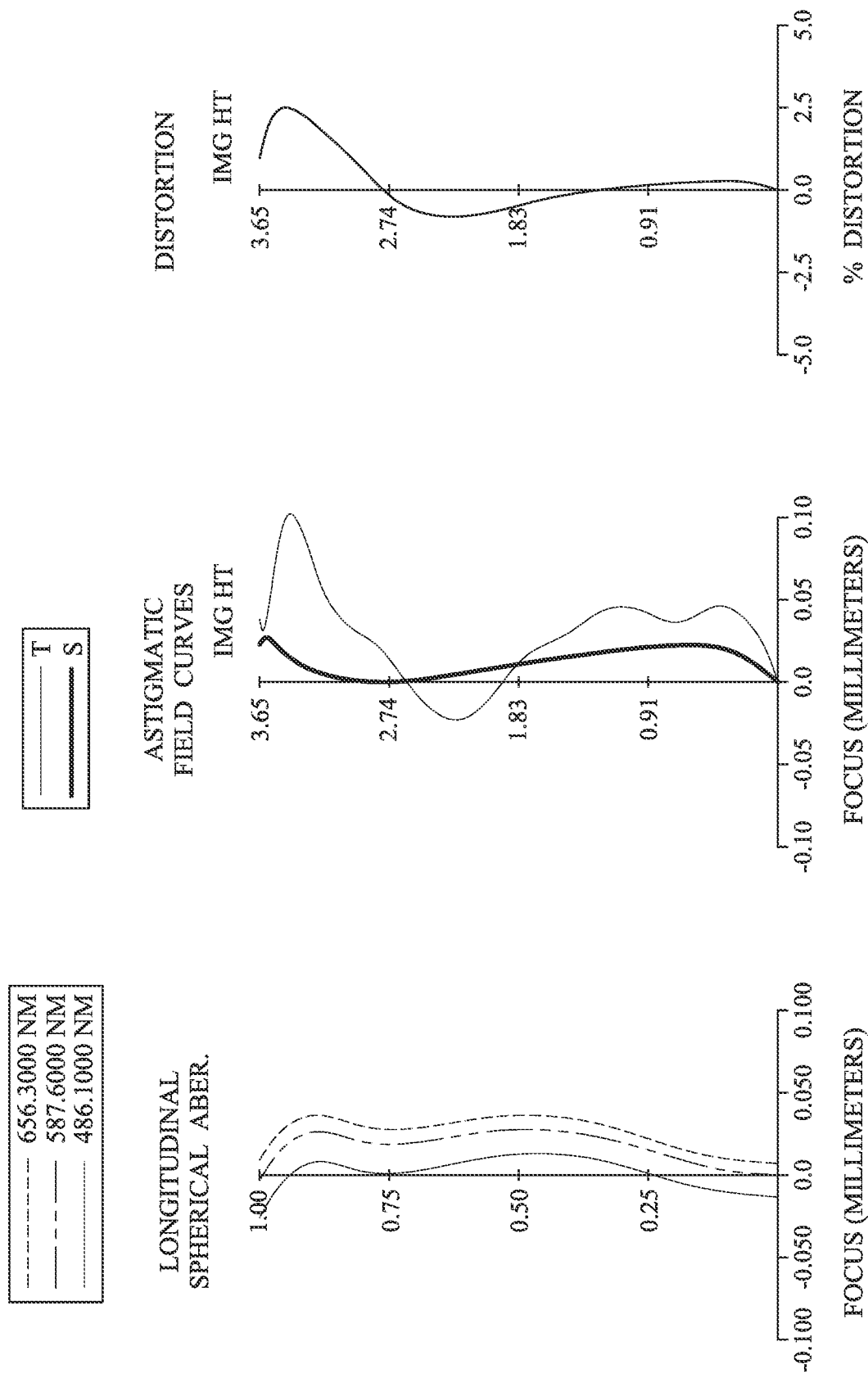
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes a photographing lens assembly (its reference numeral is omitted) and an image sensor 295. The photographing lens assembly includes, in order from an object side to an image side, a first lens element 210, a second lens element 220, an aperture stop 200, a third lens element 230, a fourth lens element 240, a fifth lens element 250, a sixth lens element 260, a seventh lens element 270, a filter 280 and an image surface 290. The image sensor 295 is disposed on the image surface 290 of the photographing lens assembly. The photographing lens assembly includes seven lens elements (210, 220, 230, 240, 250, 260 and 270) without additional one or more lens elements inserted between the first lens element 210 and the seventh lens element 270, and there is an air gap in a paraxial region between each of adjacent lens elements of the seven lens elements (210-270).

The first lens element 210 with negative refractive power has an object-side surface 211 being concave in a paraxial region thereof and an image-side surface 212 being convex in a paraxial region thereof. The first lens element 210 is made of a plastic material, and has the object-side surface 211 and the image-side surface 212 being both aspheric. Furthermore, each of the object-side surface 211 and the image-side surface 212 of the first lens element 210 includes at least one inflection point.

The second lens element 220 with positive refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with positive refractive power has an object-side surface 231 being concave in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of a plastic material, and has the object-side surface 241 and the image-side surface 242 being both aspheric.

The fifth lens element 250 with positive refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric. Furthermore, each of the object-side surface 251 and the image-side surface 252 of the fifth lens element 250 includes at least one inflection point.

The sixth lens element 260 with negative refractive power has an object-side surface 261 being concave in a paraxial region thereof and an image-side surface 262 being convex in a paraxial region thereof. The sixth lens element 260 is made of a plastic material, and has the object-side surface 261 and the image-side surface 262 being both aspheric. Furthermore, each of the object-side surface 261 and the image-side surface 262 of the sixth lens element 260 includes at least one inflection point, and the image-side surface 262 of the sixth lens element 260 includes at least one convex shape in an off-axis region thereof.

The seventh lens element 270 with negative refractive power has an object-side surface 271 being convex in a paraxial region thereof and an image-side surface 272 being concave in a paraxial region thereof. The seventh lens element 270 is made of a plastic material, and has the object-side surface 271 and the image-side surface 272 being both aspheric. Furthermore, each of the object-side surface 271 and the image-side surface 272 of the seventh lens element 270 includes at least one inflection point, and the image-side surface 272 of the seventh lens element 270 includes at least one convex shape in an off-axis region thereof.

The filter 280 is made of a glass material and located between the seventh lens element 270 and the image surface 290, and will not affect the focal length of the photographing lens assembly.

The detailed optical data of the 2nd embodiment are shown in Table 3 and the aspheric surface data are shown in Table 4 below.

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.12 | $|f/f1| + |f/f2|$ | 0.25 |
| Fno. | 2.30 | $|f/fi|/min$ | 0.08 |
| HFOV [deg.] | 49.2 | Y11/Y72 | 0.58 |
| Nmax | 1.669 | TL/ImgH | 1.60 |
| CT4/CT5 | 0.36 | f/ImgH | 0.85 |

TABLE 3

2nd Embodiment
f = 3.12 mm, Fno = 2.30, HFOV = 49.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −10.455 | ASP | 0.567 | Plastic | 1.534 | 55.9 | −36.76 |
| 2 | | −22.800 | ASP | 0.177 | | | | |
| 3 | Lens 2 | 3.605 | ASP | 0.235 | Plastic | 1.669 | 19.5 | 18.78 |
| 4 | | 4.925 | ASP | 0.235 | | | | |
| 5 | Ape. Stop | Plano | | 0.045 | | | | |
| 6 | Lens 3 | −45.613 | ASP | 0.737 | Plastic | 1.544 | 56.0 | 2.65 |
| 7 | | −1.408 | ASP | 0.037 | | | | |
| 8 | Lens 4 | 4.217 | ASP | 0.271 | Plastic | 1.660 | 20.4 | −6.21 |
| 9 | | 2.025 | ASP | 0.583 | | | | |
| 10 | Lens 5 | −1.932 | ASP | 0.742 | Plastic | 1.544 | 56.0 | 1.99 |
| 11 | | −0.788 | ASP | 0.032 | | | | |
| 12 | Lens 6 | −3.229 | ASP | 0.394 | Plastic | 1.582 | 30.2 | −5.55 |
| 13 | | −9077.218 | ASP | 0.269 | | | | |
| 14 | Lens 7 | 1.936 | ASP | 0.283 | Plastic | 1.544 | 56.0 | −3.26 |
| 15 | | 0.878 | ASP | 0.550 | | | | |
| 16 | Filter | Plano | | 0.210 | Glass | 1.517 | 64.2 | — |
| 17 | | Plano | | 0.481 | | | | |
| 18 | Image | Plano | | — | | | | |

Reference wavelength is 587.6 nm (d-line).

TABLE 4

Aspheric Coefficients

| Surface # | 1 | 2 | 3 | 4 | 6 | 7 | 8 |
|---|---|---|---|---|---|---|---|
| k = | −2.4653E+01 | −6.1316E+01 | −7.0729E+00 | −5.1057E+00 | −9.8569E+01 | −9.3688E−01 | −2.5305E+00 |
| A4 = | 4.0920E−02 | 6.1030E−02 | −5.0886E−03 | −3.1072E−03 | −6.0179E−02 | 5.0482E−03 | −1.0167E−01 |
| A6 = | −1.6993E−02 | −7.0710E−02 | −1.5482E−01 | −1.6211E−01 | −7.3118E−02 | −1.7671E−01 | 6.0455E−02 |
| A8 = | 6.4816E−03 | 3.3260E−02 | 7.2983E−02 | 1.9260E−01 | −7.2839E−02 | 1.9012E−01 | −3.3531E−02 |
| A10 = | −2.4547E−03 | −8.6303E−03 | 6.9565E−02 | −3.8814E−02 | −7.0862E−02 | −1.8841E−01 | 2.5211E−02 |
| A12 = | 4.3491E−04 | 1.2154E−03 | −3.7959E−02 | | | 2.9148E−02 | −1.8248E−02 |
| A14 = | −1.6554E−05 | | | | | | 5.5491E−03 |

| Surface # | 9 | 10 | 11 | 12 | 13 | 14 | 15 |
|---|---|---|---|---|---|---|---|
| k = | −8.3658E+00 | −3.2055E+00 | −3.8467E+00 | 1.8942E+00 | −9.7199E+01 | −5.7316E+00 | −4.1385E+00 |
| A4 = | −6.7642E−02 | −1.8424E−01 | −3.9248E−01 | 1.6992E−01 | 6.1043E−02 | −1.2456E−01 | −8.4247E−02 |
| A6 = | 9.1711E−02 | 1.5291E−01 | 6.2726E−01 | −4.5392E−02 | −5.1420E−02 | 5.9353E−02 | 3.5328E−02 |
| A8 = | −8.7922E−02 | −8.3009E−02 | −7.4175E−01 | −8.6726E−02 | 1.4121E−01 | −2.1154E−02 | −1.1041E−02 |
| A10 = | 5.3739E−02 | 1.1961E−01 | 5.2700E−01 | 9.5655E−02 | −1.0385E−03 | 4.8139E−03 | 2.1873E−03 |
| A12 = | −1.7873E−02 | −8.4433E−02 | −1.8046E−01 | −4.3475E−02 | −2.4058E−04 | −6.2599E−04 | −2.6003E−04 |
| A14 = | 2.5271E−03 | 2.7156E−02 | 2.3110E−02 | 9.7742E−03 | 5.3404E−05 | 4.2626E−05 | 1.6853E−05 |
| A16 = | | −3.4967E−03 | 3.0233E−04 | −8.9610E−04 | −3.1744E−06 | −1.1859E−06 | −4.5698E−07 |

-continued

| 2nd Embodiment | | | |
|---|---|---|---|
| (R1 + R2)/(R1 − R2) | −2.69 | f/EPD | 2.30 |
| (R5 + R6)/(R5 − R6) | 1.06 | SD/TD | 0.74 |
| (R7 + R8)/(R7 − R8) | 2.85 | Yc62/Yc72 | 0.68 |
| f/f1 | −0.08 | \|SAGc62/Yc62\| | 0.022 |
| f/f12 | 0.08 | \|Dsr4/Dsr3\| | 0.50 |
| \|f3/f1\| | 0.07 | \|Dsr5/Dsr6\| | 0.06 |
| \|f5/f1\| | 0.05 | | |

In the photographing lens assembly according to the 2nd embodiment, when the focal length of the photographing lens assembly is f, a curvature radius of an object-side surface of one of the lens elements of the photographing lens assembly is Rf, and a curvature radius of an image-side surface of the lens element of the photographing lens assembly is Rr, the value of the condition |f/Rf|+|f/Rr| corresponding to each of the first lens element 210 through the seventh lens element 270 is listed in the following table, wherein term definitions of the parameters related to each surface of the lens elements are the same as those of the 1st embodiment. Therefore, an explanation in this regard will not be provided again.

| 2nd Embodiment | | | |
|---|---|---|---|
| \|f/Rf\| + \|f/Rr\| | \|f/R1\| + \|f/R2\| 0.44 | \|f/Rf\| + \|f/Rr\| | \|f/R9\| + \|f/R10\| 5.57 |
| | \|f/R3\| + \|f/R4\| 1.50 | | \|f/R11\| + \|f/R12\| 0.97 |
| | \|f/R5\| + \|f/R6\| 2.28 | | \|f/R13\| + \|f/R14\| 5.16 |
| | \|f/R7\| + \|f/R8\| 2.28 | | |

Furthermore, in the photographing lens assembly according to the 2nd embodiment, two lens elements of the first lens element 210, the second lens element 220, the third lens element 230, the fourth lens element 240, the fifth lens element 250, the sixth lens element 260, and the seventh lens element 270 have the Abbe numbers less than 25.0, which are the second lens element 220 and the fourth lens element 240.

In the photographing lens assembly according to the 2nd embodiment, when a maximum optical effective radius of the object-side surface 211 of the first lens element 210 is Y11, a maximum optical effective radius of the object-side surface 221 of the second lens element 220 is Y21, a maximum optical effective radius of the object-side surface 231 of the third lens element 230 is Y31, a maximum optical effective radius of the object-side surface 241 of the fourth lens element 240 is Y41, and a maximum optical effective radius of the object-side surface 251 of the fifth lens element 250 is Y51, the following conditions are satisfied: Y11>Y21; Y11>Y31; Y11>Y41; and Y11>Y51.

3rd Embodiment

Figure 5:
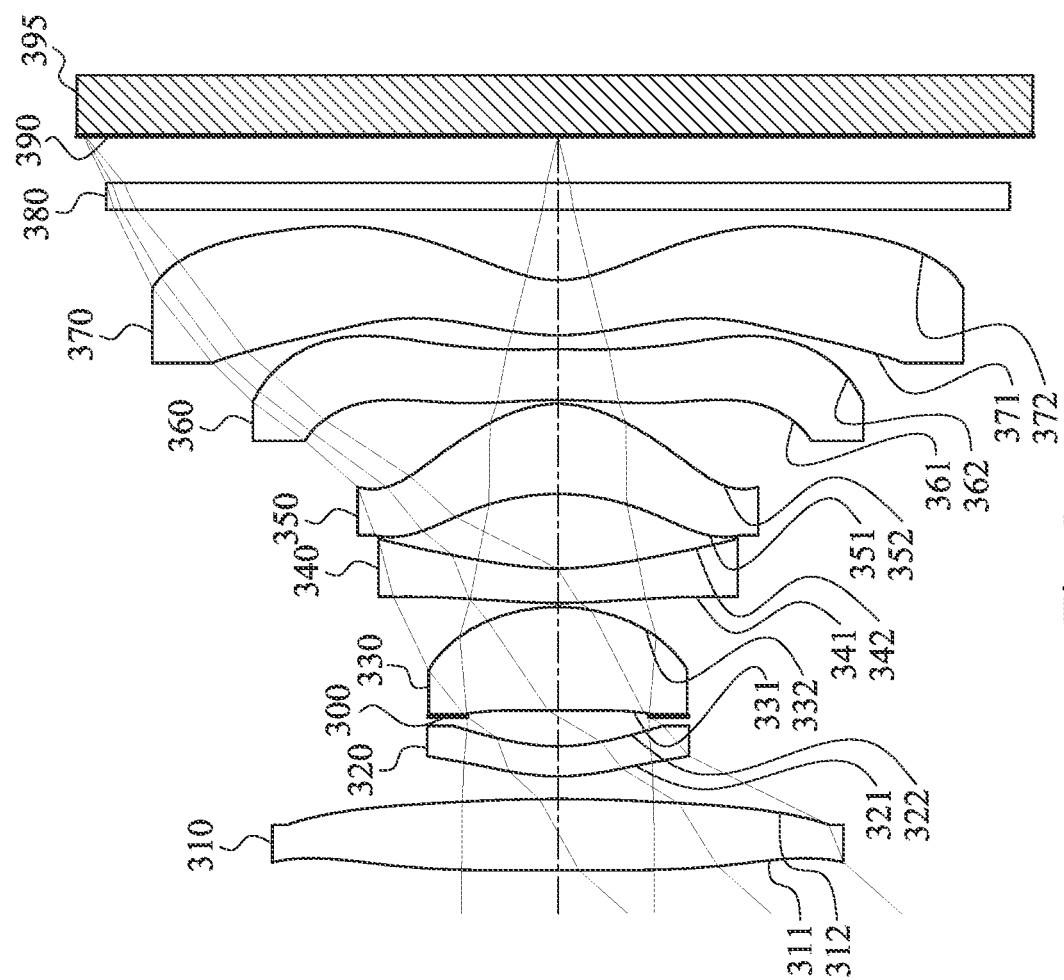
FIG. 5 is a schematic view of an imaging apparatus according to the 3rd embodiment of the present disclosure.
Figure 6:
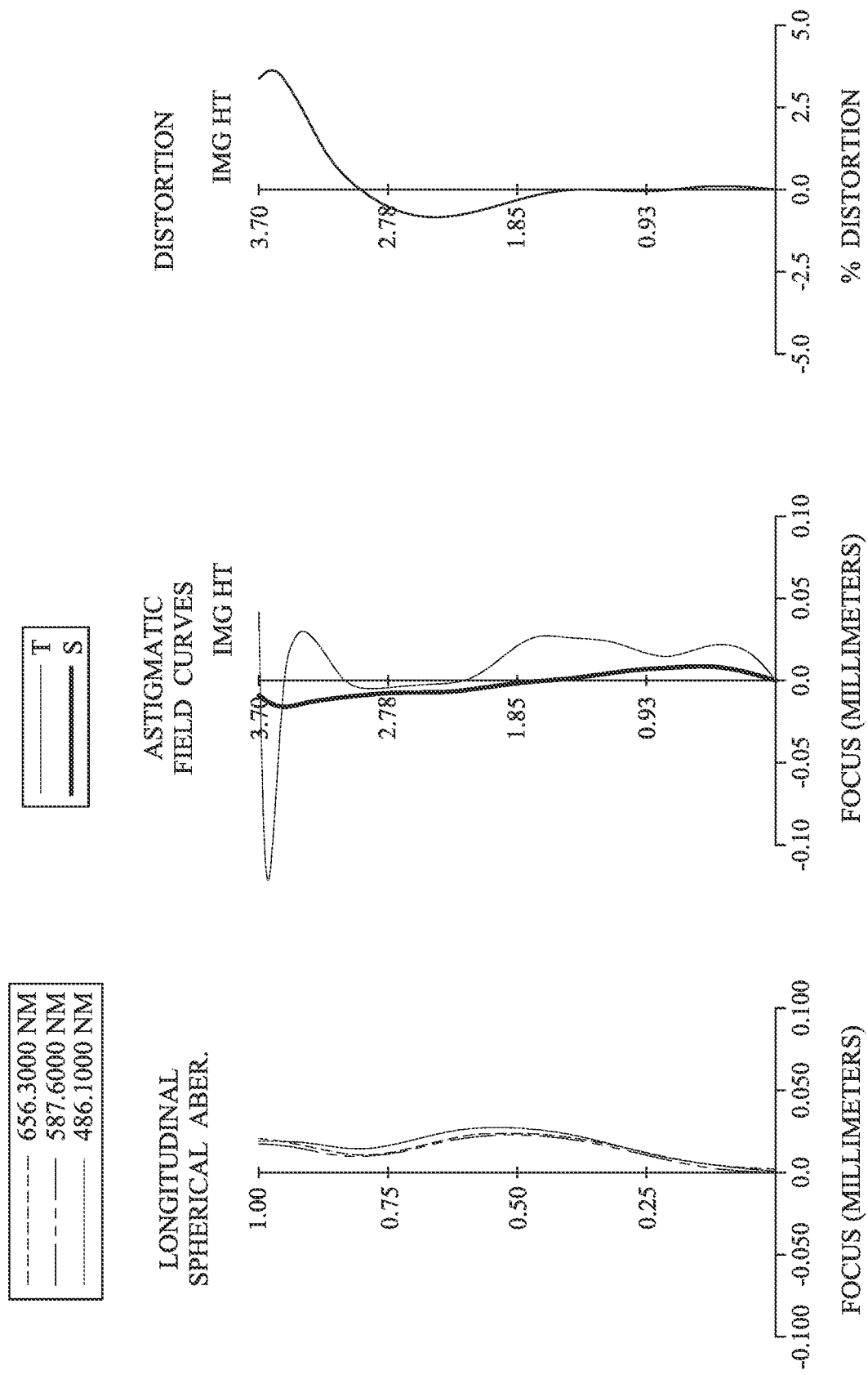
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes a photographing lens assembly (its reference numeral is omitted) and an image sensor 395. The photographing lens assembly includes, in order from an object side to an image side, a first lens element 310, a second lens element 320, an aperture stop 300, a third lens element 330, a fourth lens element 340, a fifth lens element 350, a sixth lens element 360, a seventh lens element 370, a filter 380 and an image surface 390. The image sensor 395 is disposed on the image surface 390 of the photographing lens assembly. The photographing lens assembly includes seven lens elements (310, 320, 330, 340, 350, 360 and 370) without additional one or more lens elements inserted between the first lens element 310 and the seventh lens element 370, and there is an air gap in a paraxial region between each of adjacent lens elements of the seven lens elements (310-370).

The first lens element 310 with positive refractive power has an object-side surface 311 being concave in a paraxial region thereof and an image-side surface 312 being convex in a paraxial region thereof. The first lens element 310 is made of a plastic material, and has the object-side surface 311 and the image-side surface 312 being both aspheric. Furthermore, the object-side surface 311 of the first lens element 310 includes at least one inflection point.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of a glass material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric. Furthermore, each of the object-side surface 351 and the image-side surface 352 of the fifth lens element 350 includes at least one inflection point.

The sixth lens element 360 with negative refractive power has an object-side surface 361 being concave in a paraxial region thereof and an image-side surface 362 being convex in a paraxial region thereof. The sixth lens element 360 is made of a plastic material, and has the object-side surface 361 and the image-side surface 362 being both aspheric. Furthermore, each of the object-side surface 361 and the image-side surface 362 of the sixth lens element 360 includes at least one inflection point, and the image-side surface 362 of the sixth lens element 360 includes at least one convex shape in an off-axis region thereof.

The seventh lens element 370 with negative refractive power has an object-side surface 371 being convex in a paraxial region thereof and an image-side surface 372 being concave in a paraxial region thereof. The seventh lens element 370 is made of a plastic material, and has the object-side surface 371 and the image-side surface 372 being both aspheric. Furthermore, each of the object-side surface 371 and the image-side surface 372 of the seventh lens element 370 includes at least one inflection point, and the image-side surface 372 of the seventh lens element 370 includes at least one convex shape in an off-axis region thereof.

The filter 380 is made of a glass material and located between the seventh lens element 370 and the image surface 390, and will not affect the focal length of the photographing lens assembly.

The detailed optical data of the 3rd embodiment are shown in Table 5 and the aspheric surface data are shown in Table 6 below.

| 3rd Embodiment | | | |
|---|---|---|---|
| f [mm] | 3.16 | $|f/f1| + |f/f2|$ | 0.21 |
| Fno. | 2.10 | $|f/fi|min$ | 0.08 |
| HFOV [deg.] | 48.4 | Y11/Y72 | 0.70 |
| Nmax | 1.669 | TL/ImgH | 1.55 |
| CT4/CT5 | 0.38 | f/ImgH | 0.85 |
| (R1 + R2)/(R1 − R2) | 1.53 | f/EPD | 2.10 |
| (R5 + R6)/(R5 − R6) | 0.95 | SD/TD | 0.74 |

TABLE 5

3rd Embodiment
f = 3.16 mm, Fno = 2.10, HFOV = 48.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −49.325 | ASP | 0.558 | Plastic | 1.534 | 55.9 | 24.51 |
| 2 | | −10.382 | ASP | 0.177 | | | | |
| 3 | Lens 2 | 1.755 | ASP | 0.234 | Plastic | 1.669 | 19.5 | −39.58 |
| 4 | | 1.558 | ASP | 0.235 | | | | |
| 5 | Ape. Stop | Plano | | 0.045 | | | | |
| 6 | Lens 3 | 53.419 | ASP | 0.810 | Glass | 1.540 | 59.7 | 2.63 |
| 7 | | −1.453 | ASP | 0.030 | | | | |
| 8 | Lens 4 | 4.450 | ASP | 0.271 | Plastic | 1.660 | 20.4 | −8.01 |
| 9 | | 2.357 | ASP | 0.583 | | | | |
| 10 | Lens 5 | −1.924 | ASP | 0.706 | Plastic | 1.544 | 56.0 | 2.25 |
| 11 | | −0.846 | ASP | 0.030 | | | | |
| 12 | Lens 6 | −3.794 | ASP | 0.394 | Plastic | 1.634 | 23.8 | −7.14 |
| 13 | | −24.446 | ASP | 0.112 | | | | |
| 14 | Lens 7 | 1.974 | ASP | 0.430 | Plastic | 1.544 | 56.0 | −3.08 |
| 15 | | 0.837 | ASP | 0.550 | | | | |
| 16 | Filter | Plano | | 0.210 | Glass | 1.517 | 64.2 | — |
| 17 | | Plano | | 0.368 | | | | |
| 18 | Image | Plano | | — | | | | |

Reference wavelength is 587.6 nm (d-line).

TABLE 6

Aspheric Coefficients

| Surface # | 1 | 2 | 3 | 4 | 6 | 7 | 8 |
|---|---|---|---|---|---|---|---|
| k = | 2.0000E+01 | −3.8715E+01 | −7.0690E+00 | −5.1105E+00 | −3.8715E+01 | −9.3470E−01 | −2.4926E+00 |
| A4 = | 3.3738E−02 | 1.4858E−02 | −1.1324E−02 | −1.3987E−02 | −7.2828E−02 | −5.3670E−02 | −1.2255E−01 |
| A6 = | −1.2960E−02 | −7.6377E−03 | −1.5783E−01 | −1.1240E−01 | −1.3601E−01 | 2.7671E−02 | 1.3388E−01 |
| A8 = | 4.0308E−03 | 1.5201E−03 | 1.3132E−01 | 6.6394E−02 | −1.6633E−01 | −2.2267E−01 | −1.5527E−01 |
| A10 = | −1.0065E−03 | −1.9485E−04 | −1.0980E−02 | 8.9283E−02 | 2.5881E−02 | 2.7489E−01 | 1.2900E−01 |
| A12 = | 1.2818E−04 | 1.1300E−05 | −6.1983E−03 | | | −1.5725E−01 | −5.9155E−02 |
| A14 = | −6.2496E−06 | | | | | | 1.1076E−02 |

| Surface # | 9 | 10 | 11 | 12 | 13 | 14 | 15 |
|---|---|---|---|---|---|---|---|
| k = | −9.2478E+00 | −3.2095E+00 | −3.7826E+00 | 1.8923E+00 | −3.8715E+01 | −7.3601E+00 | −4.1385E+00 |
| A4 = | −6.7612E−02 | −1.2943E−01 | −2.4191E−01 | 2.2639E−01 | 1.5239E−01 | −6.8036E−02 | −7.5500E−02 |
| A6 = | 9.1266E−02 | 1.1902E−01 | 3.4385E−01 | −1.1808E−01 | −1.1226E−01 | −1.1967E−03 | 2.7808E−02 |
| A8 = | −8.6679E−02 | −6.7130E−02 | −3.5096E−01 | 6.1122E−03 | 4.2195E−02 | 4.8684E−03 | −8.9527E−03 |
| A10 = | 5.2329E−02 | 8.1411E−02 | 2.2176E−01 | 2.2085E−02 | −1.0017E−02 | −4.2592E−04 | 1.9838E−03 |
| A12 = | −1.7163E−02 | −5.7365E−02 | −6.8650E−02 | −1.1499E−02 | 1.4031E−03 | −1.3749E−04 | −2.5620E−04 |
| A14 = | 2.3952E−03 | 1.8801E−02 | 8.6083E−03 | 2.4407E−03 | −9.9111E−05 | 2.7045E−05 | 1.7240E−05 |
| A16 = | | −2.3718E−03 | −1.6689E−04 | −1.9477E−04 | 2.2598E−06 | −1.3639E−06 | −4.6900E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

-continued

| 3rd Embodiment | | | |
|---|---|---|---|
| (R7 + R8)/(R7 − R8) | 3.25 | Yc62/Yc72 | 0.16, 0.88 |
| f/f1 | 0.13 | |SAGc62/Yc62| | 0.003, 0.071 |
| f/f12 | 0.06 | |Dsr4/Dsr3| | 0.50 |
| |f3/f1| | 0.11 | |Dsr5/Dsr6| | 0.05 |
| |f5/f1| | 0.09 | | |

In the photographing lens assembly according to the 3rd embodiment, when the focal length of the photographing lens assembly is f, a curvature radius of an object-side surface of one of the lens elements of the photographing lens assembly is Rf, and a curvature radius of an image-side surface of the lens element of the photographing lens assembly is Rr, the value of the condition |f/Rf|+|f/Rr| corresponding to each of the first lens element 310 through the seventh lens element 370 is listed in the following table, wherein term definitions of the parameters related to each surface of the lens elements are the same as those of the 1st embodiment. Therefore, an explanation in this regard will not be provided again.

| 3rd Embodiment | | | |
|---|---|---|---|
| |f/Rf| + |f/Rr| | |f/R1| + |f/R2| 0.37 | |f/Rf| + |f/Rr| | |f/R9| + |f/R10| 5.38 |
| | |f/R3| + |f/R4| 3.83 | | |f/R11| + |f/R12| 0.96 |
| | |f/R5| + |f/R6| 2.23 | | |f/R13| + |f/R14| 5.38 |
| | |f/R7| + |f/R8| 2.05 | | |

Furthermore, in the photographing lens assembly according to the 3rd embodiment, three lens elements of the first lens element 310, the second lens element 320, the third lens element 330, the fourth lens element 340, the fifth lens element 350, the sixth lens element 360, and the seventh lens element 370 have the Abbe numbers less than 25.0, which are the second lens element 320, the fourth lens element 340 and the sixth lens element 360.

In the photographing lens assembly according to the 3nd embodiment, when a maximum optical effective radius of the object-side surface 311 of the first lens element 310 is Y11, a maximum optical effective radius of the object-side surface 321 of the second lens element 320 is Y21, a maximum optical effective radius of the object-side surface 331 of the third lens element 330 is Y31, a maximum optical effective radius of the object-side surface 341 of the fourth lens element 340 is Y41, and a maximum optical effective radius of the object-side surface 351 of the fifth lens element 350 is Y51, the following conditions are satisfied: Y11>Y21; Y11>Y31; Y11>Y41; and Y11>Y51.

4th Embodiment

Figure 7:
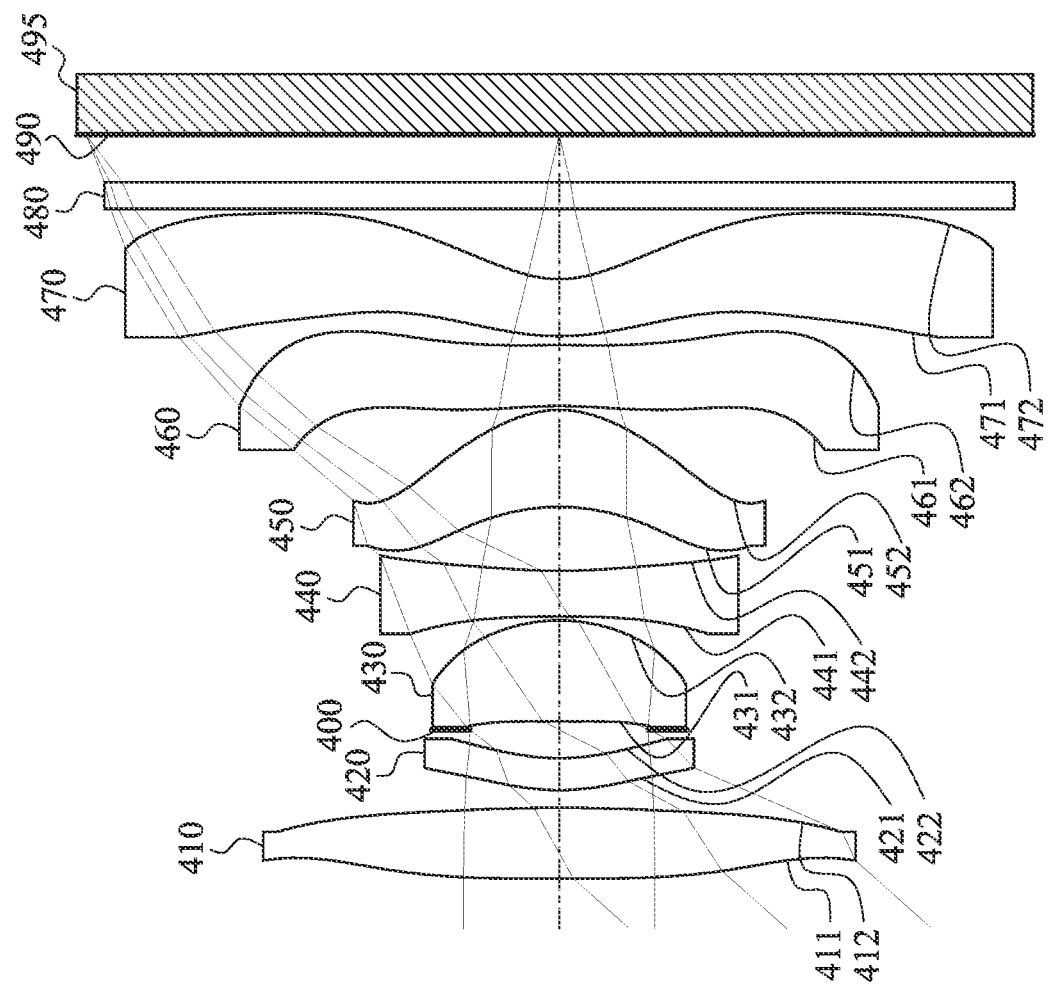
FIG. 7 is a schematic view of an imaging apparatus according to the 4th embodiment of the present disclosure.
Figure 8:
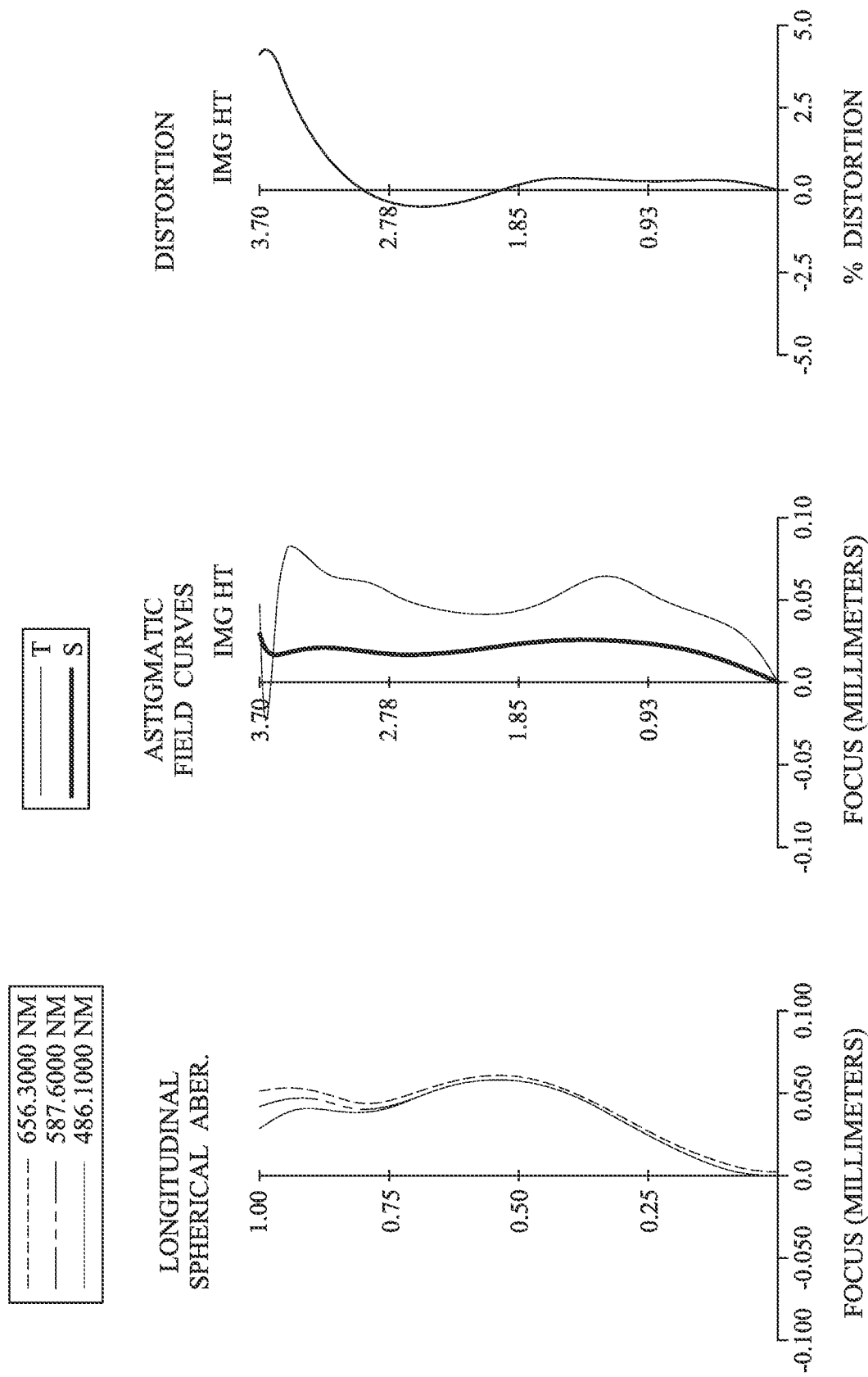
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes a photographing lens assembly (its reference numeral is omitted) and an image sensor 495. The photographing lens assembly includes, in order from an object side to an image side, a first lens element 410, a second lens element 420, an aperture stop 400, a third lens element 430, a fourth lens element 440, a fifth lens element 450, a sixth lens element 460, a seventh lens element 470, a filter 480 and an image surface 490. The image sensor 495 is disposed on the image surface 490 of the photographing lens assembly. The photographing lens assembly includes seven lens elements (410, 420, 430, 440, 450, 460 and 470) without additional one or more lens elements inserted between the first lens element 410 and the seventh lens element 470, and there is an air gap in a paraxial region between each of adjacent lens elements of the seven lens elements (410-470).

The first lens element 410 with positive refractive power has an object-side surface 411 being convex in a paraxial region thereof and an image-side surface 412 being convex in a paraxial region thereof. The first lens element 410 is made of a plastic material, and has the object-side surface 411 and the image-side surface 412 being both aspheric. Furthermore, the object-side surface 411 of the first lens element 410 includes at least one inflection point.

The second lens element 420 with positive refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being concave in a paraxial region thereof and an image-side surface 432 being convex in a paraxial region thereof. The third lens element 430 is made of a glass material, and has the object-side surface 431 and the image-side surface 432 being both aspheric.

The fourth lens element 440 with negative refractive power has an object-side surface 441 being concave in a paraxial region thereof and an image-side surface 442 being concave in a paraxial region thereof. The fourth lens element 440 is made of a plastic material, and has the object-side surface 441 and the image-side surface 442 being both aspheric.

The fifth lens element 450 with positive refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric. Furthermore, each of the object-side surface 451 and the image-side surface 452 of the fifth lens element 450 includes at least one inflection point.

The sixth lens element 460 with negative refractive power has an object-side surface 461 being concave in a paraxial region thereof and an image-side surface 462 being convex in a paraxial region thereof. The sixth lens element 460 is made of a plastic material, and has the object-side surface 461 and the image-side surface 462 being both aspheric. Furthermore, each of the object-side surface 461 and the image-side surface 462 of the sixth lens element 460 includes at least one inflection point, and the image-side surface 462 of the sixth lens element 460 includes at least one convex shape in an off-axis region thereof.

The seventh lens element 470 with negative refractive power has an object-side surface 471 being convex in a paraxial region thereof and an image-side surface 472 being concave in a paraxial region thereof. The seventh lens element 470 is made of a plastic material, and has the object-side surface 471 and the image-side surface 472 being both aspheric. Furthermore, each of the object-side surface 471 and the image-side surface 472 of the seventh lens element 470 includes at least one inflection point, and the image-side surface 472 of the seventh lens element 470 includes at least one convex shape in an off-axis region thereof.

The filter 480 is made of a glass material and located between the seventh lens element 470 and the image surface 490, and will not affect the focal length of the photographing lens assembly.

The detailed optical data of the 4th embodiment are shown in Table 7 and the aspheric surface data are shown in Table 8 below.

TABLE 7

4th Embodiment
f = 3.14 mm, Fno = 2.10, HFOV = 48.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 90.074 | ASP | 0.556 | Plastic | 1.534 | 55.9 | 20.11 |
| 2 | | −12.159 | ASP | 0.138 | | | | |
| 3 | Lens 2 | 1.816 | ASP | 0.249 | Plastic | 1.669 | 19.5 | 415.21 |
| 4 | | 1.728 | ASP | 0.223 | | | | |
| 5 | Ape. Stop | Plano | | 0.066 | | | | |
| 6 | Lens 3 | −50.946 | ASP | 0.790 | Glass | 1.583 | 46.5 | 2.32 |
| 7 | | −1.324 | ASP | 0.030 | | | | |
| 8 | Lens 4 | −11.343 | ASP | 0.357 | Plastic | 1.660 | 20.4 | −4.89 |
| 9 | | 4.560 | ASP | 0.500 | | | | |
| 10 | Lens 5 | −1.802 | ASP | 0.759 | Plastic | 1.544 | 56.0 | 2.18 |
| 11 | | −0.822 | ASP | 0.031 | | | | |
| 12 | Lens 6 | −3.599 | ASP | 0.476 | Plastic | 1.634 | 23.8 | −7.10 |
| 13 | | −18.907 | ASP | 0.069 | | | | |
| 14 | Lens 7 | 1.978 | ASP | 0.446 | Plastic | 1.544 | 56.0 | −3.18 |
| 15 | | 0.850 | ASP | 0.550 | | | | |
| 16 | Filter | Plano | | 0.210 | Glass | 1.517 | 64.2 | — |
| 17 | | Plano | | 0.370 | | | | |
| 18 | Image | Plano | | — | | | | |

Reference wavelength is 587.6 nm (d-line).

TABLE 8

Aspheric Coefficients

| Surface # | 1 | 2 | 3 | 4 | 6 | 7 | 8 |
|---|---|---|---|---|---|---|---|
| k = | 8.1690E+00 | −3.8715E+01 | −6.4959E+00 | −5.1467E+00 | 2.0000E+01 | −9.9424E−01 | −2.9357E+01 |
| A4 = | 3.3315E−02 | 1.1991E−02 | −4.9351E−03 | 1.9128E−03 | −7.9186E−02 | 2.8048E−02 | −2.9600E−02 |
| A6 = | −1.2578E−02 | −4.7974E−03 | −1.2953E−01 | −1.8222E−01 | −1.4299E−01 | −2.3453E−01 | −6.6380E−02 |
| A8 = | 4.3032E−03 | 6.1850E−04 | 7.6930E−02 | 1.9095E−01 | −1.8732E−01 | 1.3326E−01 | 1.3860E−02 |
| A10 = | −1.1687E−03 | −6.5396E−05 | 2.6382E−02 | −1.0178E−02 | −1.8226E−02 | 4.0098E−02 | 1.1755E−01 |
| A12 = | 1.5297E−04 | 5.3852E−06 | −1.5962E−02 | | | −1.0827E−01 | −1.1708E−01 |
| A14 = | −7.2084E−06 | | | | | | 3.3426E−02 |

| Surface # | 9 | 10 | 11 | 12 | 13 | 14 | 15 |
|---|---|---|---|---|---|---|---|
| k = | −1.5943E+01 | −3.3480E+00 | −3.6671E+00 | 1.1487E+00 | 4.2983E+00 | −5.6779E+00 | −3.9712E+00 |
| A4 = | −7.2926E−02 | −1.5935E−01 | −2.4404E−01 | 2.2469E−01 | 1.2960E−01 | −4.8126E−02 | −5.5367E−02 |
| A6 = | 8.2725E−02 | 1.8207E−01 | 3.4067E−01 | −1.5068E−01 | −8.6263E−02 | −1.0478E−03 | 1.8756E−02 |
| A8 = | −8.7103E−02 | −1.4047E−01 | −3.7959E−01 | 6.1084E−02 | 3.1468E−02 | 2.8707E−03 | −5.7901E−03 |
| A10 = | 7.1128E−02 | 1.3808E−01 | 2.8263E−01 | −1.5882E−02 | −7.6575E−03 | −3.0623E−04 | 1.1951E−03 |
| A12 = | −2.9881E−02 | −7.9949E−02 | −1.1673E−01 | 2.3693E−03 | 1.1761E−03 | −3.3588E−05 | −1.3887E−04 |
| A14 = | 4.7723E−03 | 2.2157E−02 | 2.5021E−02 | −1.7144E−04 | −1.0228E−04 | 7.2345E−06 | 8.2301E−06 |
| A16 = | | −2.3585E−03 | −2.1991E−03 | 3.5257E−06 | 3.7347E−06 | −3.2260E−07 | −1.9443E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.14 | |f/f1| + |f/f2| | 0.16 |
| Fno. | 2.10 | |f/fi|min | 0.01 |
| HFOV [deg.] | 48.3 | Y11/Y72 | 0.68 |
| Nmax | 1.669 | TL/ImgH | 1.57 |
| CT4/CT5 | 0.47 | f/ImgH | 0.85 |
| (R1 + R2)/(R1 − R2) | 0.76 | f/EPD | 2.10 |
| (R5 + R6)/(R5 − R6) | 1.05 | SD/TD | 0.75 |
| (R7 + R8)/(R7 − R8) | 0.43 | Yc62/Yc72 | 0.17, 0.79 |
| f/f1 | 0.16 | |SAGc62/Yc62| | 0.004, 0.066 |
| f/f12 | 0.17 | |Dsr4/Dsr3| | 0.47 |
| |f3/f1| | 0.12 | |Dsr5/Dsr6| | 0.08 |
| |f5/f1| | 0.11 | | |

In the photographing lens assembly according to the 4th embodiment, when the focal length of the photographing lens assembly is f, a curvature radius of an object-side surface of one of the lens elements of the photographing lens assembly is Rf, and a curvature radius of an image-side surface of the lens element of the photographing lens assembly is Rr, the value of the condition |f/Rf|+|f/Rr| corresponding to each of the first lens element 410 through the seventh lens element 470 is listed in the following table, wherein term definitions of the parameters related to each surface of the lens elements are the same as those of the 1st embodiment. Therefore, an explanation in this regard will not be provided again.

| 4th Embodiment | | | |
|---|---|---|---|
| \|f/Rf\| + \|f/Rr\| \|f/R1\| + \|f/R2\| | 0.29 | \|f/Rf\| + \|f/Rr\| \|f/R9\| + \|f/R10\| | 5.57 |
| \|f/R3\| + \|f/R4\| | 3.55 | \|f/R11\| + \|f/R12\| | 1.04 |
| \|f/R5\| + \|f/R6\| | 2.43 | \|f/R13\| + \|f/R14\| | 5.29 |
| \|f/R7\| + \|f/R8\| | 0.97 | | |

Furthermore, in the photographing lens assembly according to the 4th embodiment, three lens elements of the first lens element 410, the second lens element 420, the third lens element 430, the fourth lens element 440, the fifth lens element 450, the sixth lens element 460, and the seventh lens element 470 have the Abbe numbers less than 25.0, which are the second lens element 420, the fourth lens element 440 and the sixth lens element 460.

In the photographing lens assembly according to the 4th embodiment, when a maximum optical effective radius of the object-side surface 411 of the first lens element 410 is Y11, a maximum optical effective radius of the object-side surface 421 of the second lens element 420 is Y21, a maximum optical effective radius of the object-side surface 431 of the third lens element 430 is Y31, a maximum optical effective radius of the object-side surface 441 of the fourth lens element 440 is Y41, and a maximum optical effective radius of the object-side surface 451 of the fifth lens element 450 is Y51, the following conditions are satisfied: Y11>Y21; Y11>Y31; Y11>Y41; and Y11>Y51.

5th Embodiment

Figure 9:
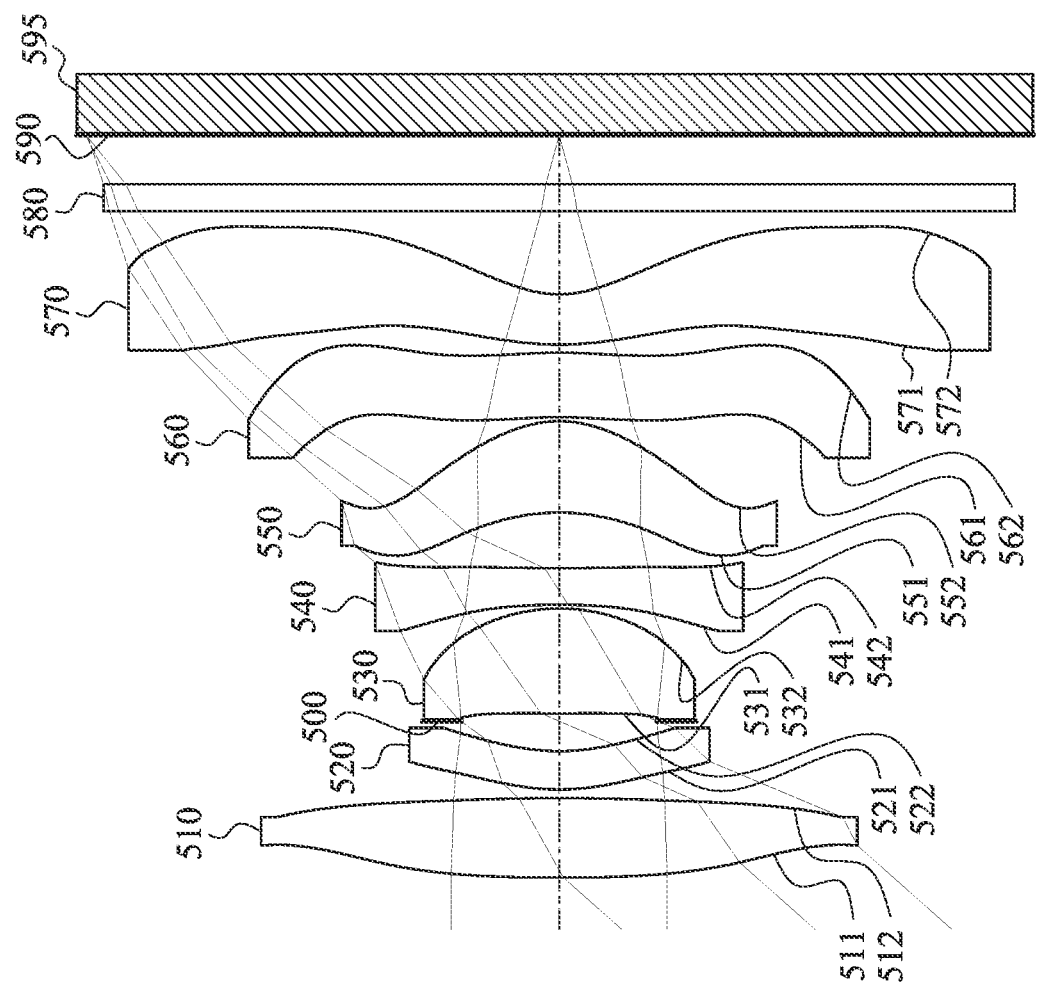
FIG. 9 is a schematic view of an imaging apparatus according to the 5th embodiment of the present disclosure.
Figure 10:
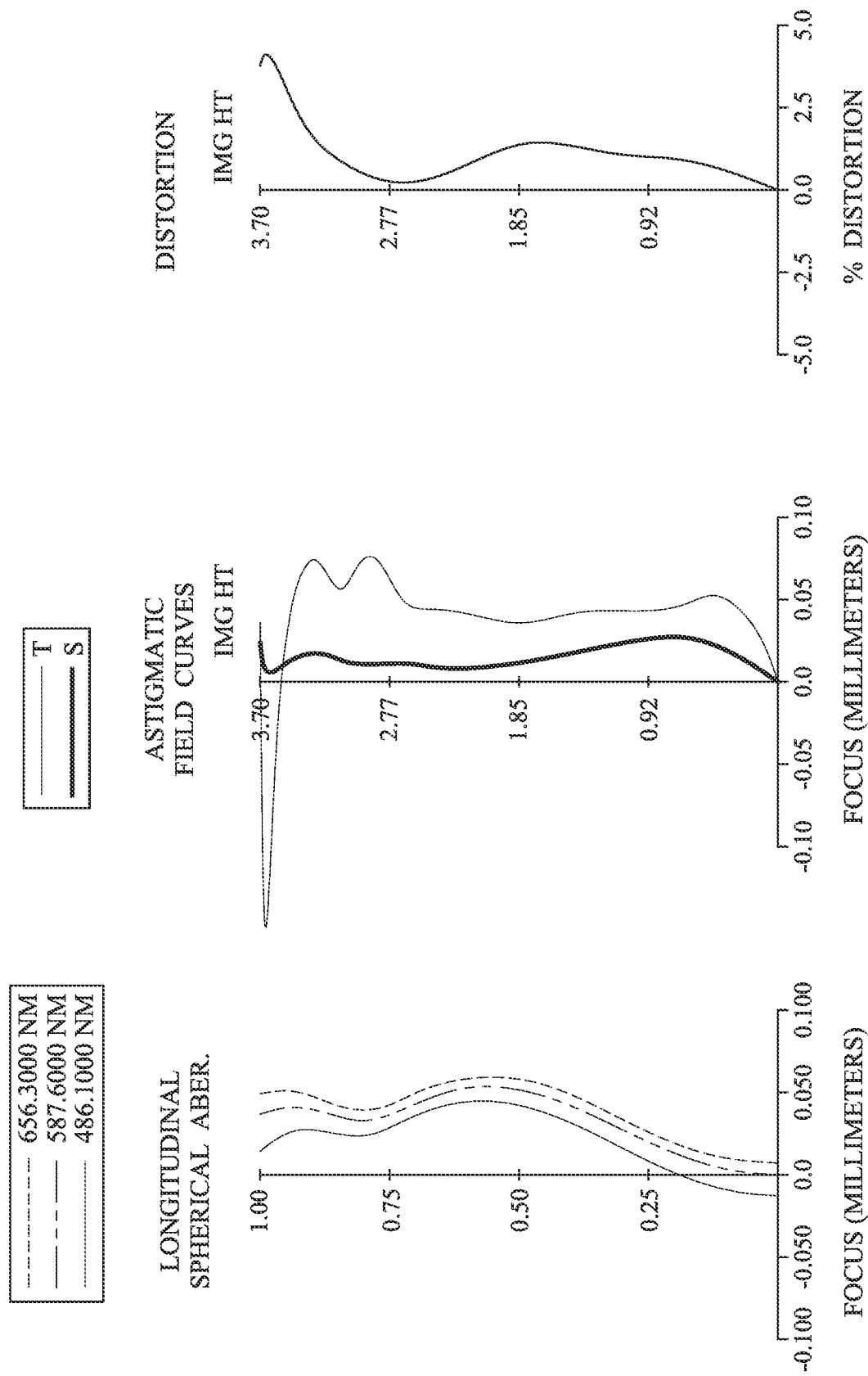
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes a photographing lens assembly (its reference numeral is omitted) and an image sensor 595. The photographing lens assembly includes, in order from an object side to an image side, a first lens element 510, a second lens element 520, an aperture stop 500, a third lens element 530, a fourth lens element 540, a fifth lens element 550, a sixth lens element 560, a seventh lens element 570, a filter 580 and an image surface 590. The image sensor 595 is disposed on the image surface 590 of the photographing lens assembly. The photographing lens assembly includes seven lens elements (510, 520, 530, 540, 550, 560 and 570) without additional one or more lens elements inserted between the first lens element 510 and the seventh lens element 570, and there is an air gap in a paraxial region between each of adjacent lens elements of the seven lens elements (510-570).

The first lens element 510 with positive refractive power has an object-side surface 511 being convex in a paraxial region thereof and an image-side surface 512 being convex in a paraxial region thereof. The first lens element 510 is made of a plastic material, and has the object-side surface 511 and the image-side surface 512 being both aspheric. Furthermore, each of the object-side surface 511 and the image-side surface 512 of the first lens element 510 includes at least one inflection point.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of a glass material, and has the object-side surface 531 and the image-side surface 532 being both aspheric.

The fourth lens element 540 with negative refractive power has an object-side surface 541 being concave in a paraxial region thereof and an image-side surface 542 being concave in a paraxial region thereof. The fourth lens element 540 is made of a plastic material, and has the object-side surface 541 and the image-side surface 542 being both aspheric.

The fifth lens element 550 with positive refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric. Furthermore, each of the object-side surface 551 and the image-side surface 552 of the fifth lens element 550 includes at least one inflection point.

The sixth lens element 560 with positive refractive power has an object-side surface 561 being concave in a paraxial region thereof and an image-side surface 562 being convex in a paraxial region thereof. The sixth lens element 560 is made of a plastic material, and has the object-side surface 561 and the image-side surface 562 being both aspheric. Furthermore, each of the object-side surface 561 and the image-side surface 562 of the sixth lens element 560 includes at least one inflection point, and the image-side surface 562 of the sixth lens element 560 includes at least one convex shape in an off-axis region thereof.

The seventh lens element 570 with negative refractive power has an object-side surface 571 being convex in a paraxial region thereof and an image-side surface 572 being concave in a paraxial region thereof. The seventh lens element 570 is made of a plastic material, and has the object-side surface 571 and the image-side surface 572 being both aspheric. Furthermore, each of the object-side surface 571 and the image-side surface 572 of the seventh lens element 570 includes at least one inflection point, and the image-side surface 572 of the seventh lens element 570 includes at least one convex shape in an off-axis region thereof.

The filter 580 is made of a glass material and located between the seventh lens element 570 and the image surface 590, and will not affect the focal length of the photographing lens assembly.

The detailed optical data of the 5th embodiment are shown in Table 9 and the aspheric surface data are shown in Table 10 below.

TABLE 9

5th Embodiment
f = 3.15 mm, Fno = 1.87, HFOV = 48.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 23.464 | ASP | 0.622 | Plastic | 1.534 | 55.9 | 16.97 |
| 2 | | −14.627 | ASP | 0.066 | | | | |
| 3 | Lens 2 | 1.834 | ASP | 0.299 | Plastic | 1.669 | 19.5 | −166.48 |
| 4 | | 1.686 | ASP | 0.235 | | | | |
| 5 | Ape. Stop | Plano | | 0.061 | | | | |
| 6 | Lens 3 | 47.280 | ASP | 0.820 | Glass | 1.583 | 46.5 | 2.41 |
| 7 | | −1.436 | ASP | 0.030 | | | | |
| 8 | Lens 4 | −4.993 | ASP | 0.284 | Plastic | 1.660 | 20.4 | −4.99 |
| 9 | | 9.867 | ASP | 0.435 | | | | |
| 10 | Lens 5 | −1.804 | ASP | 0.715 | Plastic | 1.544 | 56.0 | 2.49 |
| 11 | | −0.882 | ASP | 0.030 | | | | |
| 12 | Lens 6 | −4.250 | ASP | 0.506 | Plastic | 1.544 | 56.0 | 55.44 |
| 13 | | −3.881 | ASP | 0.062 | | | | |
| 14 | Lens 7 | 2.529 | ASP | 0.393 | Plastic | 1.544 | 56.0 | −2.47 |
| 15 | | 0.829 | ASP | 0.650 | | | | |
| 16 | Filter | Plano | | 0.210 | Glass | 1.517 | 64.2 | — |
| 17 | | Plano | | 0.388 | | | | |
| 18 | Image | Plano | | — | | | | |

Reference wavelength is 587.6 nm (d-line).

TABLE 10

Aspheric Coefficients

| Surface # | 1 | 2 | 3 | 4 | 6 | 7 | 8 |
|---|---|---|---|---|---|---|---|
| k = | 2.0000E+01 | −3.8715E+01 | −6.1214E+00 | −4.7402E+00 | 2.0000E+01 | −1.0873E+00 | −2.8788E+01 |
| A4 = | 3.4658E−02 | 1.1104E−02 | 1.2808E−03 | 9.9526E−03 | −5.9971E−02 | −1.0054E−02 | −7.4442E−02 |
| A6 = | −1.2964E−02 | −4.2931E−03 | −1.1387E−01 | −1.4542E−01 | −5.5027E−02 | −9.8991E−02 | −2.7387E−02 |
| A8 = | 4.1290E−03 | 7.5626E−04 | 9.4609E−02 | 1.4462E−01 | −2.3025E−02 | −5.8742E−02 | 3.6825E−02 |
| A10 = | −9.8403E−04 | −1.2754E−04 | −2.3069E−02 | −2.0996E−02 | −1.1837E−01 | 1.7798E−01 | 5.9613E−02 |
| A12 = | 1.0941E−04 | 1.1067E−05 | 2.5140E−03 | | | −1.2254E−01 | −7.1181E−02 |
| A14 = | −4.0772E−06 | | | | | | 2.0199E−02 |

| Surface # | 9 | 10 | 11 | 12 | 13 | 14 | 15 |
|---|---|---|---|---|---|---|---|
| k = | −3.2289E+01 | −3.5060E+00 | −4.1971E+00 | 1.7579E+00 | −3.8160E+01 | −4.9908E+00 | −3.7276E+00 |
| A4 = | −8.5400E−02 | −1.3677E−01 | −2.6684E−01 | 1.6541E−01 | 1.2658E−01 | −4.1395E−02 | −6.2549E−02 |
| A6 = | 7.0604E−02 | 1.3948E−01 | 3.5492E−01 | −4.0074E−02 | −5.0105E−02 | −1.1943E−01 | 2.2932E−02 |
| A8 = | −5.4676E−02 | −1.0704E−01 | −3.4848E−01 | −3.2035E−02 | 3.9126E−03 | 8.3007E−03 | −7.7292E−03 |
| A10 = | 4.8414E−02 | 1.2260E−01 | 2.2794E−01 | 2.8225E−02 | 1.9750E−03 | −1.5370E−03 | 1.7360E−03 |
| A12 = | −2.2076E−02 | −7.4619E−02 | −8.1839E−02 | −1.0108E−02 | −6.8249E−04 | 1.0319E−04 | −2.1674E−04 |
| A14 = | 3.6557E−03 | 2.0821E−02 | 1.4979E−02 | 1.7550E−03 | 8.5882E−05 | 3.2556E−07 | 1.3634E−05 |
| A16 = | | −2.2032E−03 | −1.1161E−03 | −1.1887E−04 | −3.9363E−06 | −2.1165E−07 | −3.3846E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.15 | |f/f1| + |f/f2| | 0.20 |
| Fno. | 1.87 | |f/f|min | 0.02 |
| HFOV [deg.] | 48.4 | Y11/Y72 | 0.69 |
| Nmax | 1.669 | TL/ImgH | 1.57 |
| CT4/CT5 | 0.40 | f/ImgH | 0.85 |
| (R1 + R2)/(R1 − R2) | 0.23 | f/EPD | 1.87 |
| (R5 + R6)/(R5 − R6) | 0.94 | SD/TD | 0.73 |

-continued

| 5th Embodiment | | | |
|---|---|---|---|
| (R7 + R8)/(R7 − R8) | −0.33 | Yc62/Yc72 | 0.28, 0.64 |
| f/f1 | 0.19 | |SAGc62/Yc62| | 0.038, 0.037 |
| f/f12 | 0.18 | |Dsr4/Dsr3| | 0.44 |
| |f3/f1| | 0.14 | |Dsr5/Dsr6| | 0.07 |
| |f5/f1| | 0.15 | | |

In the photographing lens assembly according to the 5th embodiment, when the focal length of the photographing lens assembly is f, a curvature radius of an object-side surface of one of the lens elements of the photographing lens assembly is Rf, and a curvature radius of an image-side surface of the lens element of the photographing lens assembly is Rr, the value of the condition |f/Rf|+|f/Rr| corresponding to each of the first lens element 510 through the seventh lens element 570 is listed in the following table, wherein term definitions of the parameters related to each surface of the lens elements are the same as those of the 1st embodiment. Therefore, an explanation in this regard will not be provided again.

| 5th Embodiment | | | |
|---|---|---|---|
| \|f/Rf\| + \|f/Rr\| | \|f/R1\| + \|f/R2\| 0.35 | \|f/Rf\| + \|f/Rr\| | \|f/R9\| + \|f/R10\| 5.32 |
| | \|f/R3\| + \|f/R4\| 3.59 | | \|f/R11\| + \|f/R12\| 1.55 |
| | \|f/R5\| + \|f/R6\| 2.26 | | \|f/R13\| + \|f/R14\| 5.05 |
| | \|f/R7\| + \|f/R8\| 0.95 | | |

Furthermore, in the photographing lens assembly according to the 5th embodiment, two lens elements of the first lens element 510, the second lens element 520, the third lens element 530, the fourth lens element 540, the fifth lens element 550, the sixth lens element 560, and the seventh lens element 570 have the Abbe numbers less than 25.0, which are the second lens element 520 and the fourth lens element 540.

In the photographing lens assembly according to the 5th embodiment, when a maximum optical effective radius of the object-side surface 511 of the first lens element 510 is Y11, a maximum optical effective radius of the object-side surface 521 of the second lens element 520 is Y21, a maximum optical effective radius of the object-side surface 531 of the third lens element 530 is Y31, a maximum optical effective radius of the object-side surface 541 of the fourth lens element 540 is Y41, and a maximum optical effective radius of the object-side surface 551 of the fifth lens element 550 is Y51, the following conditions are satisfied: Y11>Y21; Y11>Y31; Y11>Y41; and Y11>Y51.

6th Embodiment

Figure 11:
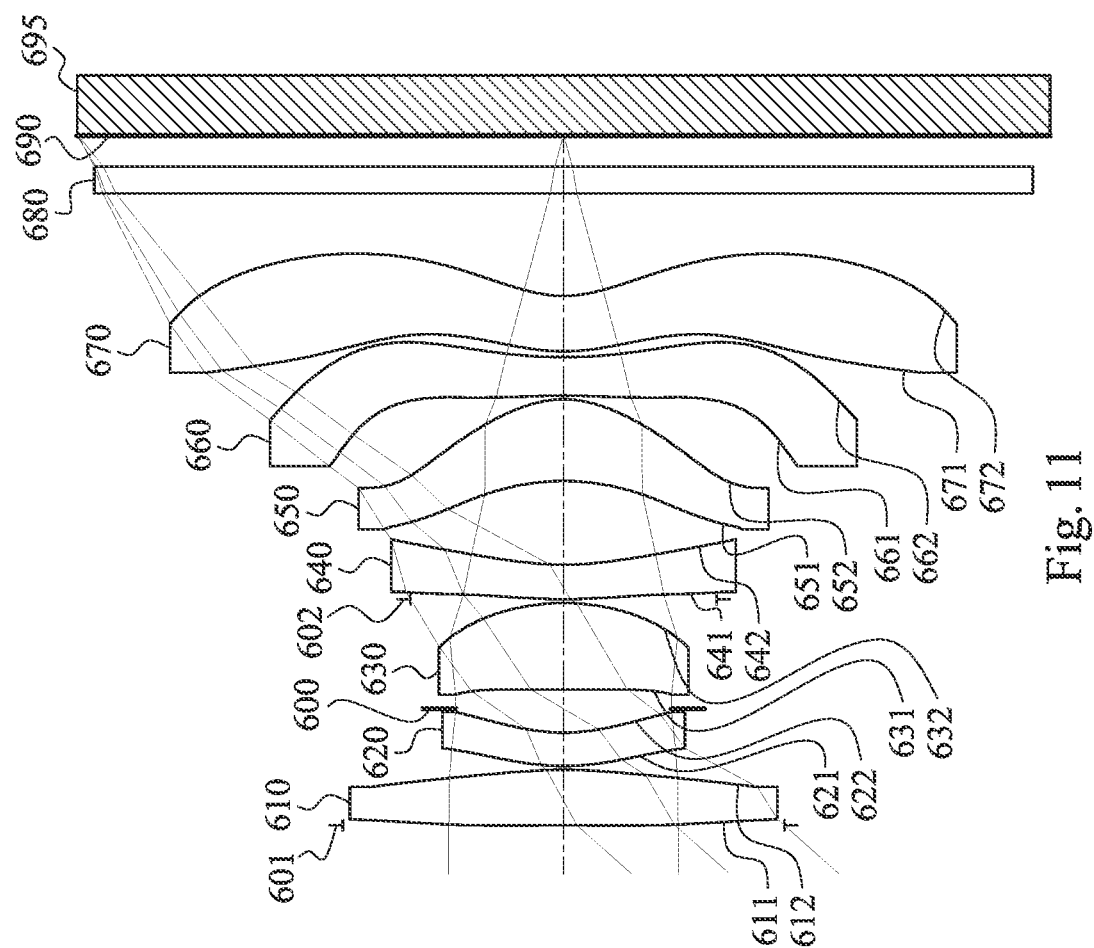
FIG. 11 is a schematic view of an imaging apparatus according to the 6th embodiment of the present disclosure.
Figure 12:
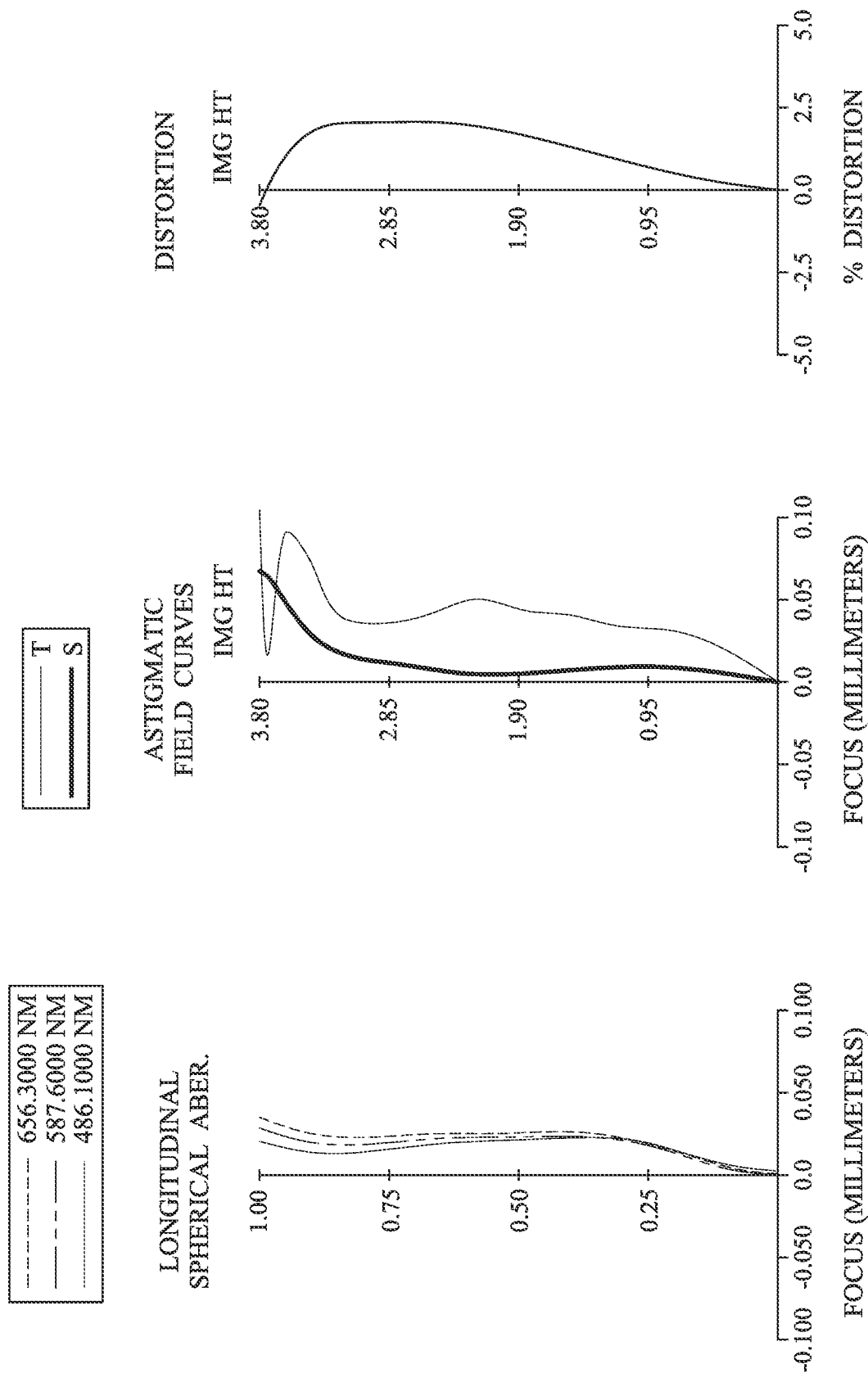
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes a photographing lens assembly (its reference numeral is omitted) and an image sensor 695. The photographing lens assembly includes, in order from an object side to an image side, a stop 601, a first lens element 610, a second lens element 620, an aperture stop 600, a third lens element 630, a stop 602, a fourth lens element 640, a fifth lens element 650, a sixth lens element 660, a seventh lens element 670, a filter 680 and an image surface 690. The image sensor 695 is disposed on the image surface 690 of the photographing lens assembly. The photographing lens assembly includes seven lens elements (610, 620, 630, 640, 650, 660 and 670) without additional one or more lens elements inserted between the first lens element 610 and the seventh lens element 670, and there is an air gap in a paraxial region between each of adjacent lens elements of the seven lens elements (610-670).

The first lens element 610 with positive refractive power has an object-side surface 611 being concave in a paraxial region thereof and an image-side surface 612 being convex in a paraxial region thereof. The first lens element 610 is made of a plastic material, and has the object-side surface 611 and the image-side surface 612 being both aspheric. Furthermore, each of the object-side surface 611 and the image-side surface 612 of the first lens element 610 includes at least one inflection point.

The second lens element 620 with negative refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric.

The fifth lens element 650 with positive refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric. Furthermore, each of the object-side surface 651 and the image-side surface 652 of the fifth lens element 650 includes at least one inflection point.

The sixth lens element 660 with negative refractive power has an object-side surface 661 being concave in a paraxial region thereof and an image-side surface 662 being concave in a paraxial region thereof. The sixth lens element 660 is made of a plastic material, and has the object-side surface 661 and the image-side surface 662 being both aspheric. Furthermore, each of the object-side surface 661 and the image-surface 662 of the sixth lens element 660 includes at least one inflection point, and the image-side surface 662 of the sixth lens element 660 includes at least one convex shape in an off-axis region thereof.

The seventh lens element 670 with negative refractive power has an object-side surface 671 being convex in a paraxial region thereof and an image-side surface 672 being concave in a paraxial region thereof. The seventh lens element 670 is made of a plastic material, and has the object-side surface 671 and the image-side surface 672 being both aspheric. Furthermore, each of the object-side surface 671 and the image-side surface 672 of the seventh lens element 670 includes at least one inflection point, and the image-side surface 672 of the seventh lens element 670 includes at least one convex shape in an off-axis region thereof.

The filter 680 is made of a glass material and located between the seventh lens element 670 and the image surface 690, and will not affect the focal length of the photographing lens assembly.

The detailed optical data of the 6th embodiment are shown in Table 11 and the aspheric surface data are shown in Table 12 below.

TABLE 11

6th Embodiment
f = 3.39 mm, Fno = 1.89, HFOV = 48.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | 0.000 | | | | |
| 2 | Lens 1 | −31.980 | ASP | 0.434 | Plastic | 1.545 | 56.1 | 7.31 |
| 3 | | −3.560 | ASP | 0.030 | | | | |
| 4 | Lens 2 | 1.915 | ASP | 0.260 | Plastic | 1.669 | 19.3 | −10.89 |
| 5 | | 1.434 | ASP | 0.187 | | | | |
| 6 | Ape. Stop | Plano | | 0.151 | | | | |
| 7 | Lens 3 | 42.171 | ASP | 0.676 | Plastic | 1.544 | 56.0 | 3.12 |
| 8 | | −1.758 | ASP | 0.030 | | | | |
| 9 | Stop | Plano | | 0.000 | | | | |
| 10 | Lens 4 | 4.281 | ASP | 0.270 | Plastic | 1.638 | 22.1 | −9.23 |
| 11 | | 2.418 | ASP | 0.654 | | | | |
| 12 | Lens 5 | −1.881 | ASP | 0.639 | Plastic | 1.545 | 54.8 | 2.07 |
| 13 | | −0.790 | ASP | 0.030 | | | | |
| 14 | Lens 6 | −3.994 | ASP | 0.300 | Plastic | 1.571 | 34.8 | −3.41 |
| 15 | | 3.907 | ASP | 0.045 | | | | |
| 16 | Lens 7 | 1.574 | ASP | 0.433 | Plastic | 1.544 | 56.0 | −5.37 |
| 17 | | 0.924 | ASP | 0.800 | | | | |
| 18 | Filter | Plano | | 0.210 | Glass | 1.517 | 64.2 | — |
| 19 | | Plano | | 0.242 | | | | |
| 20 | Image | Plano | | — | | | | |

Reference wavelength is 587.6 nm (d-line).
Effective radius of the stop on Surface 1 is 1.725 mm
Effective radius of the stop on Surface 9 is 1.196 mm

TABLE 12

Aspheric Coefficients

| Surface # | 2 | 3 | 4 | 5 | 7 | 8 | 10 |
|---|---|---|---|---|---|---|---|
| k = | −8.2238E+01 | −5.6605E+01 | −6.3405E+00 | −6.2823E+00 | −4.3389E+01 | −1.1668E+00 | −2.6511E+00 |
| A4 = | 4.5145E−02 | 2.5142E−02 | −1.9672E−02 | −3.8936E−02 | −3.9856E−02 | −6.7013E−02 | −1.5076E−01 |
| A6 = | −2.7921E−02 | −2.7885E−02 | −6.4505E−02 | 2.0151E−02 | −3.3505E−02 | 7.1709E−02 | 2.1442E−01 |
| A8 = | 1.2372E−02 | 1.8121E−02 | −4.5543E−03 | −1.3232E−01 | −8.2229E−02 | −2.2440E−01 | −3.3359E−01 |
| A10 = | −3.5266E−03 | −7.3154E−03 | 4.8922E−02 | 1.2751E−01 | 3.4005E−02 | 2.0752E−01 | 3.1774E−01 |
| A12 = | 2.6337E−04 | 1.2516E−03 | −1.8730E−02 | | | −8.2979E−02 | −1.4461E−01 |
| A14 = | 5.1584E−05 | | | | | | 2.4895E−02 |

| Surface # | 11 | 12 | 13 | 14 | 15 | 16 | 17 |
|---|---|---|---|---|---|---|---|
| k = | −9.2234E+00 | −3.8100E+00 | −3.6821E+00 | 3.1996E+00 | −9.7066E+01 | −5.4552E+00 | −4.7081E+00 |
| A4 = | −7.3757E−02 | −1.5511E−01 | −1.7147E−01 | 3.4699E−01 | 1.3983E−01 | −1.4166E−01 | −9.6295E−02 |
| A6 = | 1.0751E−01 | 3.2693E−01 | 2.3230E−01 | −4.0166E−01 | −1.6718E−01 | 4.3114E−02 | 3.3851E−02 |
| A8 = | −1.3202E−01 | −5.2864E−01 | −3.0494E−01 | 2.5376E−01 | 8.2358E−02 | −6.8280E−03 | −7.0286E−03 |
| A10 = | 9.3848E−02 | 5.9945E−01 | 2.4931E−01 | −1.0490E−01 | −2.3995E−02 | 7.8915E−04 | 8.1785E−04 |
| A12 = | −3.0981E−02 | −3.8512E−01 | −9.9937E−02 | 2.8460E−02 | 4.1437E−03 | −8.6856E−05 | −4.6136E−05 |
| A14 = | 3.5273E−03 | 1.2908E−01 | 1.8683E−02 | −4.8457E−03 | −3.9084E−04 | 7.1953E−06 | 5.5161E−07 |
| A16 = | | −1.7855E−02 | −1.2962E−03 | 3.9675E−04 | 1.5562E−05 | −2.6368E−07 | 3.1544E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.39 | |f/f1| + |f/f2| | 0.77 |
| Fno. | 1.89 | |f/fi|min | 0.31 |
| HFOV [deg.] | 48.3 | Y11/Y72 | 0.54 |
| Nmax | 1.669 | TL/ImgH | 1.42 |
| CT4/CT5 | 0.42 | f/ImgH | 0.89 |
| (R1 + R2)/(R1 − R2) | 1.25 | f/EPD | 1.89 |
| (R5 + R6)/(R5 − R6) | 0.92 | SD/TD | 0.78 |
| (R7 + R8)/(R7 − R8) | 3.60 | Yc62/Yc72 | 0.75 |
| f/f1 | 0.46 | |SAGc62/Yc62| | 0.097 |
| f/f12 | 0.19 | |Dsr4/Dsr3| | 0.42 |
| |f3/f1| | 0.43 | |Dsr5/Dsr6| | 0.18 |
| |f5/f1| | 0.28 | | |

In the photographing lens assembly according to the 6th embodiment, when the focal length of the photographing lens assembly is f, a curvature radius of an object-side surface of one of the lens elements of the photographing lens assembly is Rf, and a curvature radius of an image-side surface of the lens element of the photographing lens assembly is Rr, the value of the condition |f/Rf|+|f/Rr| corresponding to each of the first lens element 610 through the seventh lens element 670 is listed in the following table, wherein term definitions of the parameters related to each surface of the lens elements are the same as those of the 1st embodiment. Therefore, an explanation in this regard will not be provided again.

| 6th Embodiment | | | |
|---|---|---|---|
| |f/Rf| + |f/Rr| | |f/R1| + |f/R2| 1.06 | |f/Rf| + |f/Rr| | |f/R9| + |f/R10| 6.09 |
| | |f/R3| + |f/R4| 4.13 | | |f/R11| + |f/R12| 1.71 |
| | |f/R5| + |f/R6| 2.01 | | |f/R13| + |f/R14| 5.82 |
| | |f/R7| + |f/R8| 2.19 | | |

Furthermore, in the photographing lens assembly according to the 6th embodiment, two lens elements of the first lens element 610, the second lens element 620, the third lens element 630, the fourth lens element 640, the fifth lens element 650, the sixth lens element 660, and the seventh lens element 670 have the Abbe numbers less than 25.0, which are the second lens element 620 and the fourth lens element 640.

In the photographing lens assembly according to the 6th embodiment, when a maximum optical effective radius of the object-side surface 611 of the first lens element 610 is Y11, a maximum optical effective radius of the object-side surface 621 of the second lens element 620 is Y21, a maximum optical effective radius of the object-side surface 631 of the third lens element 630 is Y31, a maximum optical effective radius of the object-side surface 641 of the fourth lens element 640 is Y41, and a maximum optical effective radius of the object-side surface 651 of the fifth lens element 650 is Y51, the following conditions are satisfied: Y11>Y21; Y11>Y31; Y11>Y41; and Y11>Y51.

7th Embodiment

Figure 13:
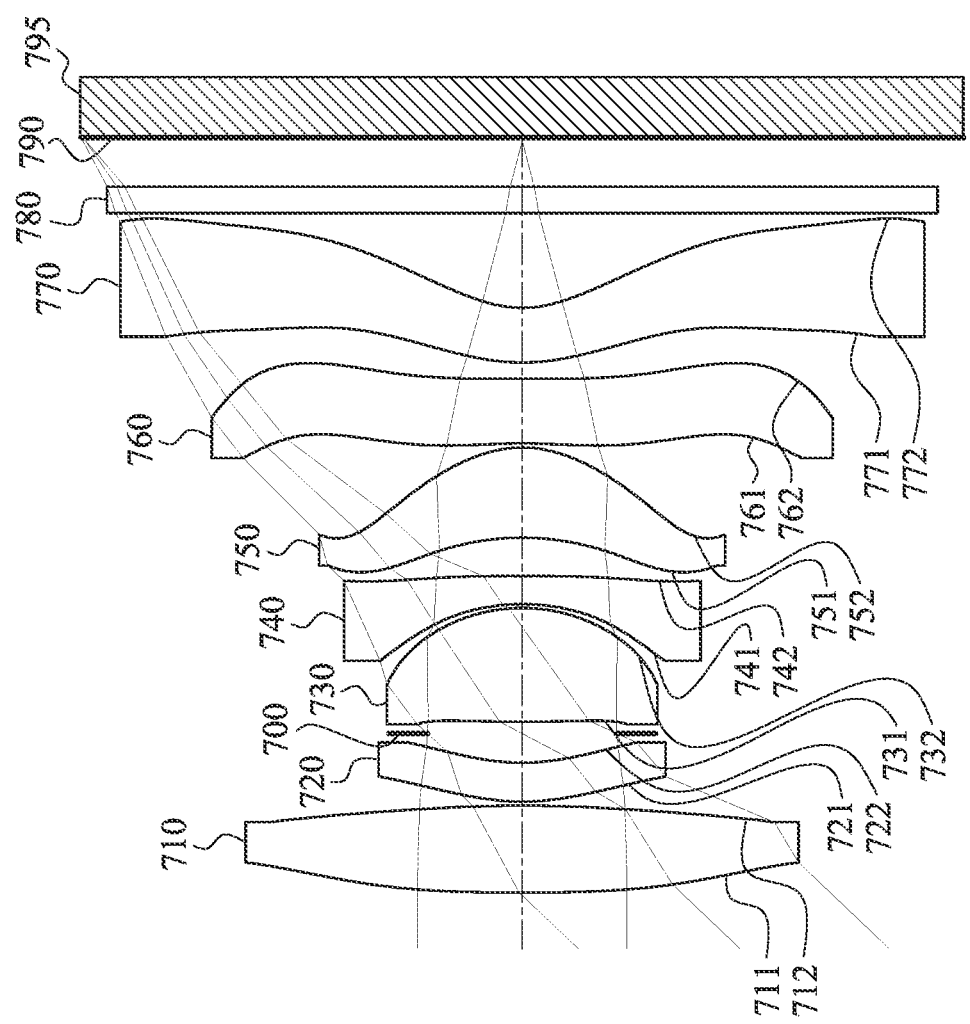
FIG. 13 is a schematic view of an imaging apparatus according to the 7th embodiment of the present disclosure.
Figure 14:
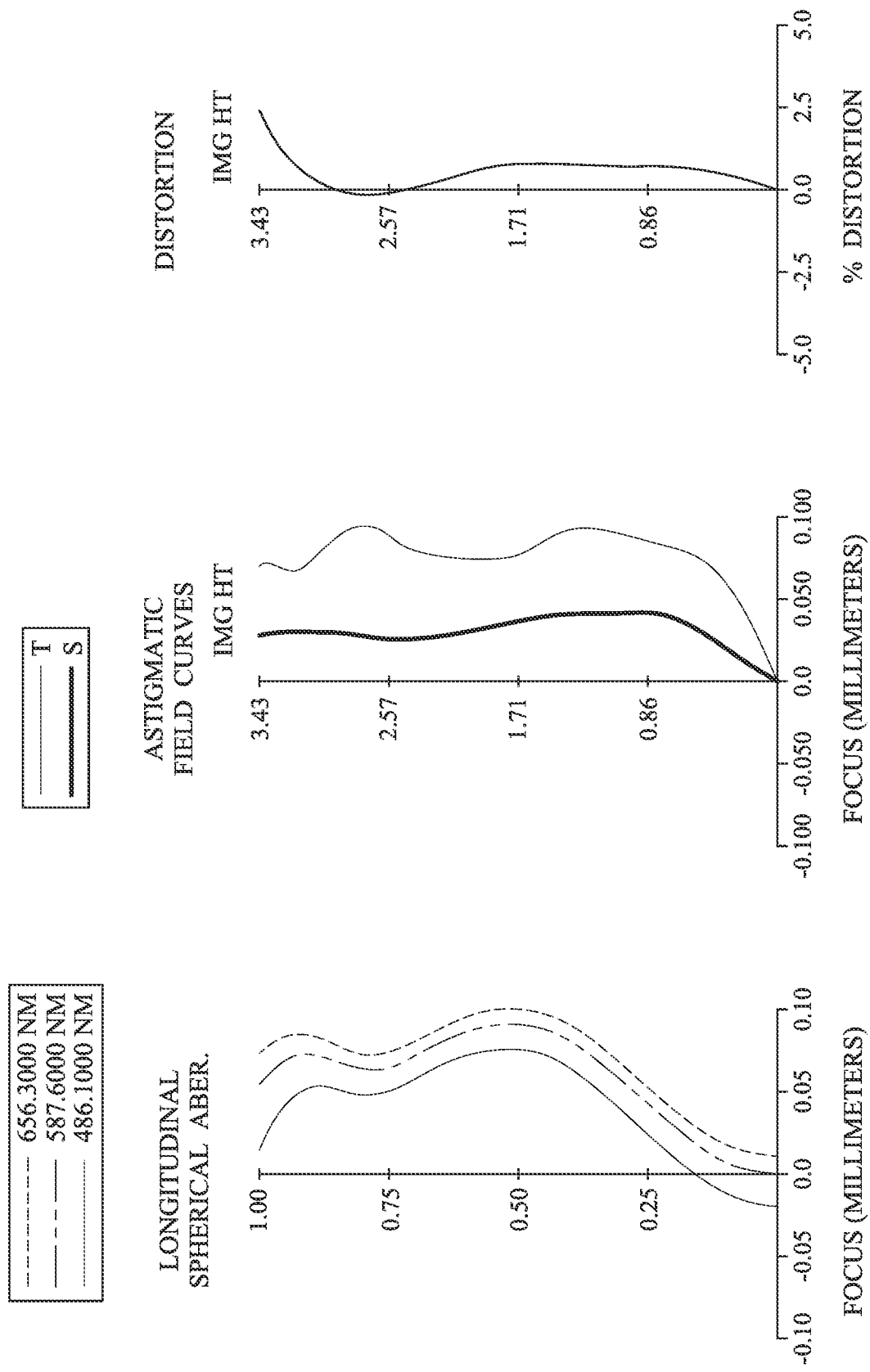
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes a photographing lens assembly (its reference numeral is omitted) and an image sensor 795. The photographing lens assembly includes, in order from an object side to an image side, a first lens element 710, a second lens element 720, an aperture stop 700, a third lens element 730, a fourth lens element 740, a fifth lens element 750, a sixth lens element 760, a seventh lens element 770, a filter 780 and an image surface 790. The image sensor 795 is disposed on the image surface 790 of the photographing lens assembly. The photographing lens assembly includes seven lens elements (710, 720, 730, 740, 750, 760 and 770) without additional one or more lens elements inserted between the first lens element 710 and the seventh lens element 770, and there is an air gap in a paraxial region between each of adjacent lens elements of the seven lens elements (710-770).

The first lens element 710 with positive refractive power has an object-side surface 711 being convex in a paraxial region thereof and an image-side surface 712 being convex in a paraxial region thereof. The first lens element 710 is made of a plastic material, and has the object-side surface 711 and the image-side surface 712 being both aspheric. Furthermore, the object-side surface 711 of the first lens element 710 includes at least one inflection point.

The second lens element 720 with positive refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of a plastic material, and has the object-side surface 741 and the image-side surface 742 being both aspheric.

The fifth lens element 750 with positive refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric. Furthermore, each of the object-side surface 751 and the image-side surface 752 of the fifth lens element 750 includes at least one inflection point.

The sixth lens element 760 with negative refractive power has an object-side surface 761 being concave in a paraxial region thereof and an image-side surface 762 being convex in a paraxial region thereof. The sixth lens element 760 is made of a plastic material, and has the object-side surface 761 and the image-side surface 762 being both aspheric. Furthermore, each of the object-side surface 761 and the image-side surface 762 of the sixth lens element 760 includes at least one inflection point, and the image-side surface 762 of the sixth lens element 760 includes at least one convex shape in an off-axis region thereof.

The seventh lens element 770 with negative refractive power has an object-side surface 771 being convex in a paraxial region thereof and an image-side surface 772 being concave in a paraxial region thereof. The seventh lens element 770 is made of a plastic material, and has the object-side surface 771 and the image-side surface 772 being both aspheric. Furthermore, each of the object-side surface 771 and the image-side surface 772 of the seventh lens element 770 includes at least one inflection point, and the image-side surface 772 of the seventh lens element 770 includes at least one convex shape in an off-axis region thereof.

The filter 780 is made of a glass material and located between the seventh lens element 770 and the image surface 790, and will not affect the focal length of the photographing lens assembly.

The detailed optical data of the 7th embodiment are shown in Table 13 and the aspheric surface data are shown in Table 14 below.

TABLE 13

7th Embodiment
f = 3.13 mm, Fno = 1.91, HFOV = 46.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 26.695 | ASP | 0.681 | Plastic | 1.534 | 55.9 | 13.42 |
| 2 | | −9.710 | ASP | 0.030 | | | | |
| 3 | Lens 2 | 1.854 | ASP | 0.305 | Plastic | 1.669 | 19.5 | 772.89 |
| 4 | | 1.738 | ASP | 0.228 | | | | |
| 5 | Ape. Stop | Plano | | 0.092 | | | | |
| 6 | Lens 3 | 11.340 | ASP | 0.890 | Plastic | 1.582 | 30.2 | 2.06 |
| 7 | | −1.306 | ASP | 0.030 | | | | |
| 8 | Lens 4 | −1.702 | ASP | 0.220 | Plastic | 1.660 | 20.4 | −2.65 |
| 9 | | −68.822 | ASP | 0.299 | | | | |
| 10 | Lens 5 | −2.244 | ASP | 0.706 | Plastic | 1.544 | 56.0 | 2.29 |
| 11 | | −0.890 | ASP | 0.032 | | | | |
| 12 | Lens 6 | −4.588 | ASP | 0.508 | Plastic | 1.544 | 56.0 | −10.86 |
| 13 | | −21.296 | ASP | 0.124 | | | | |
| 14 | Lens 7 | 1.623 | ASP | 0.427 | Plastic | 1.544 | 56.0 | −4.14 |
| 15 | | 0.856 | ASP | 0.740 | | | | |
| 16 | Filter | Plano | | 0.210 | Glass | 1.517 | 64.2 | — |
| 17 | | Plano | | 0.381 | | | | |
| 18 | Image | Plano | | — | | | | |

Reference wavelength is 587.6 nm (d-line).

TABLE 14

Aspheric Coefficients

| Surface # | 1 | 2 | 3 | 4 | 6 | 7 | 8 |
|---|---|---|---|---|---|---|---|
| k = | 3.7173E+00 | −3.8715E+01 | −6.2037E+00 | −5.3442E+00 | 2.0000E+01 | −1.0882E+00 | −3.9733E+00 |
| A4 = | 3.2731E−02 | 7.5033E−03 | −2.3537E−03 | 1.0547E−02 | −3.8919E−02 | −3.4345E−02 | −2.4672E−01 |
| A6 = | −1.3188E−02 | −2.2521E−03 | −1.0357E−01 | −2.0724E−01 | −3.2738E−02 | 3.9560E−02 | 4.8640E−01 |
| A8 = | 3.4881E−03 | 2.9449E−04 | 9.8993E−02 | 2.8294E−01 | 1.1923E−02 | −3.2879E−01 | −1.0819E+00 |
| A10 = | −6.2316E−04 | −4.2441E−05 | −2.8795E−02 | −1.3627E−01 | −1.8543E−01 | 4.0180E−01 | 1.3274E+00 |
| A12 = | 5.7419E−05 | 3.6571E−06 | −2.9515E−04 | | | −1.9426E−01 | −7.8398E−01 |
| A14 = | −1.9509E−06 | | | | | | 1.8077E−01 |

| Surface # | 9 | 10 | 11 | 12 | 13 | 14 | 15 |
|---|---|---|---|---|---|---|---|
| k = | −1.0000E+00 | −4.1271E+00 | −3.9923E+00 | 1.7435E−01 | 1.6605E+01 | −4.9173E+00 | −3.4395E+00 |
| A4 = | −1.1801E−01 | −1.2797E−01 | −2.6488E−01 | 2.1734E−01 | 1.1962E−01 | −2.9804E−02 | −4.3790E−02 |
| A6 = | 2.0387E−01 | 1.1033E−01 | 3.2367E−01 | −1.4012E−01 | −7.6102E−02 | −1.2877E−02 | 9.8759E−03 |
| A8 = | −2.1883E−01 | −5.5812E−03 | −3.2348E−01 | 5.3172E−02 | 2.8350E−02 | 7.1227E−03 | −2.3817E−03 |
| A10 = | 1.5100E−01 | −4.5650E−03 | 2.1359E−01 | −1.2633E−02 | −7.5408E−03 | −1.2788E−03 | 5.0315E−04 |
| A12 = | −5.5408E−02 | −3.8291E−03 | −7.2883E−02 | 1.5822E−03 | 1.3171E−03 | 1.0412E−04 | −6.1360E−05 |
| A14 = | 8.0892E−03 | 2.3725E−03 | 1.1975E−02 | −7.0172E−05 | −1.3458E−04 | −3.4842E−06 | 3.6980E−06 |
| A16 = | | −3.5038E−04 | −7.5939E−04 | −1.1805E−06 | 5.9913E−06 | 2.1827E−08 | −8.6494E−08 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.13 | |f/f1| + |f/f2| | 0.24 |
| Fno. | 1.91 | |f/fi|min | 0.004 |
| HFOV [deg.] | 46.4 | Y11/Y72 | 0.69 |
| Nmax | 1.669 | TL/ImgH | 1.72 |
| CT4/CT5 | 0.31 | f/ImgH | 0.91 |
| (R1 + R2)/(R1 − R2) | 0.47 | f/EPD | 1.91 |
| (R5 + R6)/(R5 − R6) | 0.79 | SD/TD | 0.73 |

| 7th Embodiment | | | |
|---|---|---|---|
| (R7 + R8)/(R7 − R8) | −1.05 | Yc62/Yc72 | 0.11, 0.58 |
| f/f1 | 0.23 | |SAGc62/Yc62| | 0.004, 0.072 |
| f/f12 | 0.25 | |Dsr4/Dsr3| | 0.43 |
| |f3/f1| | 0.15 | |Dsr5/Dsr6| | 0.09 |
| |f5/f1| | 0.17 | | |

In the photographing lens assembly according to the 7th embodiment, when the focal length of the photographing lens assembly is f, a curvature radius of an object-side surface of one of the lens elements of the photographing lens assembly is Rf, and a curvature radius of an image-side surface of the lens element of the photographing lens assembly is Rr, the value of the condition |f/Rf|+|f/Rr| corresponding to each of the first lens element 710 through the seventh lens element 770 is listed in the following table, wherein term definitions of the parameters related to each surface of the lens elements are the same as those of the 1st embodiment. Therefore, an explanation in this regard will not be provided again.

| 7th Embodiment | | | |
|---|---|---|---|
| \|f/Rf\| + \|f/Rr\| | \|f/R1\| + \|f/R2\|  0.44 | \|f/Rf\| + \|f/Rr\| | \|f/R9\| + \|f/R10\|  4.92 |
| | \|f/R3\| + \|f/R4\|  3.49 | | \|f/R11\| + \|f/R12\|  0.83 |
| | \|f/R5\| + \|f/R6\|  2.68 | | \|f/R13\| + \|f/R14\|  5.59 |
| | \|f/R7\| + \|f/R8\|  1.89 | | |

Furthermore, in the photographing lens assembly according to the 7th embodiment, two lens elements of the first lens element 710, the second lens element 720, the third lens element 730, the fourth lens element 740, the fifth lens element 750, the sixth lens element 760, and the seventh lens element 770 have the Abbe numbers less than 25.0, which are the second lens element 720 and the fourth lens element 740.

In the photographing lens assembly according to the 7th embodiment, when a maximum optical effective radius of the object-side surface 711 of the first lens element 710 is Y11, a maximum optical effective radius of the object-side surface 721 of the second lens element 720 is Y21, a maximum optical effective radius of the object-side surface 731 of the third lens element 730 is Y31, a maximum optical effective radius of the object-side surface 741 of the fourth lens element 740 is Y41, and a maximum optical effective radius of the object-side surface 751 of the fifth lens element 750 is Y51, the following conditions are satisfied: Y11>Y21; Y11>Y31; Y11>Y41; and Y11>Y51.

8th Embodiment

Figure 15:
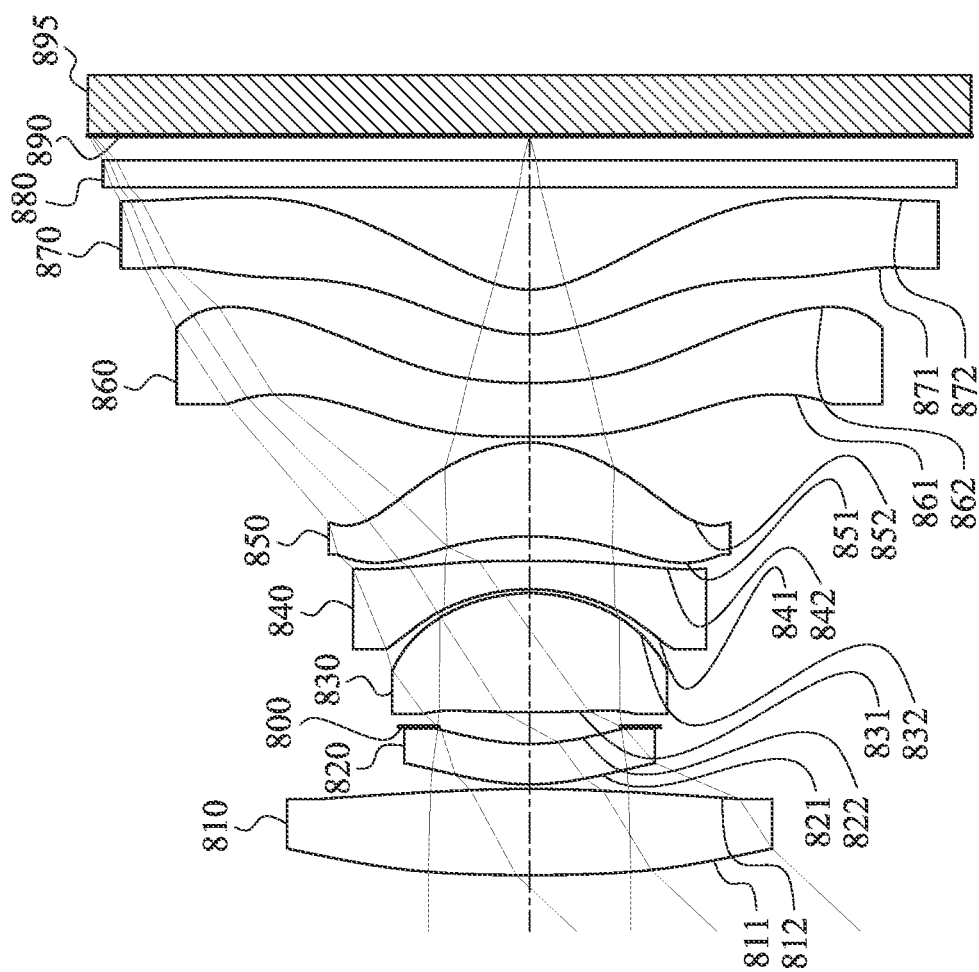
FIG. 15 is a schematic view of an imaging apparatus according to the 8th embodiment of the present disclosure.
Figure 16:
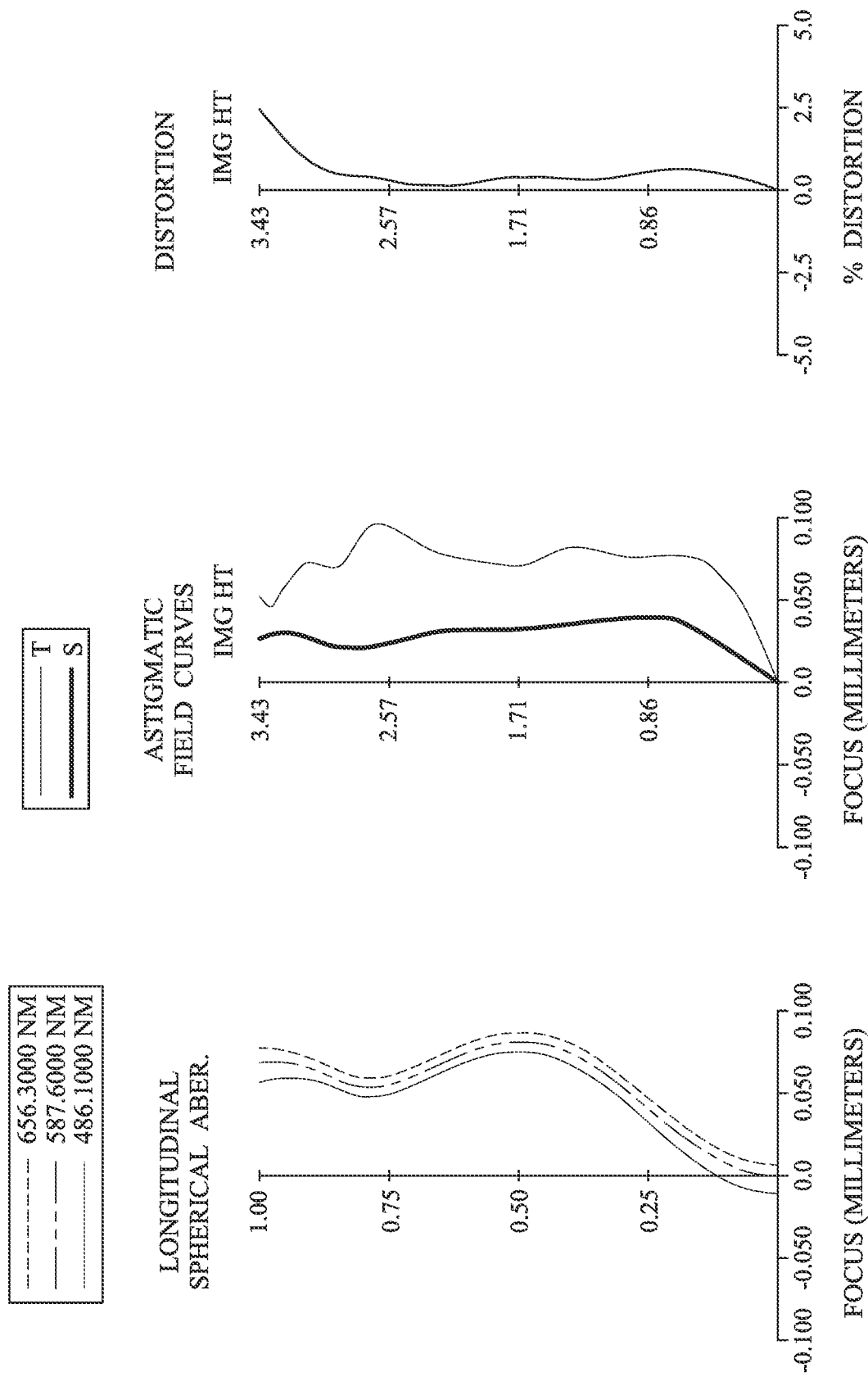
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes a photographing lens assembly (its reference numeral is omitted) and an image sensor 895. The photographing lens assembly includes, in order from an object side to an image side, a first lens element 810, a second lens element 820, an aperture stop 800, a third lens element 830, a fourth lens element 840, a fifth lens element 850, a sixth lens element 860, a seventh lens element 870, a filter 880 and an image surface 890. The image sensor 895 is disposed on the image surface 890 of the photographing lens assembly. The photographing lens assembly includes seven lens elements (810, 820, 830, 840, 850, 860 and 870) without additional one or more lens elements inserted between the first lens element 810 and the seventh lens element 870, and there is an air gap in a paraxial region between each of adjacent lens elements of the seven lens elements (810-870).

The first lens element 810 with positive refractive power has an object-side surface 811 being convex in a paraxial region thereof and an image-side surface 812 being convex in a paraxial region thereof. The first lens element 810 is made of a plastic material, and has the object-side surface 811 and the image-side surface 812 being both aspheric. Furthermore, the object-side surface 811 of the first lens element 810 includes at least one inflection point.

The second lens element 820 with negative refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of a plastic material, and has the object-side surface 831 and the image-side surface 832 being both aspheric.

The fourth lens element 840 with negative refractive power has an object-side surface 841 being concave in a paraxial region thereof and an image-side surface 842 being convex in a paraxial region thereof. The fourth lens element 840 is made of a plastic material, and has the object-side surface 841 and the image-side surface 842 being both aspheric.

The fifth lens element 850 with positive refractive power has an object-side surface 851 being concave in a paraxial region thereof and an image-side surface 852 being convex in a paraxial region thereof. The fifth lens element 850 is made of a plastic material, and has the object-side surface 851 and the image-side surface 852 being both aspheric. Furthermore, each of the object-side surface 851 and the image-side surface 852 of the fifth lens element 850 includes at least one inflection point.

The sixth lens element 860 with negative refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric. Furthermore, each of the object-side surface 861 and the image-side surface 862 of the sixth lens element 860 includes at least one inflection point, and the image-side surface 862 of the sixth lens element 860 includes at least one convex shape in an off-axis region thereof.

The seventh lens element 870 with negative refractive power has an object-side surface 871 being convex in a paraxial region thereof and an image-side surface 872 being concave in a paraxial region thereof. The seventh lens element 870 is made of a plastic material, and has the object-side surface 871 and the image-side surface 872 being both aspheric. Furthermore, each of the object-side surface 871 and the image-side surface 872 of the seventh lens element 870 includes at least one inflection point, and the image-side surface 872 of the seventh lens element 870 includes at least one convex shape in an off-axis region thereof.

The filter 880 is made of a glass material and located between the seventh lens element 870 and the image surface 890, and will not affect the focal length of the photographing lens assembly.

The detailed optical data of the 8th embodiment are shown in Table 15 and the aspheric surface data are shown in Table 16 below.

TABLE 15

8th Embodiment
f = 3.09 mm, Fno = 1.95, HFOV = 46.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 18.408 | ASP | 0.674 | Plastic | 1.535 | 56.3 | 12.46 |
| 2 | | −10.310 | ASP | 0.036 | | | | |
| 3 | Lens 2 | 1.960 | ASP | 0.315 | Plastic | 1.656 | 21.3 | −106.11 |
| 4 | | 1.785 | ASP | 0.134 | | | | |
| 5 | Ape. Stop | Plano | | 0.114 | | | | |
| 6 | Lens 3 | 10.471 | ASP | 0.931 | Plastic | 1.582 | 30.2 | 2.14 |
| 7 | | −1.365 | ASP | 0.030 | | | | |
| 8 | Lens 4 | −1.629 | ASP | 0.223 | Plastic | 1.669 | 19.5 | −2.62 |
| 9 | | −24.585 | ASP | 0.190 | | | | |
| 10 | Lens 5 | −2.804 | ASP | 0.735 | Plastic | 1.511 | 56.8 | 2.75 |
| 11 | | −1.020 | ASP | 0.045 | | | | |
| 12 | Lens 6 | 20.784 | ASP | 0.421 | Plastic | 1.511 | 56.8 | −9.45 |
| 13 | | 3.892 | ASP | 0.379 | | | | |
| 14 | Lens 7 | 1.134 | ASP | 0.352 | Plastic | 1.534 | 55.9 | −7.34 |
| 15 | | 0.785 | ASP | 0.800 | | | | |
| 16 | Filter | Plano | | 0.210 | Glass | 1.517 | 64.2 | — |
| 17 | | Plano | | 0.192 | | | | |
| 18 | Image | Plano | | — | | | | |

Reference wavelength is 587.6 nm (d-line).

TABLE 16

Aspheric Coefficients

| Surface # | 1 | 2 | 3 | 4 | 6 | 7 | 8 |
|---|---|---|---|---|---|---|---|
| k = | −1.4890E+01 | −3.8157E+01 | −6.6435E+00 | −5.3729E+00 | 9.9547E+00 | −1.0876E+00 | −3.8103E+00 |
| A4 = | 2.7765E−02 | 1.0588E−02 | −7.1071E−03 | 1.3260E−02 | −3.0195E−02 | −1.9694E−01 | −4.2762E−01 |
| A6 = | −1.0940E−02 | −3.6038E−03 | −3.4002E−02 | −1.6591E−01 | −6.6078E−03 | 8.1710E−01 | 1.2764E+00 |
| A8 = | 3.0290E−03 | 5.7618E−04 | −2.2653E−02 | 2.3576E−01 | −4.0512E−02 | −1.5870E+00 | −2.2493E+00 |
| A10 = | −6.0027E−04 | −6.4619E−05 | 7.2486E−02 | −1.6738E−01 | −1.6326E−01 | 1.2108E+00 | 1.8818E+00 |
| A12 = | 6.3163E−05 | 4.3471E−06 | −3.7378E−02 | | | −3.5901E−01 | −7.0557E−01 |
| A14 = | −2.4849E−06 | 9.4975E−02 | | | | | |

| Surface # | 9 | 10 | 11 | 12 | 13 | 14 | 15 |
|---|---|---|---|---|---|---|---|
| k = | −1.0000E+00 | −5.1583E+00 | −4.8583E+00 | −2.7944E+01 | −1.0000E+00 | −4.0345E+00 | −2.8100E+00 |
| A4 = | −1.6117E−01 | −1.5120E−01 | −3.1284E−01 | 1.7936E−01 | 9.1615E−02 | −2.7332E−02 | −5.2791E−02 |
| A6 = | 3.1187E−01 | 1.9632E−01 | 4.2083E−01 | −1.2747E−01 | −6.4614E−02 | −6.6064E−03 | 1.6333E−02 |
| A8 = | −3.4555E−01 | −1.0990E−01 | −4.2055E−01 | 4.7984E−02 | 2.1014E−02 | 2.7669E−03 | −4.6149E−03 |
| A10 = | 2.3009E−01 | 6.6267E−02 | 2.7002E−01 | −1.1089E−02 | −4.0920E−03 | −1.9057E−04 | 8.4059E−04 |
| A12 = | −8.0786E−02 | −3.2898E−02 | −9.1999E−02 | 1.5085E−03 | 4.8230E−04 | −2.1495E−05 | −8.6009E−05 |
| A14 = | 1.1501E−02 | 8.9963E−03 | 1.5416E−02 | −1.0901E−04 | −3.2116E−05 | 3.2071E−06 | 4.5503E−06 |
| A16 = | | −9.8960E−04 | −1.0136E−03 | 3.1785E−06 | 9.2259E−07 | −1.0823E−07 | −9.7235E−08 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.09 | |f/f1| + |f/f2| | 0.28 |
| Fno. | 1.95 | |f/fi|min | 0.03 |
| HFOV [deg.] | 46.9 | Y11/Y72 | 0.60 |
| Nmax | 1.669 | TL/ImgH | 1.69 |
| CT4/CT5 | 0.30 | f/ImgH | 0.90 |
| (R1 + R2)/(R1 − R2) | 0.28 | f/EPD | 1.95 |
| (R5 + R6)/(R5 − R6) | 0.77 | SD/TD | 0.75 |
| (R7 + R8)/(R7 − R8) | −1.14 | Yc62/Yc72 | 1.04 |
| f/f1 | 0.25 | |SAGc62/Yc62| | 0.254 |
| f/f12 | 0.24 | |Dsr4/Dsr3| | 0.30 |
| |f3/f1| | 0.17 | |Dsr5/Dsr6| | 0.11 |
| |f5/f1| | 0.22 | | |

In the photographing lens assembly according to the 8th embodiment, when the focal length of the photographing lens assembly is f, a curvature radius of an object-side surface of one of the lens elements of the photographing lens assembly is Rf, and a curvature radius of an image-side surface of the lens element of the photographing lens assembly is Rr, the value of the condition |f/Rf|+|f/Rr| corresponding to each of the first lens element 810 through the seventh lens element 870 is listed in the following table, wherein term definitions of the parameters related to each surface of the lens elements are the same as those of the 1st embodiment. Therefore, an explanation in this regard will not be provided again.

| 8th Embodiment | | | |
|---|---|---|---|
| \|f/Rf\| + \|f/Rr\| | \|f/R1\| + \|f/R2\|  0.47 | \|f/Rf\| + \|f/Rr\| | \|f/R9\| + \|f/R10\|  4.13 |
| | \|f/R3\| + \|f/R4\|  3.30 | | \|f/R11\| + \|f/R12\|  0.94 |
| | \|f/R5\| + \|f/R6\|  2.55 | | \|f/R13\| + \|f/R14\|  6.65 |
| | \|f/R7\| + \|f/R8\|  2.02 | | |

Furthermore, in the photographing lens assembly according to the 8th embodiment, two lens elements of the first lens element 810, the second lens element 820, the third lens element 830, the fourth lens element 840, the fifth lens element 850, the sixth lens element 860, and the seventh lens element 870 have the Abbe numbers less than 25.0, which are the second lens element 820 and the fourth lens element 840.

In the photographing lens assembly according to the 8th embodiment, when a maximum optical effective radius of the object-side surface 811 of the first lens element 810 is Y11, a maximum optical effective radius of the object-side surface 821 of the second lens element 820 is Y21, a maximum optical effective radius of the object-side surface 831 of the third lens element 830 is Y31, a maximum optical effective radius of the object-side surface 841 of the fourth lens element 840 is Y41, and a maximum optical effective radius of the object-side surface 851 of the fifth lens element 850 is Y51, the following conditions are satisfied: Y11>Y21; Y11>Y31; Y11>Y41; and Y11>Y51.

9th Embodiment

Figure 17:
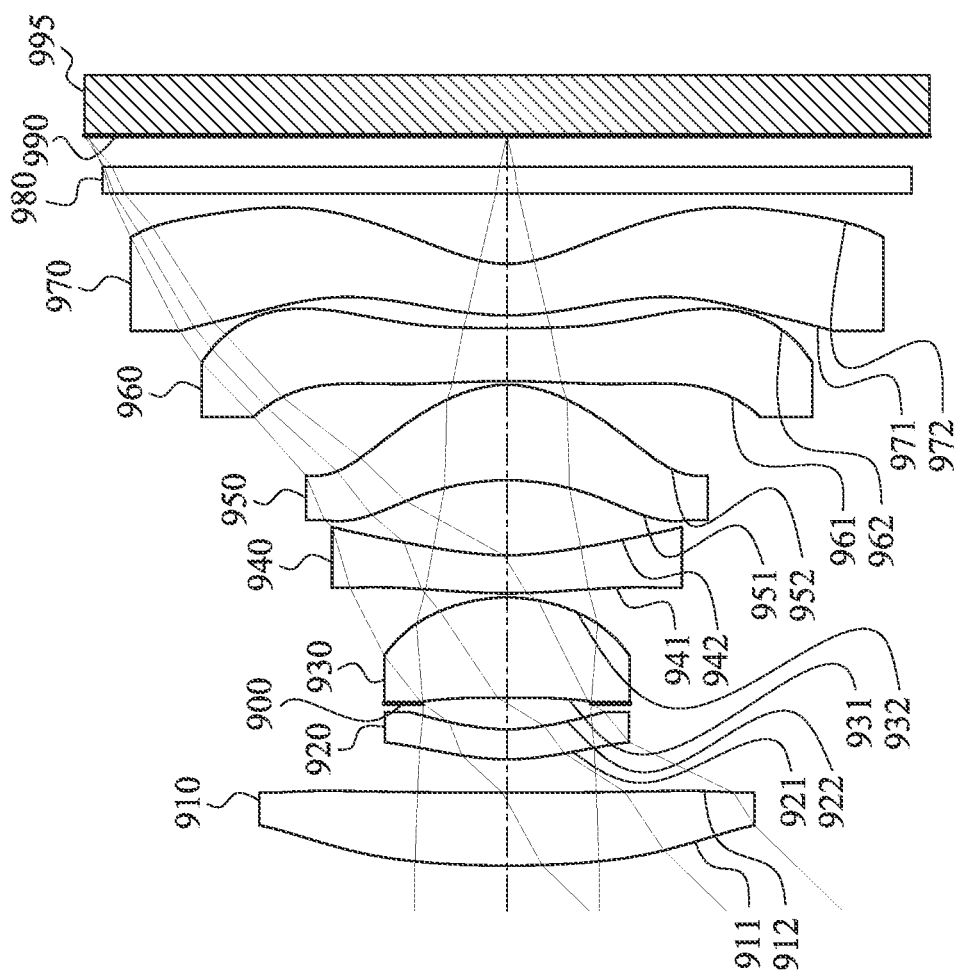
FIG. 17 is a schematic view of an imaging apparatus according to the 9th embodiment of the present disclosure.
Figure 18:
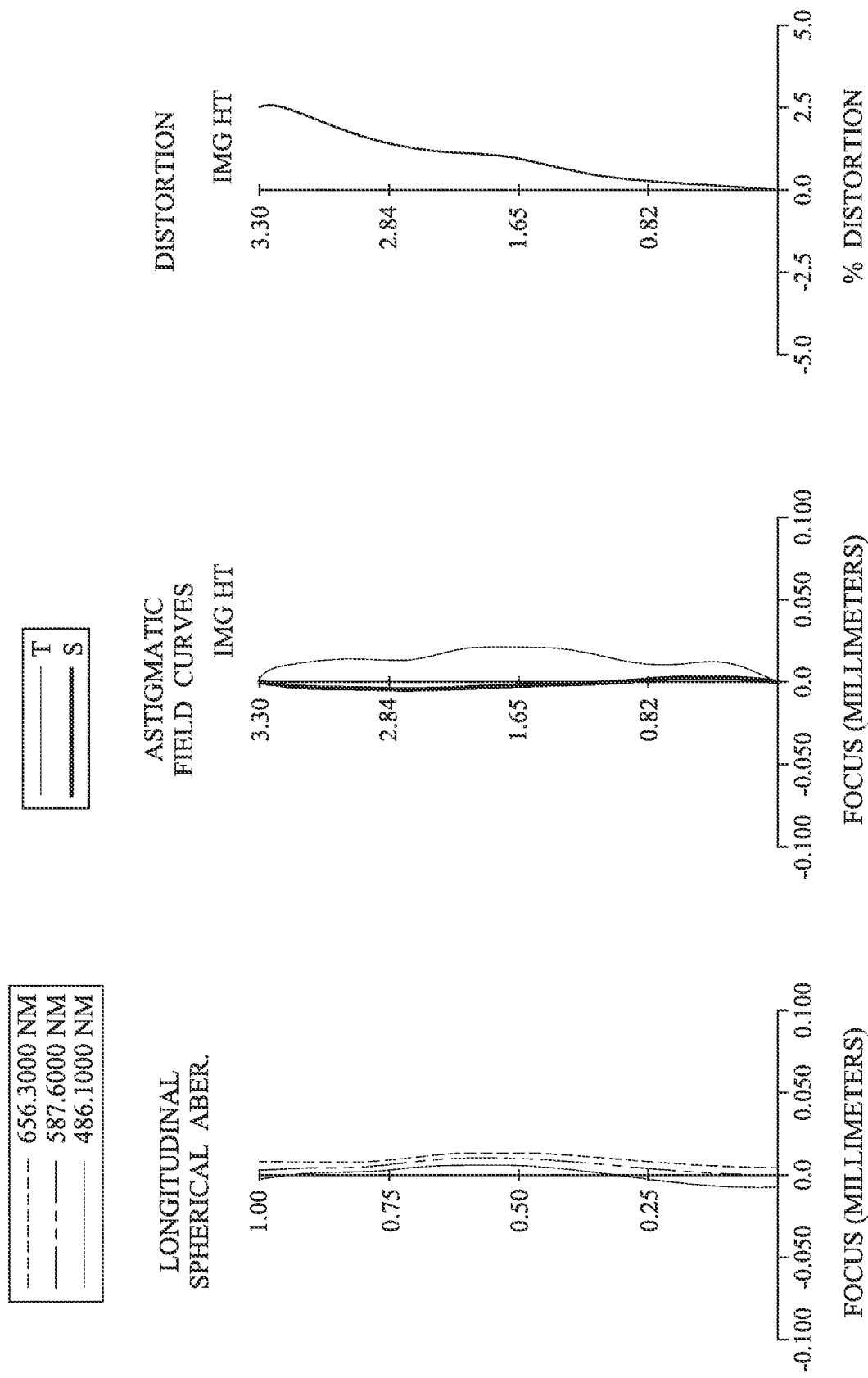
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes a photographing lens assembly (its reference numeral is omitted) and an image sensor 995. The photographing lens assembly includes, in order from an object side to an image side, a first lens element 910, a second lens element 920, an aperture stop 900, a third lens element 930, a fourth lens element 940, a fifth lens element 950, a sixth lens element 960, a seventh lens element 970, a filter 980 and an image surface 990. The image sensor 995 is disposed on the image surface 990 of the photographing lens assembly. The photographing lens assembly includes seven lens elements (910, 920, 930, 940, 950, 960 and 970) without additional one or more lens elements inserted between the first lens element 910 and the seventh lens element 970, and there is an air gap in a paraxial region between each of adjacent lens elements of the seven lens elements (910-970).

The first lens element 910 with positive refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric. Furthermore, each of the object-side surface 911 and the image-side surface 912 of the first lens element 910 includes at least one inflection point.

The second lens element 920 with negative refractive power has an object-side surface 921 being convex in a paraxial region thereof and an image-side surface 922 being concave in a paraxial region thereof. The second lens element 920 is made of a plastic material, and has the object-side surface 921 and the image-side surface 922 being both aspheric.

The third lens element 930 with positive refractive power has an object-side surface 931 being concave in a paraxial region thereof and an image-side surface 932 being convex in a paraxial region thereof. The third lens element 930 is made of a plastic material, and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of a plastic material, and has the object-side surface 941 and the image-side surface 942 being both aspheric.

The fifth lens element 950 with positive refractive power has an object-side surface 951 being concave in a paraxial region thereof and an image-side surface 952 being convex in a paraxial region thereof. The fifth lens element 950 is made of a plastic material, and has the object-side surface 951 and the image-side surface 952 being both aspheric. Furthermore, each of the object-side surface 951 and the image-side surface 952 of the fifth lens element 950 includes at least one inflection point.

The sixth lens element 960 with negative refractive power has an object-side surface 961 being concave in a paraxial region thereof and an image-side surface 962 being concave in a paraxial region thereof. The sixth lens element 960 is made of a plastic material, and has the object-side surface 961 and the image-side surface 962 being both aspheric. Furthermore, each of the object-side surface 961 and the image-side surface 962 of the sixth lens element 960 includes at least one inflection point, and the image-side surface 962 of the sixth lens element 960 includes at least one convex shape in an off-axis region thereof.

The seventh lens element 970 with negative refractive power has an object-side surface 971 being convex in a paraxial region thereof and an image-side surface 972 being concave in a paraxial region thereof. The seventh lens element 970 is made of a plastic material, and has the object-side surface 971 and the image-side surface 972 being both aspheric. Furthermore, each of the object-side surface 971 and the image-side surface 972 of the seventh lens element 970 includes at least one inflection point, and the image-side surface 972 of the seventh lens element 970 includes at least one convex shape in an off-axis region thereof.

The filter 980 is made of a glass material and located between the seventh lens element 970 and the image surface 990, and will not affect the focal length of the photographing lens assembly.

The detailed optical data of the 9th embodiment are shown in Table 17 and the aspheric surface data are shown in Table 18 below.

TABLE 17

9th Embodiment
f = 3.12 mm, Fno = 2.17, HFOV = 45.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 9.940 | ASP | 0.570 | Plastic | 1.534 | 55.9 | 18.62 |
| 2 | | 195198.126 | ASP | 0.260 | | | | |
| 3 | Lens 2 | 1.908 | ASP | 0.235 | Plastic | 1.669 | 19.5 | −31.66 |
| 4 | | 1.664 | ASP | 0.202 | | | | |
| 5 | Ape. Stop | Plano | | 0.044 | | | | |
| 6 | Lens 3 | −24.308 | ASP | 0.783 | Plastic | 1.544 | 56.0 | 2.63 |
| 7 | | −1.368 | ASP | 0.033 | | | | |
| 8 | Lens 4 | 4.338 | ASP | 0.298 | Plastic | 1.660 | 20.4 | −8.03 |
| 9 | | 2.320 | ASP | 0.586 | | | | |
| 10 | Lens 5 | −2.077 | ASP | 0.747 | Plastic | 1.544 | 56.0 | 2.33 |
| 11 | | −0.886 | ASP | 0.030 | | | | |
| 12 | Lens 6 | −5.697 | ASP | 0.415 | Plastic | 1.582 | 30.2 | −9.72 |
| 13 | | 925.455 | ASP | 0.099 | | | | |
| 14 | Lens 7 | 2.327 | ASP | 0.402 | Plastic | 1.535 | 56.3 | −2.79 |
| 15 | | 0.854 | ASP | 0.550 | | | | |
| 16 | Filter | Plano | | 0.210 | Glass | 1.517 | 64.2 | — |
| 17 | | Plano | | 0.242 | | | | |
| 18 | Image | Plano | | — | | | | |

Reference wavelength is 587.6 nm (d-line).

TABLE 18

Aspheric Coefficients

| Surface # | 1 | 2 | 3 | 4 | 6 | 7 | 8 |
|---|---|---|---|---|---|---|---|
| k = | −1.6969E+01 | 1.9966E+01 | −7.1580E+00 | −4.9182E+00 | −9.8569E+01 | −8.1803E−01 | −2.4926E+00 |
| A4 = | 2.7193E−02 | 1.5003E−02 | −2.2390E−02 | −1.3514E−02 | −6.9936E−02 | −5.8009E−02 | −1.3263E−01 |
| A6 = | −5.6057E−03 | −8.4630E−03 | −1.3238E−01 | −1.2278E−01 | −3.5070E−02 | 4.3729E−02 | 1.7276E−01 |
| A8 = | 1.0661E−03 | 1.9098E−03 | 7.5399E−02 | 8.7679E−02 | −1.5487E−02 | −2.7181E−01 | −2.3480E−01 |
| A10 = | −1.1555E−04 | −3.2022E−04 | 5.9118E−02 | 1.0898E−01 | −1.2516E−01 | 3.2952E−01 | 2.0885E−01 |
| A12 = | −6.3321E−05 | 2.7035E−05 | −3.2411E−02 | | | −2.0345E−01 | −1.0080E−01 |
| A14 = | 1.0697E−05 | | | | | | 1.9903E−02 |

| Surface # | 9 | 10 | 11 | 12 | 13 | 14 | 15 |
|---|---|---|---|---|---|---|---|
| k = | −9.7020E+00 | −3.1749E−02 | −3.4722E+00 | 4.1183E+00 | −9.7199E+01 | −4.3875E+00 | −4.0393E+00 |
| A4 = | −6.5712E−02 | −8.9809E−02 | −2.1553E−01 | 9.5993E−02 | 1.4670E−01 | −7.5928E−02 | −7.6894E−02 |
| A6 = | 9.1371E−02 | 7.0873E−03 | 2.2741E−01 | 5.0757E−03 | −1.0623E−01 | 2.2696E−02 | 3.3865E−02 |
| A8 = | −9.3258E−02 | 1.0607E−01 | −1.7427E−01 | −6.1478E−02 | 3.8692E−02 | −1.0933E−02 | −1.2281E−02 |
| A10 = | 5.8810E−02 | −8.3344E−02 | 8.5816E−02 | 4.2867E−02 | −8.8017E−03 | 4.0576E−03 | 2.7665E−03 |
| A12 = | −1.9458E−02 | 3.4572E−02 | −1.2529E−02 | −1.4393E−02 | 1.1833E−03 | −7.8123E−04 | −3.4995E−04 |
| A14 = | 2.6783E−03 | −8.6613E−03 | −3.3488E−03 | 2.4433E−03 | −8.2591E−05 | 7.3147E−05 | 2.2962E−05 |
| A16 = | | 9.9733E−04 | 8.6784E−04 | −1.6743E−04 | 2.0661E−06 | −2.6703E−06 | −6.1305E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.12 | |f/f1| + |f/f2| | 0.27 |
| Fno. | 2.17 | |f/fi|min | 0.10 |
| HFOV [deg.] | 45.9 | Y11/Y72 | 0.66 |
| Nmax | 1.669 | TL/ImgH | 1.73 |
| CT4/CT5 | 0.40 | f/ImgH | 0.94 |
| (R1 + R2)/(R1 − R2) | −1.00 | f/EPD | 2.17 |
| (R5 + R6)/(R5 − R6) | 1.12 | SD/TD | 0.73 |

-continued

| 9th Embodiment | | | |
|---|---|---|---|
| (R7 + R8)/(R7 − R8) | 3.30 | Yc62/Yc72 | 0.91 |
| f/f1 | 0.17 | |SAGc62/Yc62| | 0.095 |
| f/f12 | 0.08 | |Dsr4/Dsr3| | 0.46 |
| |f3/f1| | 0.14 | |Dsr5/Dsr6| | 0.05 |
| |f5/f1| | 0.12 | | |

In the photographing lens assembly according to the 9th embodiment, when the focal length of the photographing lens assembly is f, a curvature radius of an object-side surface of one of the lens elements of the photographing lens assembly is Rf, and a curvature radius of an image-side surface of the lens element of the photographing lens assembly is Rr, the value of the condition |f/Rf|+|f/Rr| corresponding to each of the first lens element 910 through the seventh lens element 970 is listed in the following table, wherein term definitions of the parameters related to each surface of the lens elements are the same as those of the 1st embodiment. Therefore, an explanation in this regard will not be provided again.

| 9th Embodiment | | | |
|---|---|---|---|
| |f/Rf| + |f/Rr| | |f/R1| + |f/R2| 0.31 | |f/Rf| + |f/Rr| | |f/R9| + |f/R10| 5.02 |
| | |f/R3| + |f/R4| 3.51 | | |f/R11| + |f/R12| 0.55 |
| | |f/R5| + |f/R6| 2.41 | | |f/R13| + |f/R14| 4.99 |
| | |f/R7| + |f/R8| 2.06 | | |

Furthermore, in the photographing lens assembly according to the 9th embodiment, two lens elements of the first lens element 910, the second lens element 920, the third lens element 930, the fourth lens element 940, the fifth lens element 950, the sixth lens element 960, and the seventh lens element 970 have the Abbe numbers less than 25.0, which are the second lens element 920 and the fourth lens element 940.

In the photographing lens assembly according to the 9th embodiment, when a maximum optical effective radius of the object-side surface 911 of the first lens element 910 is Y11, a maximum optical effective radius of the object-side surface 921 of the second lens element 920 is Y21, a maximum optical effective radius of the object-side surface 931 of the third lens element 930 is Y31, a maximum optical effective radius of the object-side surface 941 of the fourth lens element 940 is Y41, and a maximum optical effective radius of the object-side surface 951 of the fifth lens element 950 is Y51, the following conditions are satisfied: Y11>Y21; Y11>Y31; Y11>Y41; and Y11>Y51.

10th Embodiment

Figure 23:
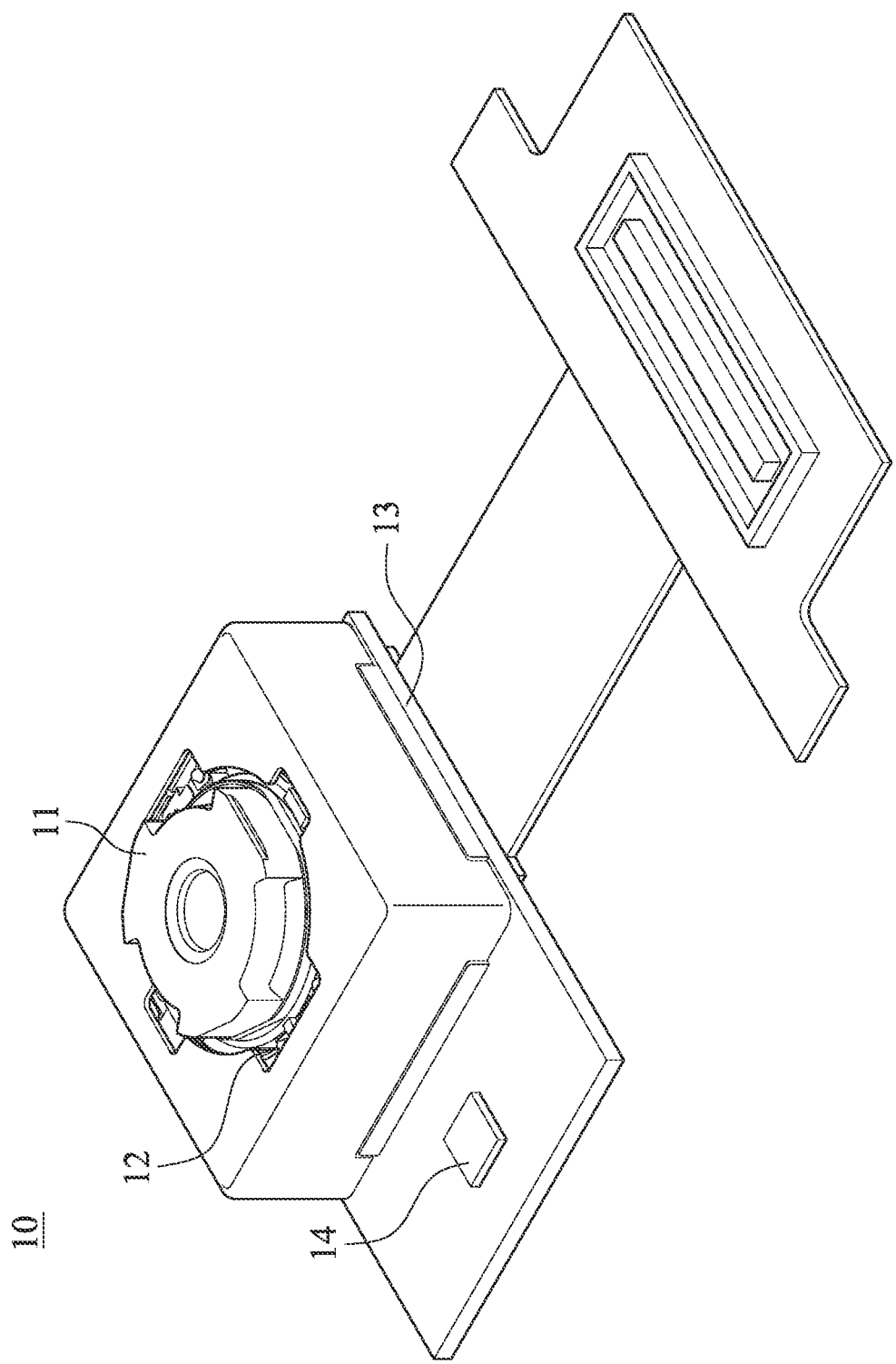
FIG. 23 is a three-dimensional view of an imaging apparatus according to the 10th embodiment of the present disclosure.

FIG. 23 is a three-dimensional view of an imaging apparatus 10 according to the 10th embodiment of the present disclosure. In FIG. 23, the imaging apparatus 10 according to the 10th embodiment is a camera module. The imaging apparatus 10 includes an imaging lens module 11, a driving apparatus 12 and an image sensor 13, wherein the imaging lens module 11 includes the photographing lens assembly according to the 1st embodiment and a barrel (its reference numeral is omitted) for carrying the photographing lens assembly. An image of an imaged object can be captured by the imaging apparatus 10 via the imaging lens module 11, the driving apparatus 12 is used to bring the image into focus so that the image can be clearly formed on the image sensor 13, and then the image data is generated.

The driving apparatus 12 can have an auto-focus functionality, and a driving method thereof can use a voice coil motor (VCM), a micro electro-mechanical system (MEMS), a piezoelectric system or a shape memory alloy system. The driving apparatus 12 enables the photographing lens assembly to obtain a preferable imaging position, so that clear images of the imaged object at different object distances can be obtained.

The image sensor 13 of the imaging apparatus 10 can have the properties of high photosensitivity and low noise (such as CMOS and CCD) and is disposed on the image surface of the photographing lens assembly, so that high image quality of the photographing lens assembly can be obtained.

Moreover, the imaging apparatus 10 can further include an image stabilizing module 14. The image stabilizing module 14 can exemplarily include an accelerator, a gyro sensor or a Hall Effect sensor. In the 10th embodiment, the image stabilizing module 14 is a gyro sensor. However, it is only exemplary and the image stabilizing module 14 is not limited thereto. By adjusting to movements in different axial directions of the photographing lens assembly, the image blur due to motion during exposure can be compensated, so that the image quality of dynamic or low-light scenes can be enhanced. Moreover, advanced image compensation functions, such as optical image stabilization (OIS) or electronic image stabilization (EIS), can be provided.

11th Embodiment

Figure 24A:
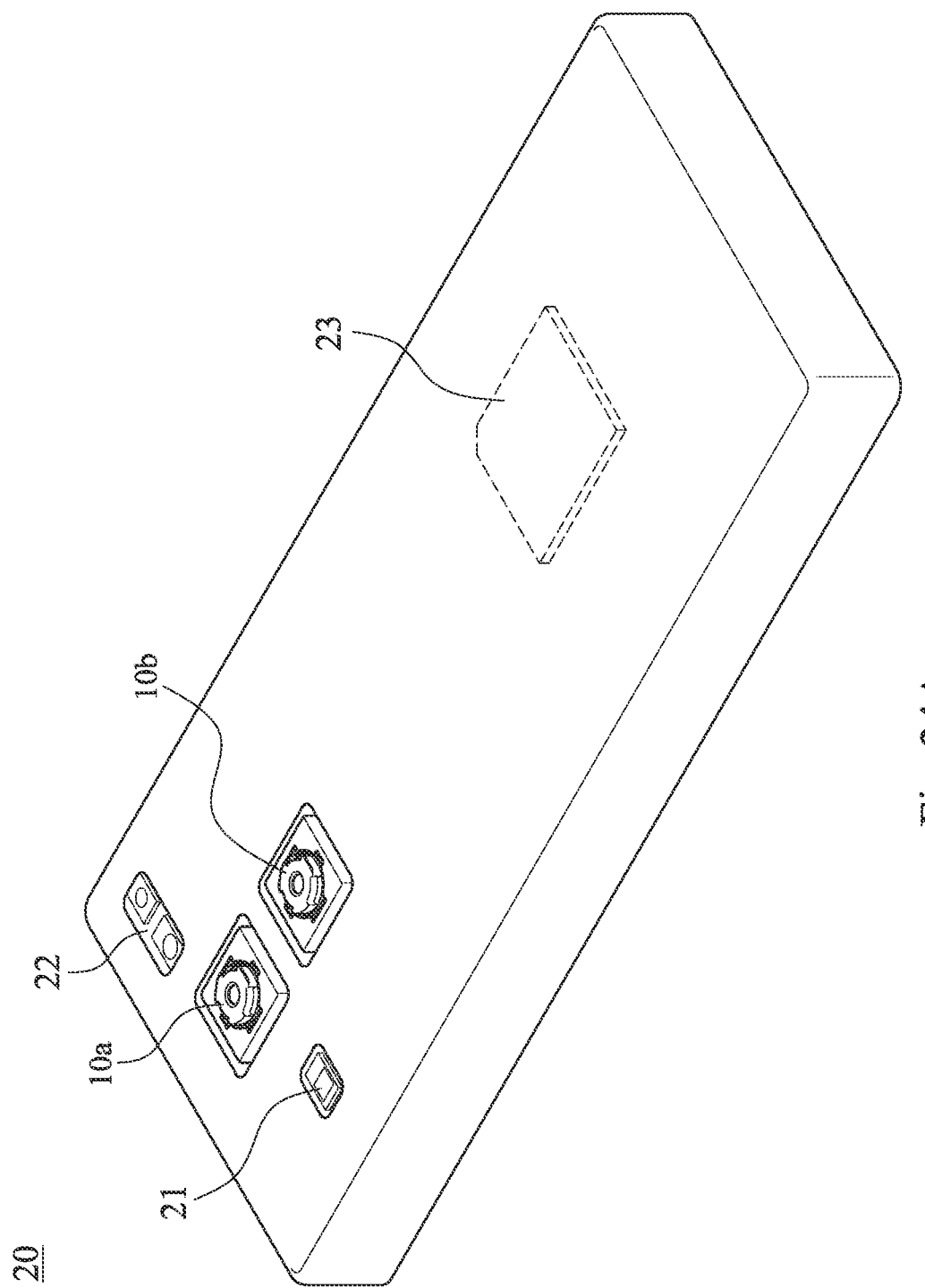
FIG. 24A is a schematic view showing a side of an electronic device according to the 11th embodiment of the present disclosure.
Figure 24B:
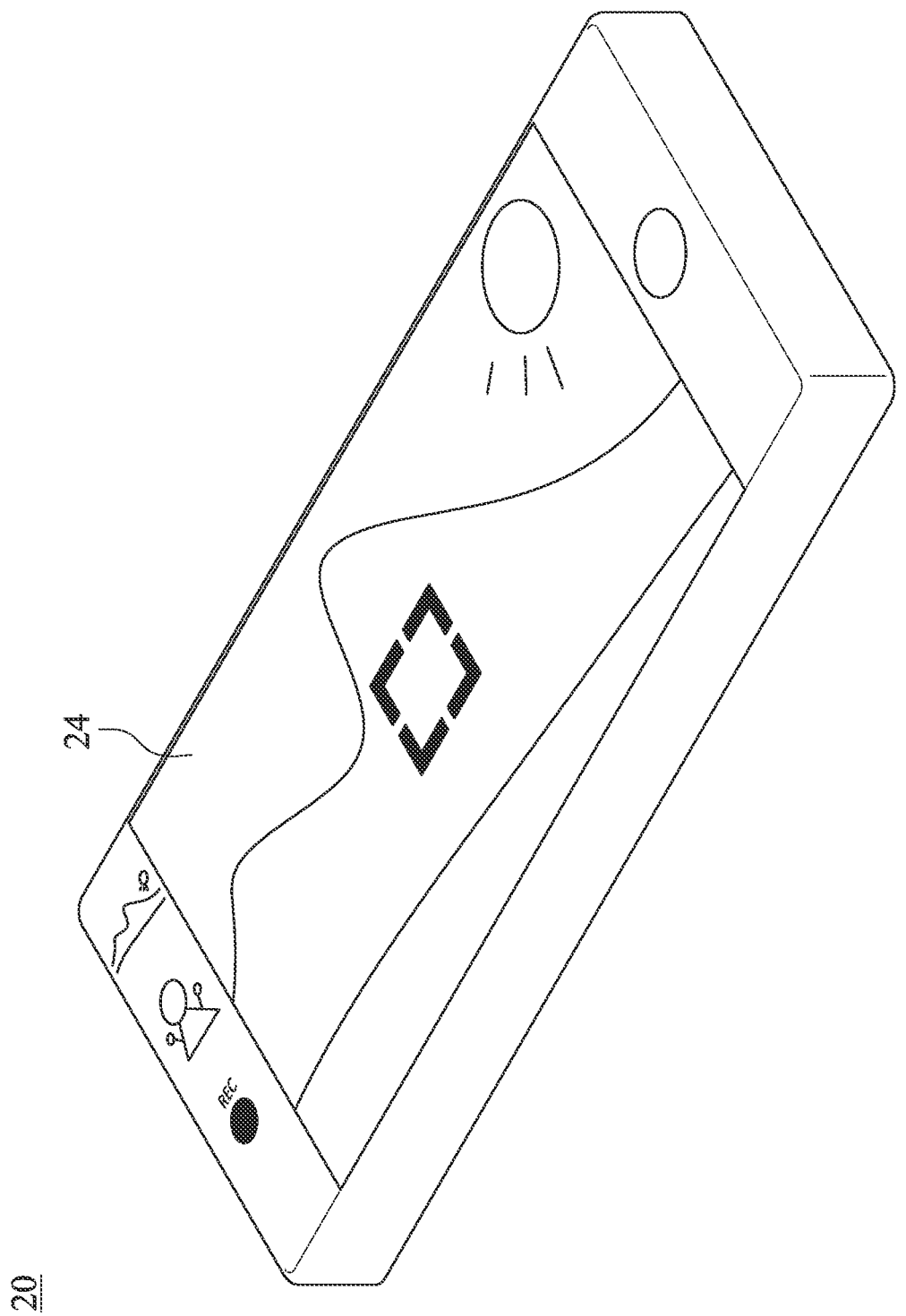
FIG. 24B is a schematic view showing another side of the electronic device in FIG. 24A.
Figure 24C:
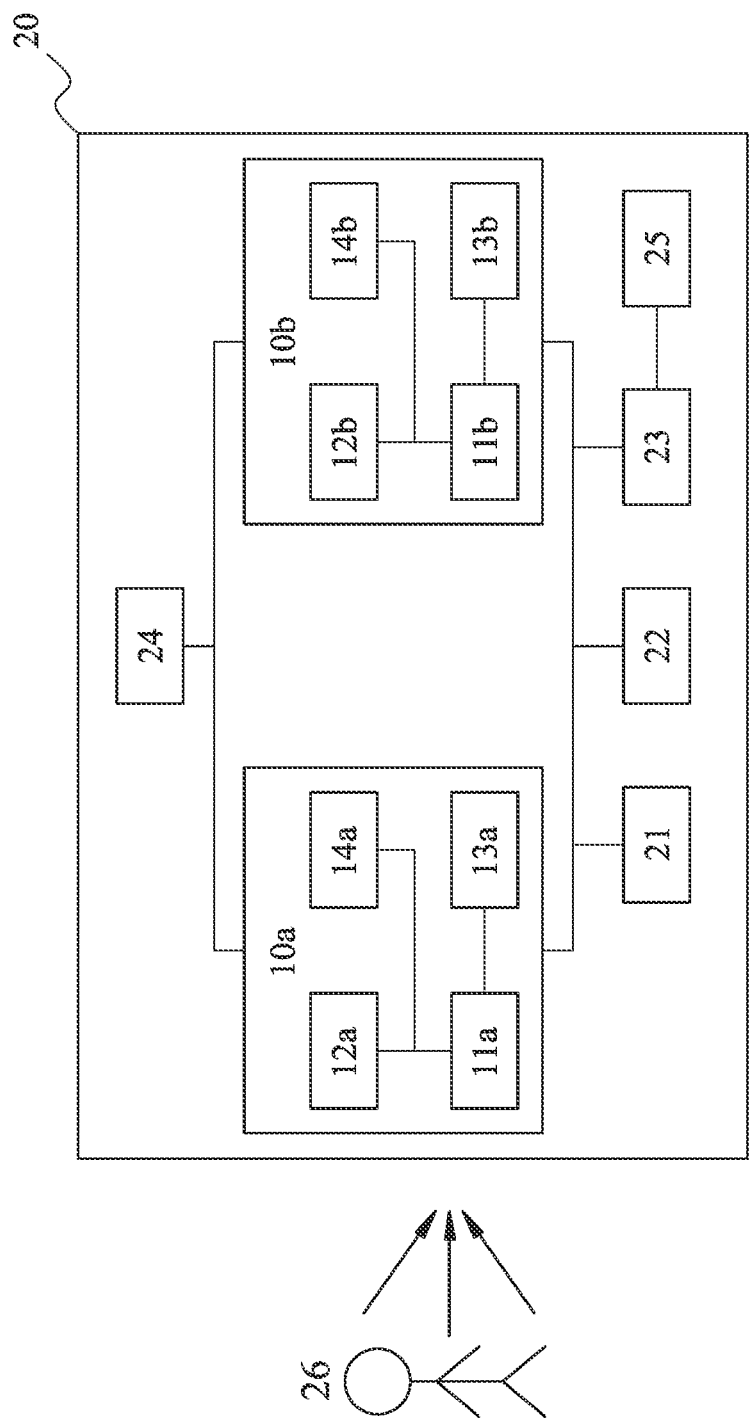
FIG. 24C is a block diagram of the electronic device in FIG. 24A.

FIG. 24A is a schematic view showing a side of an electronic device 20 according to the 11th embodiment of the present disclosure. FIG. 24B is a schematic view showing another side of the electronic device 20 in FIG. 24A. FIG. 24C is a block diagram of the electronic device 20 in FIG. 24A. In FIG. 24A, FIG. 24B and FIG. 24C, the electronic device 20 of the 11th embodiment is a smartphone. The electronic device 20 includes an imaging apparatus 10a, an imaging apparatus 10b, a flash module 21, a focusing assist module 22, an image signal processor 23, a user interface 24 and an image software processor 25. The imaging apparatus 10a is a camera module. The imaging apparatus 10a includes an imaging lens module 11a, a driving apparatus 12a, an image sensor 13a and an image stabilizing module 14a. The imaging apparatus 10a according to the 11th embodiment can be the same as the imaging apparatus 10 according to the 10th embodiment, and will not be repeated herein. The imaging apparatus 10b is a camera module. The imaging apparatus 10b includes an imaging lens module 11b, a driving apparatus 12b, an image sensor 13b and an image stabilizing module 14b. The imaging lens module 11b includes an imaging lens assembly and a barrel (its reference numeral is omitted) for carrying the imaging lens assembly. The imaging lens assembly can be identical to or different from the photographing lens assembly according to the present disclosure. The driving apparatus 12b, the image sensor 13b and the image stabilizing module 14b can be identical to or different from the driving apparatus 12, the image sensor 13 and the image stabilizing module 14 of the 10th embodiment, and will not be repeated herein. When a user takes a photograph via the user interface 24, light rays of the imaged object 26 are focused by the electronic device 20 via the imaging apparatus 10a and/or the imaging apparatus 10b for generating an image. Meanwhile, light compensation is provided by the flash module 21, the object distance of the imaged objected 26 is obtained by the focusing assist module 22 for quick focusing, and an optimized image processing is provided by the image signal processor 23 and the image software processor 25, so that the image quality of the photographing lens assembly can be further enhanced. The focusing assist module 22 can adopt conventional infrared or laser for quick focusing. The user interface 24 can adopt a touch screen or a physical button, and image processing software can be utilized through the user interface 24 for providing a variety of photographing modes and image editing functions.

12th Embodiment

Figure 25:
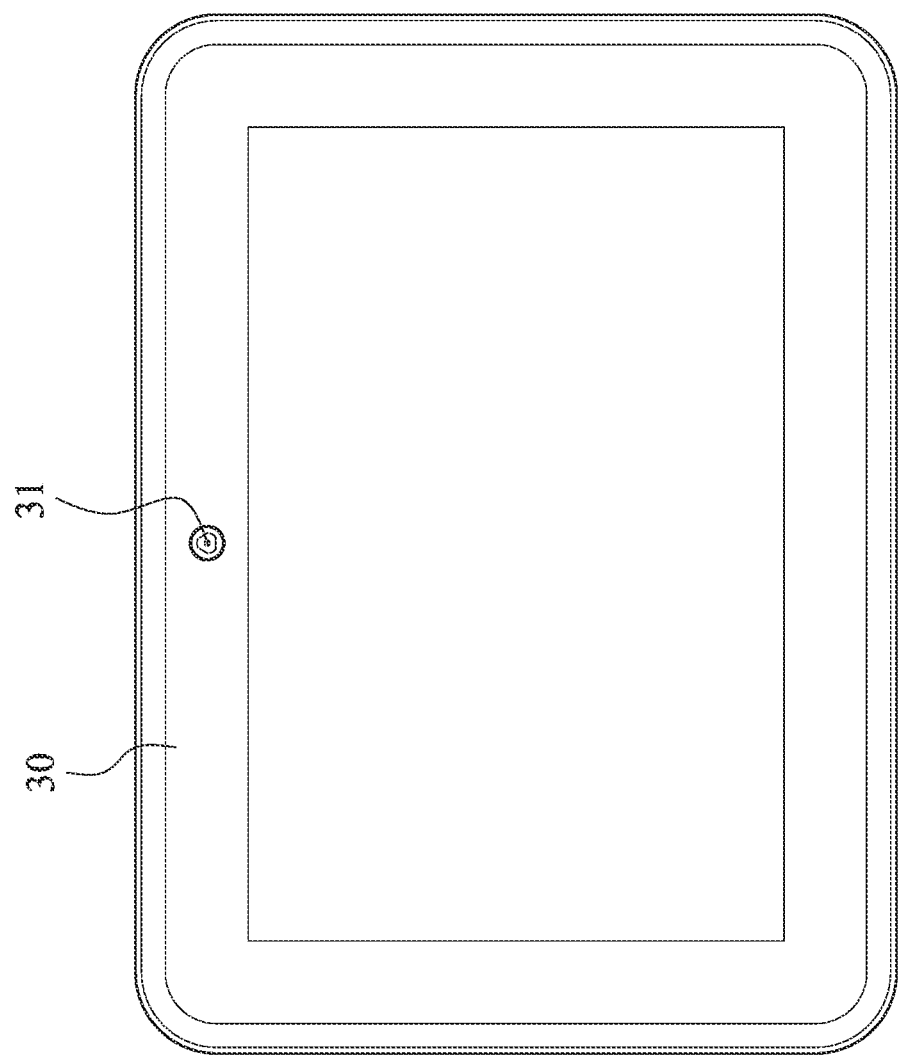
FIG. 25 is a schematic view of an electronic device according to the 12th embodiment of the present disclosure.

FIG. 25 is a schematic view of an electronic device 30 according to the 12th embodiment of the present disclosure. The electronic device 30 of the 12th embodiment is a tablet personal computer. The electronic device 30 includes an imaging apparatus 31. The imaging apparatus 31 can be the same as that of the 10th embodiment, and will not be repeated herein.

13th Embodiment

Figure 26:
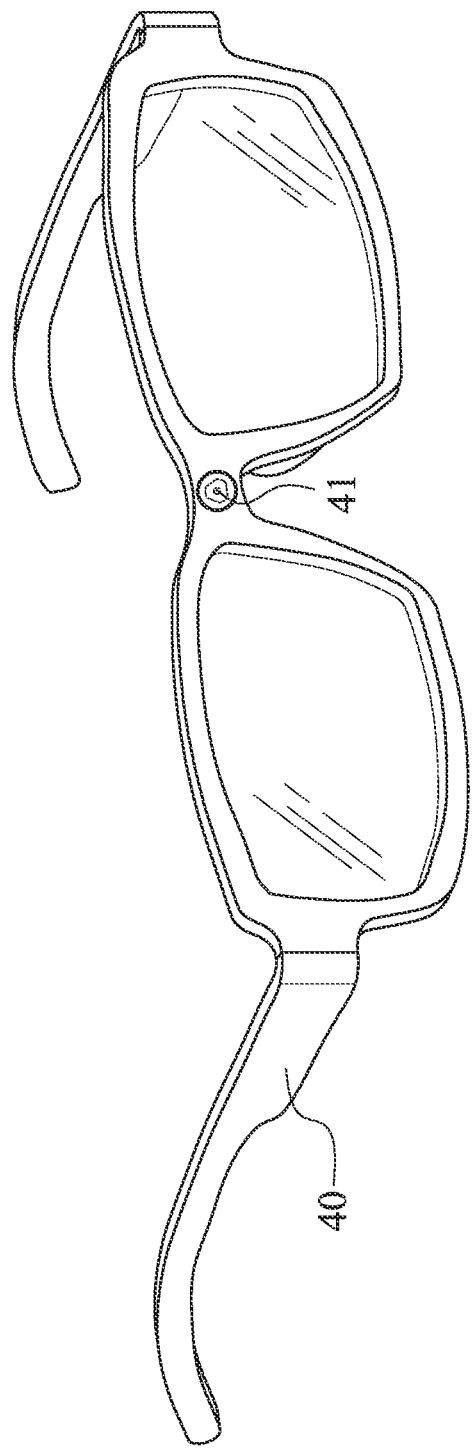
FIG. 26 is a schematic view of an electronic device according to the 13th embodiment of the present disclosure.

FIG. 26 is a schematic view of an electronic device 40 according to the 13th embodiment of the present disclosure. The electronic device 40 of the 13th embodiment is a wearable device. The electronic device 40 includes an imaging apparatus 41. The imaging apparatus 41 can be the same as that of the 10th embodiment, and will not be repeated herein.

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising seven lens elements, the seven lens elements being, in order from an object side to an image side:
   a first lens element, a second lens element, a third lens element, a fourth lens element, a fifth lens element, a sixth lens element and a seventh lens element; each of the seven lens elements having an object-side surface facing towards the object side and an image-side surface facing towards the image side;
   wherein the object-side surface of the first lens element is concave in a paraxial region thereof; the third lens element has positive refractive power; the image-side surface of the seventh lens element is concave in a paraxial region thereof and comprises at least one convex surface in an off-axis region thereof;
   wherein a focal length of the first lens element is f1, a focal length of the third lens element is f3, a curvature radius of the object-side surface of the third lens element is R5, a curvature radius of the image-side surface of the third lens element is R6, and the following conditions are satisfied:

$|f3/f1|<0.90$; and $0.10<(R5+R6)/(R5-R6)<8.0$.

2. The photographing lens assembly of claim 1, wherein the object-side surface of the first lens element comprises at least one convex surface in an off-axis region thereof.

3. The photographing lens assembly of claim 1, wherein the second lens element has positive refractive power, the object-side surface of the second lens element is convex in a paraxial region thereof, the image-side surface of the second lens element is concave in a paraxial region thereof.

4. The photographing lens assembly of claim 1, wherein the fourth lens element has negative refractive power; the fifth lens element has positive refractive power.

5. The photographing lens assembly of claim 1, wherein the first lens element has negative refractive power; the object-side surface of the seventh lens element is convex in a paraxial region thereof; at least one of the object-side surface and the image-side surface of each of the seven lens elements is aspheric, there is an air gap between each of adjacent lens elements of the seven lens elements.

6. The photographing lens assembly of claim 1, wherein a maximum optical effective radius of the object-side surface of the first lens element is Y11, a maximum optical effective radius of the image-side surface of the seventh lens element is Y72, and the following condition is satisfied:

$0.50<Y11/Y72<1.0$.

7. The photographing lens assembly of claim 1, wherein a focal length of the photographing lens assembly is f, an entrance pupil diameter of the photographing lens assembly is EPD, and the following condition is satisfied:

$0.80<f/EPD\leq2.30$.

8. The photographing lens assembly of claim 1, wherein a focal length of the photographing lens assembly is f, the focal length of the first lens element is f1, and the following condition is satisfied:

$-0.30<f/f1<0.50$.

9. The photographing lens assembly of claim 1, further comprising:
   an aperture stop, an axial distance between the aperture stop and the image-side surface of the seventh lens element is SD, an axial distance between the object-side surface of the first lens element and the image-side surface of the seventh lens element is TD, and the following condition is satisfied:

$0.65<SD/TD<0.85$.

10. The photographing lens assembly of claim 1, further comprising:
    an aperture stop, wherein an axial distance between the aperture stop and the object-side surface of the second lens element is Dsr3, an axial distance between the aperture stop and the image-side surface of the second lens element is Dsr4, an axial distance between the aperture stop and the object-side surface of the third lens element is Dsr5, an axial distance between the aperture stop and the image-side surface of the third lens element is Dsr6, and the following conditions are satisfied:

$|Dsr4/Dsr3|<1.0$; and $|Dsr5/Dsr6|<1.0$.

11. The photographing lens assembly of claim 1, wherein at least two of the seven lens elements have an Abbe number less than 25.0.

12. The photographing lens assembly of claim 1, wherein an axial distance between the object-side surface of the first lens element and an image surface is TL, a maximum image height of the photographing lens assembly is ImgH, half of a maximum field of view of the photographing lens assembly is HFOV, and the following conditions are satisfied:

$1.0<TL/ImgH<2.0$; and $40.0$ degrees $<HFOV<70.0$ degrees.

13. An imaging apparatus, comprising:
    the photographing lens assembly of claim 1; and
    an image sensor disposed on an image surface of the photographing lens assembly.

14. An electronic device, comprising:
the imaging apparatus of claim 13.

15. A photographing lens assembly comprising seven lens elements, the seven lens elements being, in order from an object side to an image side:
- a first lens element, a second lens element, a third lens element, a fourth lens element, a fifth lens element, a sixth lens element and a seventh lens element; each of the seven lens elements having an object-side surface facing towards the object side and an image-side surface facing towards the image side;
- wherein the third lens element has positive refractive power; the image-side surface of the sixth lens element is concave in a paraxial region thereof; the image-side surface of the seventh lens element is concave in a paraxial region thereof and comprises at least one convex surface in an off-axis region thereof;
- wherein the photographing lens assembly further comprises an aperture stop, an axial distance between the aperture stop and the image-side surface of the seventh lens element is SD, an axial distance between the object-side surface of the first lens element and the image-side surface of the seventh lens element is TD, a focal length of the first lens element is f1, a focal length of the third lens element is f3, a curvature radius of the object-side surface of the third lens element is R5, a curvature radius of the image-side surface of the third lens element is R6, a maximum of refractive indexes of all the lens elements of the photographing lens assembly is Nmax, and the following conditions are satisfied:

$|f3/f1|<0.90;$ $0.10<(R5+R6)/(R5-R6)<8.0;$ $1.650<Nmax<1.750;$ and $0.65<SD/TD<0.85.$ 16. The photographing lens assembly of claim 15, wherein the fifth lens element has positive refractive power, the object-side surface of the fifth lens element is concave in a paraxial region thereof, the image-side surface of the fifth lens element is convex in a paraxial region thereof.

17. The photographing lens assembly of claim 15, wherein the seventh lens element has negative refractive power; the object-side surface of the second lens element is convex in a paraxial region thereof, the image-side surface of the second lens element is concave in a paraxial region thereof; the sixth lens element comprises at least one inflection point.

18. The photographing lens assembly of claim 15, wherein an axial distance between the object-side surface of the first lens element and an image surface is TL, a maximum image height of the photographing lens assembly is ImgH, and the following condition is satisfied:

$1.0<TL/ImgH<1.75.$

19. The photographing lens assembly of claim 15, wherein a maximum optical effective radius of the object-side surface of the first lens element is Y11, a maximum optical effective radius of the object-side surface of the second lens element is Y21, a maximum optical effective radius of the object-side surface of the third lens element is Y31, a maximum optical effective radius of the object-side surface of the fourth lens element is Y41, and the following conditions are satisfied:

$Y11>Y21;$ $Y11>Y31;$ and $Y11>Y41.$

20. The photographing lens assembly of claim 15, wherein a vertical distance between a non-axial critical point on the image-side surface of the sixth lens element and an optical axis is Yc62, a vertical distance between a non-axial critical point on the image-side surface of the seventh lens element and the optical axis is Yc72, and the following condition is satisfied:

$0.10<Yc62/Yc72<1.50.$

21. The photographing lens assembly of claim 15, wherein at least five of the seven lens elements are made of plastic material; a central thickness of the fourth lens element is CT4, a central thickness of the fifth lens element is CT5, and the following condition is satisfied:

$0.10<CT4/CT5<0.85.$

\* \* \* \* \*